United States Patent
Terry et al.

(10) Patent No.: US 7,172,038 B2
(45) Date of Patent: Feb. 6, 2007

(54) WELL SYSTEM

(75) Inventors: James B. Terry, Houston, TX (US);
Thomas Platt Wilson, Houston, TX (US);
Jay M. Eppink, Spring, TX (US);
Albert C. Odell, Kingwood, TX (US);
William F. Trainor, Houston, TX (US);
James W. Estep, Houston, TX (US);
Haoshi Song, Sugar Land, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 10/988,930

(22) Filed: Nov. 15, 2004

(65) Prior Publication Data

US 2005/0115741 A1 Jun. 2, 2005

Related U.S. Application Data

(60) Division of application No. 10/265,786, filed on Oct. 7, 2002, now Pat. No. 6,923,273, and a continuation-in-part of application No. 09/911,963, filed on Jul. 23, 2001, now Pat. No. 6,863,137, which is a continuation of application No. 09/081,961, filed on May 20, 1998, now Pat. No. 6,296,066.

(60) Provisional application No. 60/353,654, filed on Feb. 1, 2002, provisional application No. 60/063,326, filed on Oct. 27, 1997.

(51) Int. Cl.
*E21B 7/04* (2006.01)
*E21B 47/02* (2006.01)

(52) U.S. Cl. .......................... 175/45; 175/61; 175/73; 175/320; 324/369; 702/6

(58) Field of Classification Search .................. 175/40, 175/45, 61, 73, 92, 99, 320; 166/242.2; 138/103, 138/108, 125, 130, 132, 133, 144, 153, 174; 702/6, 7; 324/369
See application file for complete search history.

(56) References Cited

U.S. PATENT DOCUMENTS 2,822,158 A 2/1958 Brinton (Continued)

FOREIGN PATENT DOCUMENTS

EP 636763 * 2/1995

(Continued)

OTHER PUBLICATIONS

SPE Petroleum Conference (SPE 028871); *Well Tractors for Highly Deviated and Horizontal Wells*; J. Hallundbaek; Oct. 25-27, 1994; (pp. 57-62).

(Continued)

*Primary Examiner*—Frederick L. Lagman
(74) *Attorney, Agent, or Firm*—Conley Rose, P.C.

(57) ABSTRACT

The drilling system includes a work string supporting a bottom hole assembly. The work string including lengths of pipe having a non-metallic portion. The work string preferably includes a composite coiled tubing having a fluid impermeable liner, multiple load carrying layers, and a wear layer. Multiple electrical conductors and data transmission conductors may be embedded in the load carrying layers for carrying current or transmitting data between the bottom hole assembly and the surface. The bottom hole assembly includes a bit, a gamma ray and inclinometer instrument package, a steerable assembly, an electronics section, a transmission, and a power section for rotating the bit. It may or may not include a propulsion system. The drilling system may be a gravity based drilling system that does include a propulsion system. Various motive means may be provided, such as gravity, to apply weight on the bit.

11 Claims, 21 Drawing Sheets

U.S. PATENT DOCUMENTS

| | | |
|---|---|---|
| 3,129,776 A | 4/1964 | Mann |
| 3,225,843 A | 12/1965 | Ortloff et al. |
| 3,354,969 A | 11/1967 | Ebeling |
| 3,376,942 A | 4/1968 | Van Winkle |
| 3,713,500 A | 1/1973 | Russell |
| 3,797,589 A | 3/1974 | Kellner et al. |
| 3,799,277 A | 3/1974 | Kellner |
| RE28,449 E | 6/1975 | Edmond |
| 3,888,319 A | 6/1975 | Bourne, Jr. et al. |
| 3,978,930 A | 9/1976 | Schroeder |
| 4,039,237 A | 8/1977 | Cullen et al. |
| 4,040,494 A | 8/1977 | Kellner |
| 4,060,141 A | 11/1977 | Catterfeld |
| 4,185,704 A | 1/1980 | Nixon, Jr. |
| 4,220,381 A | 9/1980 | Van der Graaf |
| 4,336,415 A | 6/1982 | Walling |
| 4,388,974 A | 6/1983 | Jones, Jr. et al. |
| 4,463,814 A | 8/1984 | Horstmeyer et al. |
| 4,471,843 A | 9/1984 | Jones, Jr. et al. |
| 4,484,641 A | 11/1984 | Dismukes |
| 4,496,203 A | 1/1985 | Meadows |
| 4,557,538 A | 12/1985 | Chevalier |
| 4,560,934 A | 12/1985 | Dickinson, III |
| 4,568,145 A | 2/1986 | Colin et al. |
| 4,619,323 A | 10/1986 | Gidley |
| 4,646,856 A | 3/1987 | Dismukes |
| 4,698,028 A | 10/1987 | Caro et al. |
| 4,699,454 A | 10/1987 | Brubaker |
| 4,719,977 A | 1/1988 | Dellinger |
| 4,844,516 A | 7/1989 | Baker |
| 4,854,397 A | 8/1989 | Warren et al. |
| 5,018,583 A | 5/1991 | Williams |
| 5,064,268 A | 11/1991 | Morency et al. |
| 5,069,297 A | 12/1991 | Krueger et al. |
| 5,080,175 A | 1/1992 | Williams |
| 5,094,870 A | 3/1992 | Williams |
| 5,109,921 A | 5/1992 | Aracena |
| 5,146,982 A | 9/1992 | Dinkins |
| 5,146,984 A | 9/1992 | Pleasants |
| 5,160,925 A | 11/1992 | Dailey et al. |
| 5,165,491 A | 11/1992 | Wilson |
| 5,172,765 A | 12/1992 | Sas-Jaworsky et al. |
| 5,176,180 A | 1/1993 | Williams et al. |
| 5,186,264 A | 2/1993 | De Chaffaut |
| 5,215,151 A | 6/1993 | Smith et al. |
| 5,220,963 A | 6/1993 | Patton |
| 5,233,522 A | 8/1993 | Sinclair |
| 5,234,058 A | 8/1993 | Sas-Jaworsky et al. |
| 5,235,285 A | 8/1993 | Clark et al. |
| 5,260,662 A | 11/1993 | Rorden |
| 5,261,462 A | 11/1993 | Wolfe et al. |
| 5,285,008 A | 2/1994 | Sas-Jaworsky et al. |
| 5,285,204 A * | 2/1994 | Sas-Jaworsky ............... 175/40 |
| 5,311,952 A | 5/1994 | Eddison et al. |
| 5,314,032 A | 5/1994 | Pringle et al. |
| 5,316,094 A | 5/1994 | Pringle |
| 5,318,138 A | 6/1994 | Dewey et al. |
| 5,330,807 A | 7/1994 | Williams |
| 5,332,048 A | 7/1994 | Underwood et al. |
| 5,332,049 A | 7/1994 | Tew |
| 5,339,036 A | 8/1994 | Clark et al. |
| 5,348,096 A | 9/1994 | Williams |
| 5,359,324 A | 10/1994 | Clark et al. |
| 5,380,385 A | 1/1995 | Derroire et al. |
| 5,394,951 A | 3/1995 | Pringle et al. |
| 5,423,389 A | 6/1995 | Warren et al. |
| 5,435,867 A | 7/1995 | Wolfe et al. |
| 5,437,899 A | 8/1995 | Quigley |
| 5,442,294 A | 8/1995 | Rorden |
| 5,469,916 A | 11/1995 | Sas-Jaworsky et al. |
| 5,485,889 A | 1/1996 | Gray |
| 5,497,707 A | 3/1996 | Box |
| 5,527,220 A | 6/1996 | Geczy |
| 5,540,870 A | 7/1996 | Quigley |
| 5,586,084 A | 12/1996 | Barron et al. |
| 5,601,025 A | 2/1997 | Box |
| 5,620,056 A | 4/1997 | Eppink |
| 5,662,020 A | 9/1997 | Morita et al. |
| 5,713,422 A | 2/1998 | Dhindsa |
| 5,738,178 A | 4/1998 | Williams et al. |
| 5,778,992 A | 7/1998 | Fuller |
| 5,828,003 A | 10/1998 | Thomeer et al. |
| 5,842,149 A | 11/1998 | Harrell et al. |
| 5,890,549 A | 4/1999 | Sprehe |
| 5,908,049 A | 6/1999 | Williams et al. |
| 5,913,337 A | 6/1999 | Williams et al. |
| 5,921,285 A | 7/1999 | Quigley et al. |
| 5,933,945 A | 8/1999 | Thomeer et al. |
| 5,988,702 A | 11/1999 | Sas-Jaworsky |
| 6,004,639 A | 12/1999 | Quigley et al. |
| 6,016,845 A | 1/2000 | Quigley et al. |
| 6,065,540 A | 5/2000 | Thomeer et al. |
| 6,097,310 A | 8/2000 | Harrell et al. |
| 6,206,108 B1 | 3/2001 | MacDonald et al. |
| 6,257,332 B1 | 7/2001 | Vidrine et al. |
| 6,296,066 B1 | 10/2001 | Terry et al. |
| 6,318,470 B1 * | 11/2001 | Chang et al. ............... 175/62 |
| 6,513,606 B1 | 2/2003 | Krueger |
| 6,561,289 B2 | 5/2003 | Portman et al. |
| 6,863,137 B2 | 3/2005 | Terry et al. |
| 2001/0025664 A1 | 10/2001 | Quigley et al. |
| 2002/0007945 A1 | 1/2002 | Neuroth et al. |
| 2002/0007970 A1 | 1/2002 | Terry et al. |
| 2003/0098181 A1 * | 5/2003 | Aronstam et al. ............ 175/65 |

FOREIGN PATENT DOCUMENTS

| | | |
|---|---|---|
| GB | 2 295 875 | 6/1996 |
| WO | WO 86/01852 | 3/1986 |
| WO | WO 92/00438 | 1/1992 |
| WO | WO 96/09416 | 3/1996 |
| WO | WO 97/08418 | 3/1997 |
| WO | WO 97/12115 | 4/1997 |
| WO | WO 97/12166 | 4/1997 |
| WO | WO 99/19653 | 4/1999 |

OTHER PUBLICATIONS

68th Annual Technical Conference of SPE (SPE 26536); *Development of Composite Coiled Tubing for Oilfield Services*; A. Sas-Jaworsky, J.G. Williams; Oct. 3-6, 1993 (pp. 1-15).

SPE/ADC Drilling Conference (SPE 37656); *Extending the Reach of Coiled Tubing Drilling (Thruster, Equalizers, and Tractors)*; J. Leising, E.C. Onyia, S.C. Townnsend, et al Mar. 4-6, 1997; (pp. 1-14).

Introduction to Petroleum Production vol. 1 (ISBN 0-87201-767-2); *Reservoir Engineering, Drilling, Well Completions*; D. R. Skinner; Gulf Publishing Company; (pp. 1-69), undated.

International MWD Society; *State of the Art in MWD*; (pp. 28) Jan. 19, 1993.

Oilfield Review; *Measurements at the Bit: A New Generation of MWD Tools*; S. Bonner, T. Burgess, et al; (pp. 44-54), undated.

Schlumberger/Anadrill; Anadrill Directional Drilling; *People, Tools and Technology Put More Within Your Reach*; (1991) (pp. 6).

SADC/SPE Drilling Conference (IADC/SPE 14764); *Predicting Bottomhole Assembly Performance*; J. Williamson, A. Lubinski; Feb. 10-12, 1986; (pp. 337-342).

Baker Hughes INTEQ; Technical Data Sheet; *NaviGator™(6-3/4")*; (1994);(pp. 2).

Schlumberger/Anadrill; *An Underground revolution, Integrated Drilling Evaluation and Logging*; (1995); (pp. 12).

Schlumberger/Anadrill; *IDEAL Wellsite Information System*; (pp. 14).

Baker Hughes INTEQ; Technical Services Evaluation Product Line; *The Navigator Sales Orientation Manual*; F. Hearn, et al; (pp. 1-16).

Baker Hughes INTEQ; *NaviGator™ Reservoir Navigation Service*; (1996); (pp. 4).

R. L. Gilstrap Co.; *The Wellhead CASINJAC™ for extra pipe pulling power*; (pp. 7), undated.

The Natural Selection Research Group; *Inchworm Mobility—Stable, Reliable and Inexpensive*; A. Ferworn, D. Stacey; (pp. 1-4), undated.

CSIRO-UTS Electrical Machines; *Oil Well Tractor*, (pp. 1), undated.

Scandinavian Oil-Gas Magazine; *Well Tractor for use in Deviated and Horizontal Wells*;F. Schüssler; (pp. 1-3), undated.

Shell U.K. Exploration and Production; *The Challenge of Drilling in the New Millenium*; NeuRobot; (2 p.); (at least as early as 1996).

D. Biglin, M. Wassell; APS Technology Self Propelled Drill String; *A Self Propelled Drilling System for Hard-Rock, Horizontal and Coiled Tube Drilling*; (6 pages) May 5, 1998.

(SPE 54469) *The All Electric BHA: Recent Developments Toward an Intelligent Coiled-Tubing Drilling System*; Turner, Daniel R., et al; 1999 SPE/CoTA Coiled Tubing Roundtable, Houston, TX, May 25-26, 1999; (pp. 1-10).

(SPE 68441); *Electric Coiled Tubing Drilling (E-CTD) Project Update*; Head, Philip et al; 1999 SPE/CoTA Coiled Tubing Roundtable, Houston, TX, Mar. 7-8, 2001; (pp. 1-9).

(SPE 68489) *New DC Motor for Downhole Drilling and Pumping Applications*; Turner, Dan et al; 1999 SPE/CoTA Coiled Tubing Roundtable, Houston, TX, Mar. 7-8, 2001.

* cited by examiner

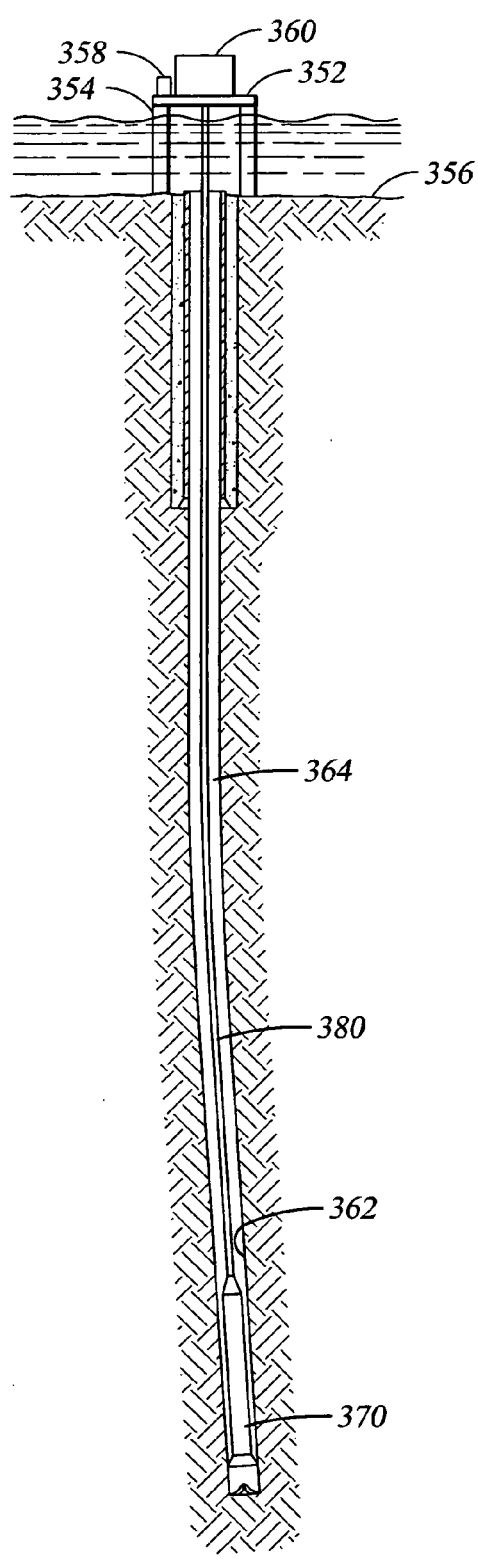
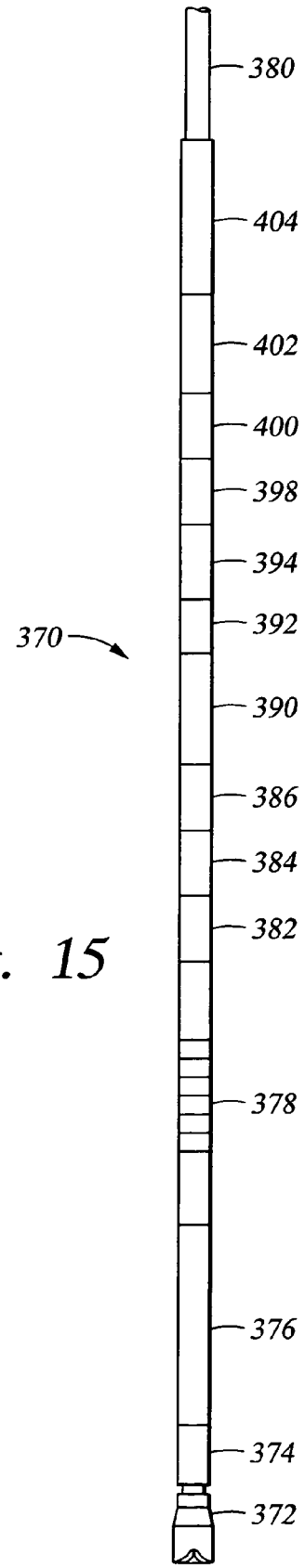
Fig. 14
Fig. 15

WELL SYSTEM

CROSS-REFERENCE TO RELATED APPLICATIONS

This application is a divisional of U.S. patent application Ser. No. 10/265,786 filed Oct. 7, 2002 and entitled "Well System", now U.S. Pat. No. 6,923,273, which claims the benefit of 35 U.S.C. 119(e) of U.S. provisional application Ser. No. 60/353,654, filed Feb. 1, 2002 and entitled Well System and is a continuation-in-part of U.S. patent application Ser. No. 09/911,963 filed Jul. 23, 2001 now U.S. Pat. No. 6,863,137 and entitled "Well System" which is a continuation application of U.S. patent application Ser. No. 09/081,961, filed May 20, 1998 and entitled "Well System," now U.S. Pat. No. 6,296,066, which claims the benefit of 35 U.S.C. 119(e) of U.S. Provisional Application Ser. No. 60/063,326, filed Oct. 27, 1997 and entitled "Drilling System", all hereby incorporated herein by reference. The present application is also related to the following applications: U.S. application Ser. No. 09/845,473, filed Apr. 30, 2001 and entitled Borehole Retention Assembly, U.S. application Ser. No. 09/739,072 filed Dec. 15, 2000 and entitled CT Drilling Rig; U.S. application Ser. No. 09/678,817, filed Oct. 4, 2000 and entitled Actuator Assembly; U.S. application Ser. No. 09/599,343, filed Jun. 22, 2000 and entitled Burst QAM Downhole Telemetry System, now U.S. Pat. No. 6,348,876; U.S. application Ser. No. 10/017,176, filed Dec. 7, 2001 and entitled Burst QAM Downhole Telemetry System; U.S. application Ser. No. 09/504,569, filed Feb. 15, 2000 and entitled Recirculatable Ball-Drop Release Device for Lateral Oilwell Drilling Applications, now U.S. Pat. No. 6,318,470; U.S. application Ser. No. 09/534,685, filed Mar. 24, 2000 and entitled Coiled Tubing Connector; U.S. application Ser. No. 09/377,982, filed Aug. 20, 1999 and entitled Electical Surface Activated Downhole Circulating Sub, now U.S. Pat. No. 6,349,763; U.S. application Ser. No. 09/502,317, filed Feb. 11, 2000 and entitled Coiled Tubing Handling System and Method, now U.S. Pat. No. 6,352,216; U.S. application Ser. No. 09/501,913, filed Feb. 10, 2000 and entitled Multi-String Composite Coiled Tubing Spooling Device; U.S. Provisional Application Ser. No. 60/269,280 filed Feb. 16, 2001 and entitled Length Correction System and Methods; U.S. application Ser. No. 10/071,279 filed Feb. 8, 2002 and entitled Length Correction System and Methods; U.S. Provisional Application Ser. No. 60/280,088, filed Mar. 20, 2001 and entitled Coiled Tubing Injection System; U.S. application Ser. No. 09/467,588, filed Dec. 20, 1999 and entitled Three Dimensional Steerable System; U.S. application Ser. No. 09/276,431, filed Mar. 25, 1999 and entitled Radiation Detector; U.S. application Ser. No. 09/286,362, filed Apr. 5, 1999 and entitled Casing Joint Locator Methods and Apparatus, now U.S. Pat. No. 6,411,084; U.S. patent application Ser. No. 10/121,399 filed Apr. 12, 2002 and entitled Magnetically Activated Well Tool; U.S. patent application Ser. No. 09/998,125, filed Nov. 30, 2001 and entitled Downhole Assembly Releasable Connection; U.S. Pat. No. 6,181,138; U.S. patent application Ser. No. 09/512,536 filed Feb. 24, 2000 and entitled Coil Tubing Winding Tool; U.S. Pat. No. 6,364,021; U.S. patent application Ser. No. 10/020,367 filed Dec. 12, 2001 and entitled Self Erecting Rig; U.S. patent application Ser. No. 10/016,786, filed Dec. 10, 2001 and entitled Casing While Drilling; U.S. patent application Ser. No. 10/032,272, filed Dec. 22, 2001 and entitled Coiled Tubing Inspection System Using Image Pattern Recognition; U.S. patent application Ser. No. 10/229,964 filed Aug. 28, 2002 and entitled Method and Apparatus for Removing Cuttings; U.S. patent application Ser. No. 60/416,020 filed Oct. 4, 2002 and entitled Method and Apparatus for Removing Cuttings from a Deviated Wellbore, U.S. patent application Ser. No. 10/262,136 filed Oct. 1, 2002 entitled Apparatus and Methods for Installing Casing in a Borehole; U.S. patent application Ser. No. 10/264,540 filed Oct. 4, 2002 and entitled Dual-Gradient Drilling Using Nitrogen Injection; U.S. patent application Ser. No. 10/264,577 filed Oct. 4, 2002 and entitled Well Control Using Pressure While Drilling Measurements; U.S. patent application Ser. No. 10/265,028 filed Oct. 4, 2002 and entitled Methods and Apparatus for Open Hole Drilling; and U.S. patent application Ser. No. 10/264,549 filed Oct. 4, 2002 and entitled Methods and Apparatus for Riserless Drilling; all hereby incorporated herein by reference in their entirety.

BACKGROUND OF THE INVENTION

The present invention relates to a system using a nonmetallic string attached to a downhole tool for performing a downhole operation in a well and more particularly includes a bottom hole assembly disposed on composite coiled tubing. In using the well system for drilling the well, the bottom hole assembly includes a power section for rotating a bit and a motive means for placing weight on the bit. One motive means is a propulsion system for moving the bottom hole assembly within the well.

Many existing wells include hydrocarbon pay zones which were bypassed during drilling and completion because such bypassed zones were not economical to complete and produce. Offshore drilling rigs cost approximately $40 million to build and may cost as much as $250,000 a day to lease. Such costs preclude the use of such expensive rigs to drill and complete these bypassed hydrocarbon pay zones. Presently, there is no cost effective methods of producing many bypassed zones. Thus, often only the larger oil and gas producing zones are completed and produced because those wells are sufficiently productive to justify the cost of drilling and completion using offshore rigs.

Many major oil and gas fields are now paying out and there is a need for a cost effective method of producing these previously bypassed hydrocarbon pay zones. The locations and size of these bypassed hydrocarbon zones are generally known, particularly in the more mature producing fields.

To economically drill and complete the bypassed pay zones in existing wells, it is necessary to eliminate the use of conventional rigs and conventional drilling equipment. One method of producing wells without rigs is the use of metal coiled tubing with a bottom hole assembly. See for example U.S. Pat. Nos. 5,215,151; 5,394,951 and 5,713,422, all hereby incorporated herein by reference. The bottom hole assembly typically includes a downhole motor providing the power to rotate a bit for drilling the borehole. The bottom hole assembly operates only in the sliding mode since the metal coiled tubing is not rotated at the surface like that of steel drill pipe which is rotated by a rotary table on the rig. The bottom hole assembly may include a tractor which engages the borehole wall and applies weight on bit. The tractor is self-propelled and may move in and out of the borehole pushing or pulling the coiled tubing. Another means of applying weight on bit is the use of a thruster. One type thruster pushes off the lower terminal end of the coiled tubing and does not rely upon contacting or gripping the inside wall of the borehole. The depth that can be drilled using a thruster is limited.

One such self-propelled tractor is manufactured by Western Well Tool for propelling a near conventional bottom hole assembly in the borehole. See U.S. Pat. No. 6,003,606, hereby incorporated herein by reference. The propulsion system includes an upper and lower housing with a packerfoot mounted on each end. Each housing has a hydraulic cylinder and ram for moving the propulsion system within the borehole. The propulsion system operates by the lower packerfoot expanding into engagement with the wall of the borehole with the ram in the lower housing extending in the cylinder to force the bit downhole. Simultaneously, the upper packerfoot contracts and moves to the other end of the upper housing. Once the ram in the lower housing completes its stroke, then the hydraulic ram in the upper housing is actuated to propel the bit and motor further downhole as the lower packerfoot contracts and resets at the other end of the lower housing. This cycle is repeated to continuously move the bottom hole assembly within the borehole. The tractor can propel the bottom hole assembly in either direction in the borehole. Flow passages are provided between the packerfeet and housings to allow the passage of drilling fluids through the propulsion system.

Various companies manufacture self-propelled tractors for propelling the bit and pulling steel coiled tubing in the well. These tractors include self-propelled wheels that frictionally engage the wall of the borehole. However, there is very little clearance between the wheels of the propulsion system and the wall of the borehole and problems arise when the wheels encounter ridges or other variances in the dimensions of the wall of the borehole. Further, at times there is an inadequate frictional engagement between the wheels and the wall of the borehole to adequately propel the tractor.

Other companies also offer tractors to walk the end of a wireline down a cased borehole. However, these tractors engage the interior wall of a casing having a known inside dimension. One such tractor is manufactured by Schlumberger.

The use of metal coiled tubing has various deficiencies. Metal coiled tubing tends to buckle the deeper the bottom hole assembly penetrates the borehole. Buckling is particularly acute in deviated wells where gravity does not assist in forcing the tubing downhole. As the tubing buckles, the torque and drag created by the contact with the borehole becomes more difficult to overcome and often makes it impractical or impossible to use coiled tubing to reach distant bypassed hydrocarbon zones. Further, steel coiled tubing often fatigues from cyclic bending early in the drilling process and must be replaced. It has also been found that coiled tubing may be as expensive to use as a conventional drilling system using jointed steel pipe and a rig.

The bottom hole assembly may also include an orienting tool such as a bent sub or housing for directing the trajectory of the borehole. Some types of orienting tools may be adjusted from the surface. Often, prior art orienting tools require a 360° rotation to ratchet to a new direction of inclination.

The bottom hole assembly may include various sensors such as a gamma ray and inclinometer instrument package adjacent the bit and a multiple depth dual frequency borehole compensated resistivity tool. These tools produce data indicating the inclination and azimuth of the bit and the position of the bottom hole assembly with respect to the formation. The bottom hole assembly may also include other sensors for providing other information, such as gyroscopic survey data, resistivity measurements, downhole temperatures, downhole pressures, flow rates, velocity of the power section, gamma ray measurements, fluid identification, formation samples, and pressure, shock, vibration, weight on bit, torque at bit, and other sensor data.

Prior art bottom hole assemblies for rotary drilling and for use with metal coiled tubing include electronic components for collecting data, processing the data downhole, and transmitting the processed information to the surface. The processed information may be transmitted to the surface either by conventional wirelines or by mud pulsed telemetry. In mud pulsed telemetry, the processed information is pulsed back to the surface through the mud column using a valve which opens and closes to produce the pulses. See U.S. Pat. No. 5,586,084. The transmission rate for mud pulsed telemetry, however, is limited.

The electronic components in the bottom hole assembly are also limited in the temperature that they can withstand. Once the environment of the electronic components is subjected to high temperatures, such as 350° F. or greater, for any extended period of time, some of the electronic components may stop functioning. Thus, electronic components, such as semiconductor chips, must be carefully produced and selected to ensure that they can withstand the anticipated heat, shock, and vibration of the bottom hole assembly. Since the life of the electronic components is a function of temperature over time, the higher the downhole temperature, the shorter the life of the electronic components. Thus, not only are the electronic components expensive, but the complexity of the equipment for processing the data downhole causes the bottom hole assemblies to be very expensive particularly for logging while drilling. Such electronic components also reduces the reliability of the bottom hole assembly.

Real time downhole data and information allows real time responses from the surface to downhole conditions. Often, particularly in existing wells, a well plan is designed with a geometric well path to the target hydrocarbon formation. Thus, it is beneficial to have real time information concerning directional drilling, geo-steering, formation evaluation, fluid evaluation, drilling dynamics, propulsion, and intervention, among others. The preferred information and data will vary depending upon the well plan. For example, real time data and information on all of the parameters and characteristics that are determined with logging while drilling and pay zone steering while drilling are beneficial.

Real time information relating to formation evaluation includes information from acoustic caliper tools, neutron porosity tools, formation bulk density tools, sonic tools, and formation resistivity tools. Real time information relating to fluid evaluation includes information from formation testers and magnetic resonance imaging tools indicating various characteristics of the fluids in the surrounding formation including their transportability, identification, and composition.

Real time information on directional drilling and geo-steering includes information on natural gamma radiation, formation resistivity, and azimuth and inclination, including inclination at bit, all of which facilitate pay zone steering from the surface. Accelerometers and inclinometers provide information for directional control.

Real time information on drilling dynamics includes information on weight on bit (WOB), torque at bit (TOB), and pressure while drilling (PWD) including both pressure and temperature. Real time information and data received at the surface and processed by computer would allow instructions to be given to the bottomhole assembly such that the bit RPM and applied weight on the bit could be modified to optimize rate of penetration (ROP) and reduce bit bounce and bit balling. Flow rates and flow pressure could also be modified to improve ROP. See U.S. Pat. No. 5,842,149.

Various real time information and data on downhole parameters and characteristics are beneficial including downhole temperatures, operating temperatures, downhole pressures, operating pressures, annular pressure, pipe pressure, formation pressure, and pressure sampling. Other types of data which may be transmitted to the surface include inclination, azimuth, gyroscopic survey data, resistivity measurements, magnetic resonance (MRI), sonic, neutron density, density, fluid identification, gyroscopic surveying, porosity, flow rates, rpms of the power section, gamma ray measurements, fluid identification, formation samples and other data relating to direction and formation characteristics. Other data relating to drilling includes shock, vibration, weight on bit, torque at bit, rate of penetration, motor rpms, differential pressure across the motor, and other data and information relating to drilling performance parameters.

It is particularly advantageous to provide real-time hydraulics analysis such as the pressure in the annulus of the borehole around the bottomhole assembly. High value wells require a downhole pressure sensor while shallow wells may not require downhole pressure sensors. Bottom hole pressure measurements are particularly beneficial during operating modes including drilling, tripping, circulating, and static modes. These real-time measurements could be used for equivalent circulating density (ECD) monitoring, preventing excessive swab-surge pressures during tripping, and optimizing hole cleaning. In addition, pressure measurement could be used for performing leak off tests, detecting flow in/or kick during drilling, and optimizing drilling practices. Downhole pressure while drilling real-time would be extremely valuable to the operator.

Downhole pressure is a key parameter in drilling. Knowing downhole pressure allows for the adjustment of the wellbore pressure. If wellbore pressure is allowed to decrease below the pore pressure at a certain depth, formation fluids will enter the well. If wellbore pressure exceeds fracture pressure at a certain depth, the formation will fracture and wellbore fluids may enter the formation. Conventionally, downhole pressure is determined by calculating hydrostatic pressure and equivalent circulating density.

It would be valuable to be able to measure downhole pressure particularly in certain situations. During well control due to a kick, circulation is normally stopped to allow the downhole pressure to stabilize and to eliminate any dynamic component of wellbore pressure, while the well is fully shut in. Mud pulse telemetry cannot be used when there is no circulation and thus the operator does not know real-time downhole pressure. Also, it is valuable to know real-time downhole pressure when the drill string becomes stuck. A stuck drill string may prevent circulation. There are other situations where real-time downhole pressure measurement is helpful such as during a leak off test.

Some drilling operations seek to determine formation pressure using measurement while drilling (MWD) techniques. One deficiency of the prior art MWD methods is that all tools transmit pressure measurement data back to the surface on an intermittent basis. Many MWD tools incorporate several measurement tools, such as gamma ray sensors, neutron sensors, and density sensors, and typically only one measurement is transmitted back to the surface at a time. Thus, the interval between pressure data being reported may be as much as 2 minutes. It would be advantageous to provide a high data transmission rate to the surface, eliminate most of the electronics of prior art bottom hole assemblies, and to enhance the reliability and speed of transmission of the data to the surface.

Transmitting the data back to the surface can be accomplished by one of several telemetry methods. One typical prior art telemetry method is mud pulse telemetry. A signal is transmitted by a series of pressure pulses through the drilling fluid. These small pressure variances are received and processed into useful information by equipment at the surface. Mud pulse telemetry does not work when fluids are not being circulated or are being circulated at a slow rate. Therefore, mud pulse telemetry and therefore standard MWD tools have very little utility when the well is shut in and fluid is not circulating.

Although MWD tools can not transmit data via mud pulse telemetry when the well is not circulating, many MWD tools can continue to take measurements and store the collected data in memory. The data can then be retrieved from memory at a later time when the entire drilling assembly is pulled out of the hole. In this manner, the operators can learn whether they have been swabbing the well, i.e. pulling fluids into the borehole, or surging the well, i.e. increasing the wellbore pressure, as the drill string moves through the wellbore. Thus, the data is used for analysis after the fact, as opposed to being used in real-time operations.

Another telemetry method of sending data to the surface is electromagnetic telemetry. A low frequency radio wave is transmitted through the formation to a receiver at the surface. Electromagnetic telemetry is depth limited, and the signal attenuates quickly in water. Therefore, with wells being drilled in deep water, the signal will propagate fairly well through the earth but it will not propagate through the deep water. This method is also highly dependent on formation resistivity and degrades rapidly in less resistive formations typical in deepwater. Thus, a subsea receiver would have to be installed at the mud line, which may not be practical.

Thus, there remains a need in the art for methods and apparatus for determining and adjusting wellbore pressure based on real-time pressure data received from the bottom of a well. Therefore, the embodiments of the present invention are directed to methods and apparatus for using real-time pressure data to automate pressure control procedures that seek to overcome the limitations of the prior art.

The present invention overcomes the deficiencies of the prior art.

SUMMARY OF THE INVENTION

The downhole system of the present invention conveys a well apparatus in a well and includes a bottom hole assembly attached downhole to a composite coiled tubing. The downhole system uses the unique properties of the composite coiled tubing to provide real time downhole data and information for processing at the surface and, when using a propulsion system in the bottomhole assembly, to extend the reach of bottom hole assemblies into deviated and horizontal subterranean boreholes to over twice and as many as 5 to 10 times the reach previously accomplished by prior art systems. The apparatus used in the downhole system is lighter and more compact than that of other prior art systems including existing tubulars and rigs. The complexity and cost of moving, lifting and installing the downhole system and the space and structural strength required to deploy it are minimal compared to prior art oil and gas rotary drilling rigs or metallic coiled tubing units.

The system of the present invention preferably includes a composite coiled tubing having a inner fluid impermeable liner, multiple load carrying layers, and an outer wear layer. The load carrying layers are preferably resin fibers braided around the inner liner. Multiple electrical conductors and/or data transmission conductors are embedded in the load carrying layers for carrying electric current and transmitting data between the bottom hole assembly and the surface. Also, a plurality of sensors are disposed in the bottomhole assembly and may be mounted on one or more of the data transmission conduits along the length of the composite coiled tubing.

In one embodiment the downhole system is used for drilling a wellbore. The drilling assembly includes a composite coiled tubing and a drilling assembly attached to the coiled tubing. The drilling assembly has a bit and a downhole motor. The drilling assembly also includes a one-way valve to only allow fluids to flow down through the composite coiled tubing and drilling assembly. The downhole motor may be either instrumented or not. The drilling assembly may or may not have a conductor extending through the wellbore between the surface and the bottom hole assembly. For example, a conductor may extend through the flowbore of the coiled tubing or down along the outside of the coiled tubing. Preferably a conductor may be embedded in wall of the composite tubing to provide power to the downhole motor and/or to provide telemetry means communicating the drilling assembly with the surface. The conductor is connected to at least one sensor in the drilling assembly to measure downhole data and information such as downhole pressure which may be communicated with the surface for processing. The drilling assembly further includes motive means to place weight on the bit.

In another embodiment the bottom hole assembly includes a bit, a gamma ray and inclinometer and azimuth instrument package, a propulsion system with steerable assembly, an electronics section, a resistivity tool, a transmission and a power section for rotating the bit. The electrical conductors in the composite coiled tubing provide power to the electronics section and may provide power to the power section. The data transmission conduits in the composite coiled tubing may be fiber optic cables which transmit to the surface the data from various sensors in the composite coiled tubing and/or the bottomhole assembly.

The propulsion system includes a housing having an upstream section with a traction module and a downstream section with a traction module. The traction modules are each connected to a ram mounted in a cylinder within one of the housing sections for propelling the bottom hole assembly up and down the borehole. In operation, one of the traction modules expands to engage the borehole while the hydraulic ram forces the bit downhole and pulls the coiled tubing forward and the other traction module moves to the other end of its housing section in preparation for actuating its ram to move the bit further downhole. The housing of the propulsion system includes a flow bore through which may extend an output shaft operatively connected to the power section on one end and to the bit on the other end.

The steerable assembly may be of various types for changing the trajectory of the well. One embodiment of the steerable assembly includes a body having a nose connected to the body by a jointed connection with the nose operatively connected to the bit. An actuator is movably mounted on the body and engages the nose to move the nose with respect to the body at the jointed connection to alter the nose axis with respect to the body axis at the jointed connection. The actuator has a first position altering the nose axis with respect to the body axis forming a first direction of drilling of the bit and a second position altering the nose axis with respect to the body axis forming a second direction of drilling. The actuator alters the nose axis from the first position to the second position while the bit is in the borehole and may alter the positions while the assembly is drilling.

The drilling system also includes a method and apparatus for setting pipe in the new borehole without the use of a rig. Casing rams are used to install the production string in the well.

One advantage of the drilling system of the present invention is the drilling of wells without using a drilling rig. The drilling system may be operated from a vessel and use a subsea drilling template. However, no rig, jack up, or floater is required. The drilling system of the present invention is a rigless coiled tubing drilling system and can be used for not only reentering existing wells but also for drilling new wells.

Another advantage of the drilling system of the present invention is the significant reduction of the number of crew required to operate the system.

A further advantage is the use of a non-metallic drill string. The elimination of steel work strings enables the elimination of a drilling rig otherwise required to handle metal pipe.

Another advantage of the composite coiled tubing of the present invention is that the multiple lengths of pipe do not have to be connected and disconnected at the surface to the same extent as required for jointed steel drill pipe using rigs.

A further advantage of composite coiled tubing is the ability to drill and complete the well at near balance or under balanced. By drilling and completing the well at near balance with the fluid column pressure approximately the same as the formation pressure, less damage is caused to the producing formation.

Another advantage of the present invention is the use of a bottom hole assembly which is anchored to the borehole thus minimizing much of the vibration encountered by conventional bottom hole assemblies. Vibration, harmonics and shock are very damaging to conventional bottom hole assemblies and particularly the electronic components in such assemblies.

Another advantage of the present invention is the use of electrical conductors extending through the composite coiled tubing. By conducting electrical power between the surface and the bottom hole assembly, alternators and batteries are no longer required in the bottom hole assembly to operate the electronic components.

A further advantage of the present invention is the use of data transmission conduits, such as copper wire, fiber optic cable or coaxial cable, passing through the wall of the composite coiled tubing. Such data transmission conductors allow the transmission of raw data received by the sensors in the bottom hole assembly for real time transmission directly to the surface without exposing the wire which could then be damaged. The data then can be processed at the surface rather than downhole such as in a conventional bottom hole assembly. By processing the data at the surface, larger and more sophisticated and less expensive computer processing systems may be used for analyzing the data. Further, the electronics required in conventional bottom hole assemblies for processing the data downhole may be eliminated thereby reducing the cost of expensive and somewhat fragile downhole electronic components. A still another advantage of using data transmission conduits in the composite coiled tubing is the ability to transmit the data directly to the surface faster and with greater reliability. The conventional process of pulsing the data through the mud column to the surface is eliminated.

Another advantage of the present invention is the use of connectors for connecting lengths of composite coiled tubing including the connection of the electrical and data transmission conduits.

A further advantage of the present invention is the use of an efficient, reliable and less expensive downhole propulsion system and survey system for accurate directional drilling.

Other objects and advantages of the present invention will appear from the following description.

BRIEF DESCRIPTION OF THE DRAWINGS

For a detailed description of a preferred embodiment of the invention, reference will now be made to the accompanying drawings wherein:

FIG. 14 is a schematic view of an example well for a gravity based drilling assembly adapted for drilling subsea wells;

FIG. 15 is an enlarged view of the bottom hole assembly shown in FIG. 14 connected to the downstream end of non-conductor composite coiled tubing.

DESCRIPTION OF THE PREFERRED EMBODIMENTS

Figures 1A, 1B:
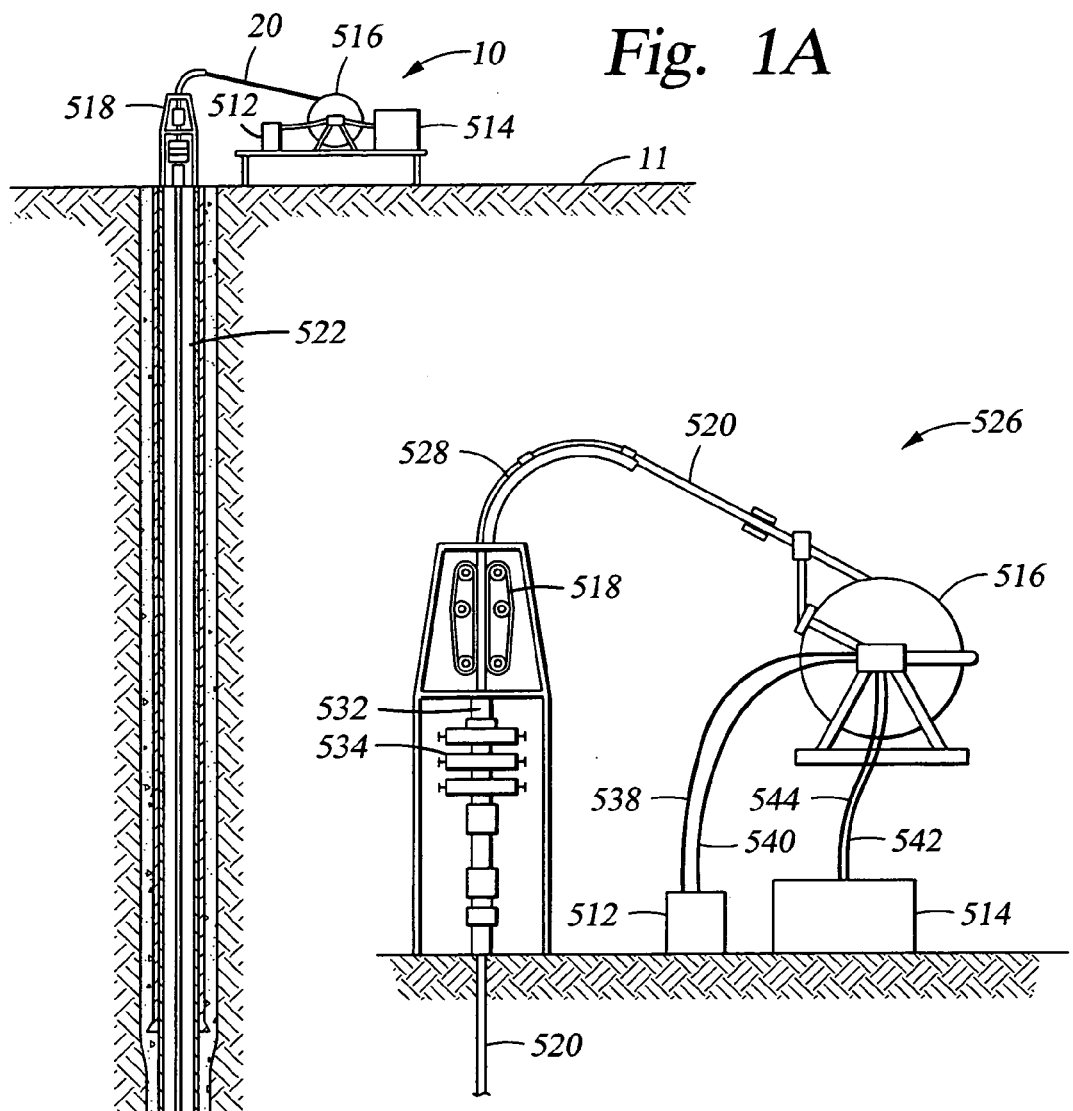
FIG. 1A is a schematic view of an example well.
FIG. 1B is an enlarged view of a portion of the schematic of FIG. 1A showing the surface apparatus for the well.

The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein.

The system of the present invention includes a composite coiled tubing having a bottom hole assembly attached. Various embodiments of the present invention provide a number of different constructions of the bottom hole assembly, each of which is used for a downhole operation in one of many different types of wells including a new well, an extended reach well, extending an existing well, a side-tracked well, a deviated borehole, and other types of boreholes. It should be appreciated that the bottom hole assembly may be only a downhole tool for performing an operation downhole in the well. Often the downhole operation relates to the drilling and completing of a pay zone in the well but the present invention is not limited to such operations. The embodiments of the present invention provide a plurality of methods for using the system of the present invention. It is to be fully recognized that the different teachings of the embodiments discussed below may be employed separately or in any suitable combination to produce desired results in a downhole operation. In particular the present system may be used in practically any type of downhole operation.

Referring initially to FIG. 1A, there is shown an exemplary operating environment for the present invention. Coiled tubing operation system 10 includes a power supply 512, a surface processor 514, and a coiled tubing spool 516. An injector head unit 518 feeds and directs a work string or coiled tubing 20 from the spool 516 into the well 522. A bottom hole assembly 30 is shown attached to the lower end of composite coiled tubing 20 and extending into a deviated or horizontal borehole 12. It should be appreciated that this embodiment is described for explanatory purposes and that the present invention is not limited to the particular borehole disclosed, it being appreciated that the present invention may be used for various well plans. Examples of drilling rigs are found in U.S. patent application Ser. No. 09/739,072 filed Dec. 15, 2000; and U.S. patent application Ser. No. 10/020,367 filed Dec. 12, 2001 and entitled Self Erecting Rig; both hereby incorporated herein by reference.

FIG. 1B illustrates coiled tubing unit 526 utilizing spool 516 for feeding composite tubing 20 over guide 528 and through injector 518 and stripper 532. The composite coiled tubing 20 is forced through blowout preventer 534 and into well 522 by injector 518. Power supply 512 is electrically connected by electrical conduits 538, 540 to electrical conduits in the wall of composite coiled tubing 20. The coiled tubing unit 526 may also include a coiled tubing inspection system. See U.S. patent application Ser. No. 10/032,272 filed Dec. 22, 2001, hereby incorporated herein by reference. Further, the surface processor 514 includes data transmission conduits 542, 544 connected to data transmission conduits also housed in the wall of composite coiled tubing 20. It should be appreciated that power conduits 538, 540 and data transmission conduits 542, 544 housed within the composite tubing wall extend along the entire length of composite coiled tubing 20 and are connected to the supervisory module 580, hereinafter described, disposed in bottom hole assembly 30. The power conduits and data conduits preferably comprise an economical, low-resistance conductive material such as stranded copper wire. See U.S. patent application Ser. No. 09/081,961 filed May 20, 1998 and entitled Drilling System, now U.S. Pat. No. 6,296,066, and U.S. Provisional Application Ser. No. 60/063,326, filed Oct. 27, 1997 and entitled "Drilling System", both hereby incorporated herein by reference.

Figure 1C:
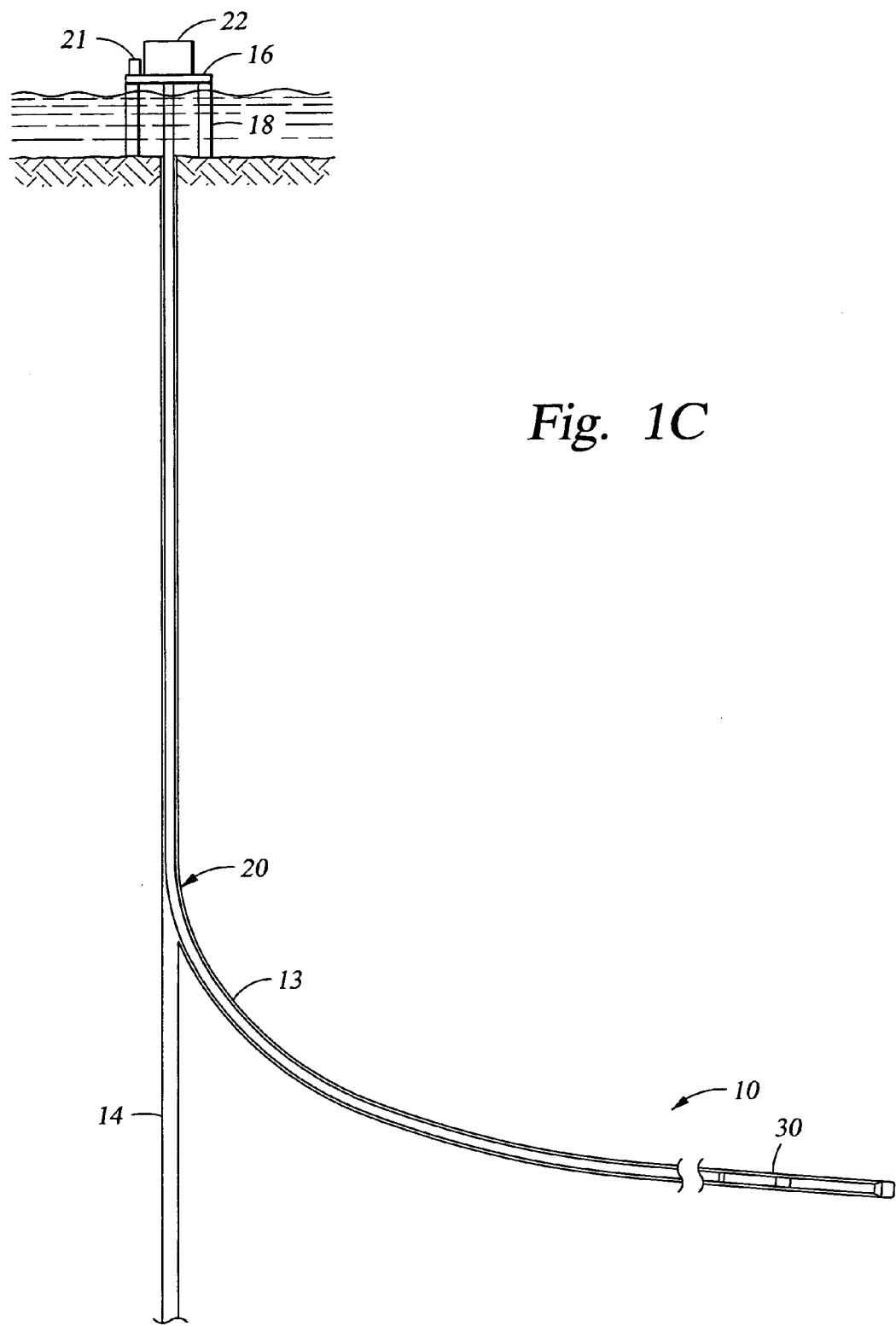
FIG. 1C is a schematic of an elevation view of the drilling system of the present invention in a typical drilling application for a well.

Referring now to FIG. 1C, there is shown a schematic for using the drilling system 10 in a sidetracked well 13 which deviates from an existing well 14. The drilling system 10 extends from the floor 16 of an existing platform 18 previously used to drill, complete, and produce existing well 14. Various controls 21 are disposed at the surface on the platform 18 for receiving and sending signals downhole. Such controls are well known in the art. It should be appreciated that blowout preventers and other requisite safety control equipment 22 would be disposed on platform floor 16 for drilling and completing well 13. It should also be appreciated that the sidetracked well 13 is merely exemplary for describing the drilling system 10 and its operation in a typical application of the present invention and should in no way be considered as limiting the present invention to sidetracked wells.

A composite coiled tubing 20 serves as the work string and has various optimal characteristics including tensile strength to withstand tension placed on the tubing, yield strain to allow the tubing to be spooled, yield stress, i.e., hoop stress, to withstand differential pressures, and weight to allow the tubing to be substantially neutrally buoyant.

Young's modulus relates to the tensile strength of the pipe, although not exactly a 1 to 1 ratio. Thus, the higher the Young's modulus for the tubing, the higher the tensile strength. It is important that the tensile strength of the pipe be maximized so that a predetermined tension force may be applied to pull on the work string.

However, a strong tubing is also a stiff tubing. It is necessary that the tubing be flexible so that it is bendable and spoolable. The coiled tubing must be bendable so that it can pass over the gooseneck. It must also be bendable to a certain diameter so that it is spoolable such that the coiled tubing may be transported on spools and may be unspooled and then spooled into and out of the well. Therefore the Young's modulus for the tubing is reduced so that the tubing is bendable and yet great enough that it has sufficient strength to be pulled.

The standard diameter of a spool used for spooling the composite coiled tubing is 13 feet. However, the real limitation is what diameter spool can really be handled. The limit of the reel diameter is a practical limit of actually moving the reel. Once the reel diameter gets so large that it can not be transported, that is the practical limit. The spool for a drilling vessel must be large enough to spool the tubing from the dock so that the tubing may be spooled directly onto the ship. The maximum diameter may be 40 feet. The highway regulations for trucks limit the diameter of the spool to allow the truck and spool to pass underneath bridges and the like. The spool with flanges for a truck may have a maximum diameter of approximately 13 feet. Further as the pipe diameter goes up, the diameter of the core of the spool must also increase. An example of a multi-string composite coiled tubing spooling device can be found in U.S. patent application Ser. No. 09/501,913 filed Feb. 10, 2000, hereby incorporated herein by reference. An example of a coiled tubing handling system can be found in U.S. patent application Ser. No. 09/502,317 filed Feb. 11, 2000, now U.S. Pat. No. 6,352,216, hereby incorporated herein by reference.

The operative salient properties of the composite coiled tubing are a composite tube having an axial component of the modulus of elasticity with a Young's modulus in the range of 500,000 to 5,000,000 psi. The preferred range of Young's modulus is from 500,000 to 2,000,000 psi. The composite tube is non-isotropic and the modulus of elasticity is not the same in all axes nor is it linear. Embodiments of the pipe may be constructed of fibers such as nonmetallic fibers, metallic fibers, or a mixture of nonmetallic and metallic fibers. One embodiment includes a tube constructed from helically wound or braided fiber reinforced thermoplastic or fiber reinforced thermosetting polymer or epoxy. The fiber may be non-metallic or metallic or a mixture of metallic and non-metallic materials.

The following is a comparison of bending strain between steel and composite coiled tubing:

For 2⅞" steel tubing; typical yield stress $\theta_y$=80,000 psi
Therefore the yield strain $\epsilon_y=\theta_y/E$ where E is the Young's Modulus of the material.
Since $E_{steel}$=30×10$^6$ psi, then, $\epsilon_{y(steel)}$=80000/30000000=0.00267 in/in
In the same manner for composite tubing; $E^{composite}$=1.43× 10$^6$ psi; and typically $\theta_{y(composite)}$=26000 psi
Therefore, $\epsilon_{y(composite)}$=26000/1430000=0.01818 in/in, i.e. 1.8%.

The maximum bending strain before yielding composite pipe is 6.81 times higher than for steel. For bending calculation, see "Mark's Standard Handbook for Mechanical Engineers," Baumeister, Theodore, Avallone, Eugene A., Baumeister, Theodore III, Eighth Edition, McGraw-Hill Book Company, New York, 1978, pg. 5–54, incorporated herein by reference.

The yield strain is calculated by dividing the yield stress by Young's Modulus. Therefore if the yield stress of the tubing is 26,000 psi, then in dividing by the Young's modulus range, one can determine the range of yield strain to achieve spoolable tubing. The range is dictated by the smallest diameter spool to be used for the tubing. The yield stress is related to the engineering of fiber used in the composite coiled tubing. In determining the yield strain range it is preferred to lower the yield stress and the Young's modulus is lowered and it is not preferred to maintain one strength divided by different Young's modulus in the range. The ratio of the strength and the modulus are raised and lowered together allowing the range of the yield strain to be smaller. Thus, it is preferred to hold the yield strain constant allowing the optimum to be in the middle of the range as the stiffness in the tubing is varied.

The above calculation of yield strain with a yield stress of 26,000 psi and a Young's modulus of 1,430,000 psi was 1.8%. If the yield stress of 26,000 psi were constant, a lower Young's modulus of 500,000 psi provides a yield strain of 1.3% and a higher Young's modulus of 2,000,000 psi provides a yield strain of 5.2%. A 2% yield strain is preferred for composite coiled tubing being spooled on standard reels having a core diameter of 13 feet. If the diameter of the spool is tripled, the yield strain would be approximately 0.5% which is the approximate lower limit of the yield strain of the tubing. If the composite coiled tubing has a 2,000,000 Young's modulus, then the coiled tubing would preferably have a strength approaching 30,000 psi providing a yield strain of 1.5%.

As the tubing diameter goes up, the spool core also is increased because the composite coiled tubing preferably has 2% strain as it is coiled onto the spool. Thus a 2% strain is used to be able to bend the tubing around the spool. If the strain is reduced by reducing Young's modulus, then the strength of the tubing is also reduced.

The upper limit of the yield strain depends upon manufacturing capability. If a thermal plastic or thermal setting is used, the tubing can be very strong and the modulus of elasticity is therefore high. Presently, the upper practical limit is approximately 3%. Thus the range of yield strain is from approximately ½% to 3.0%. Most preferably the yield strain is approximately 2%.

Using the above formula having the parameters modulus elasticity, yield stress and yield strength, the range of yield stress may be calculated using the range of the modulus of elasticity between 500,000 and 2,000,000 and the range of yield strain, i.e., ½% to 3.0%, and more preferably the preferred yield strain of approximately 2%. The important forces on the tubing are tension and yield stress.

The following provides a comparison of the forces required to pull either steel or composite coiled tubing illustrating the ability of a system with a downhole propulsion system and composite coiled tubing to move deeper into the borehole and to be retrieved from the borehole.

The force needed to pull either steel or composite coil tubing to overcome simple sliding friction is:

The pull force required for steel tubing ($F_{steel}$):

$$F_{steel} = \mu * W_{steel} * K_{steel} * L_{steel}$$

Where, $\mu$=coefficient of friction of wellbore (assume 0.5)

$W_{steel}$=weight per foot of steel=4.53 lb/ft (2⅞" OD×5/16" wall)

$K_{bsi}$=buoyancy factor for steel in 12.5 ppg mud=0.809

$L_{steel}$=length of pipe in horizontal=10000 ft.

Therefore, the force required to pull 10000 ft. of steel is:

$F_{steel}$=18,324 lbs.

In the same manner for composite;

$\mu$=coefficient of friction of wellbore (assume 0.5)

$W composite_1$=weight per foot of composite=1.7 lb/ft (2⅞" OD×5/16" wall)

$K_{bcomposite}$=buoyancy factor for composite in 12.5 ppg mud=0.0157

$L_{composite}$=length of pipe in horizontal=10000 ft.

Therefore, the force required to pull 10000 ft. of composite is:

$F_{composite}$=133 lbs.

The force required to pull 10000 ft. of steel pipe is 138 times greater than the force required to pull the same amount of composite pipe. For friction calculation, see "Mark's Standard Handbook for Mechanical Engineers," Baumeister, Theodore, Avallone, Eugene A., Baumeister, Theodore III, Eighth Edition, McGraw-Hill Book Company, New York, 1978, pg. 3–24 to 3–27, incorporated herein by reference.

Figure 11:
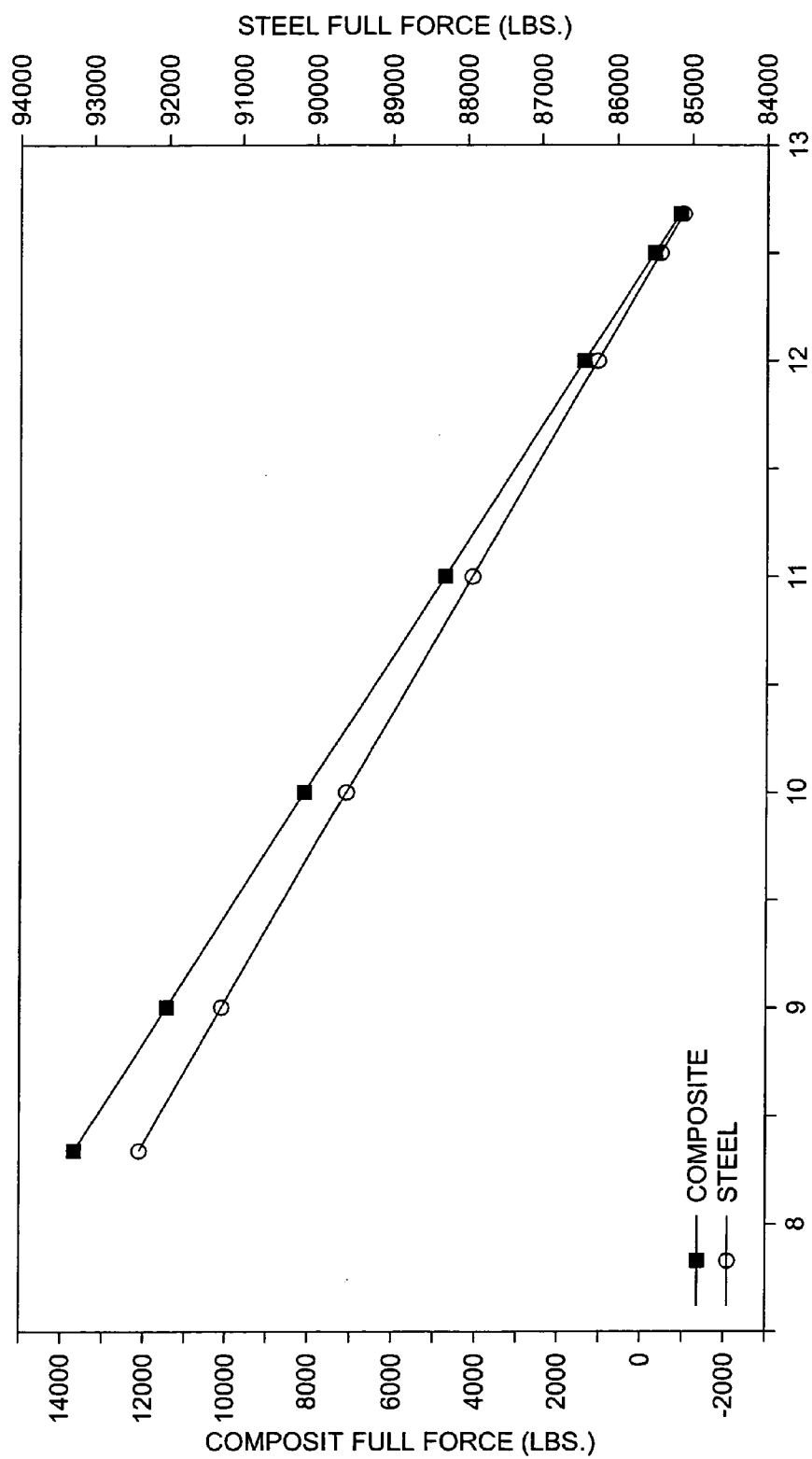
FIG. 11 is a graph comparing pull forces versus mud weight on composite an steel coil tubing.

Referring now to FIG. 11, there is shown a graph comparing the pull forces needed to drill a 50,000 foot lateral well using either composite or steel coil tubing under different buoyancy conditions, i.e. the normal mud weight range of between approximately 8 to 13 pounds. The mud weight could possibly get heavier than that indicated on FIG. 11 and could be regulated to go up to 18 pounds. The mud weight would not get lighter than that shown in FIG. 11. Water is about 8 pounds and oil mud is approximately 7.9 pounds. FIG. 11 is directed to a composite coiled tubing having a length of 50,000 feet with an assumed friction factor for that length of tubing in a 50,000 foot lateral well bore. FIG. 11 shows the difference in force between composite coiled tubing (black squares) and the force on steel pipe (circles). The steel tubing is almost an order of magnitude greater. If there were not a difference in scales, the two charts could not be on the same page. FIG. 11 shows the axial force applied to the tubing for a particular mud weight.

The break strength of the tubing relates to the tensile strength of the composite coiled tubing. FIG. 11 shows a range of tensile strength required for the composite coiled tubing.

The composite coiled tubing preferably is made of a material having a density with a specific gravity in the range of 0.99 grams per cubic centimeter to 2.9 grams per cubic centimeter. Unless defined otherwise, the term composite coiled tubing as used in the present application shall mean a continuous spoolable or segmented and connected tubular string having the characteristics set forth above. It should be appreciated that the composite coiled tubing may be jointed composite pipe having conductors in the wall of that pipe. The advantage of having jointed composite tubing is that it is easier to move the pipe onto location rather than using very large spools. Also the jointed tubing may be rotated. It should be appreciated that although the pipe described above for the present invention does not include coiled tubing, various components of the present invention may be adapted for use with coiled tubing particularly with short reach wells and with smart tractors.

The composite coiled tubing 20 with the above characteristic provides many advantages. The low modulus of elasticity permits a large tube to be reeled onto a small diameter spool without yielding the material of the coiled tubing 20. The tube does not fatigue in bending. The lower modulus may allow an indefinite fatigue life of the coiled tubing from coiling on the spool. Further, the lower modulus provides a very low drag when the coiled tubing is forced around short radius bends and curvatures in the borehole as the coiled tubing goes in and out of the well. The low density allows the tube to be light weight for transporting and lifting. Also the buoyancy of the tube in the wellbore can be adjusted by using an appropriately weighted mud or by specifically engineering the tube. A 12.9 pound per gallon mud achieves a neutral buoyancy of the tube in the most preferred geometry. Having a buoyancy close to the weight of the drilling fluids allows a minimum frictional drag on the borehole wall due to gravity as the coiled tubing moves in and out of the borehole. This is particularly advantageous when relying on a propulsion system as the motive means for the bottom hole assembly and bit.

An example of a length correction system and method used with composite coiled tubing is found in U.S. patent application Ser. No. 60/269,280 and U.S. patent application Ser. No. 10/071,279 filed Feb. 8, 2002 and entitled Length Correction System and Methods, both hereby incorporated herein by reference.

Figure 2:
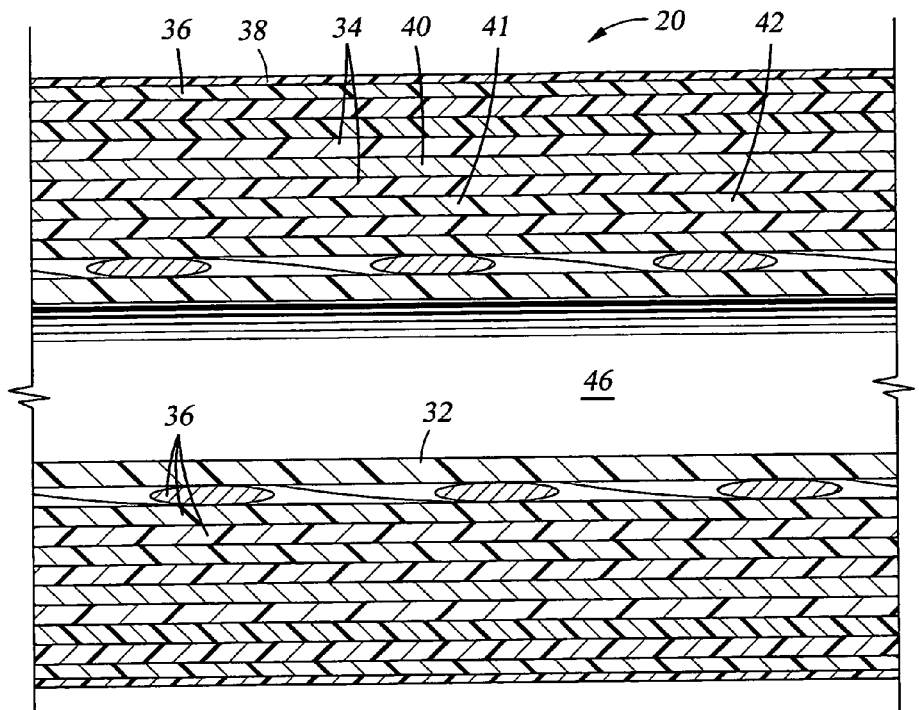
FIG. 2 is a cross-section view of the composite coiled tubing of the present invention.
Figure 3:
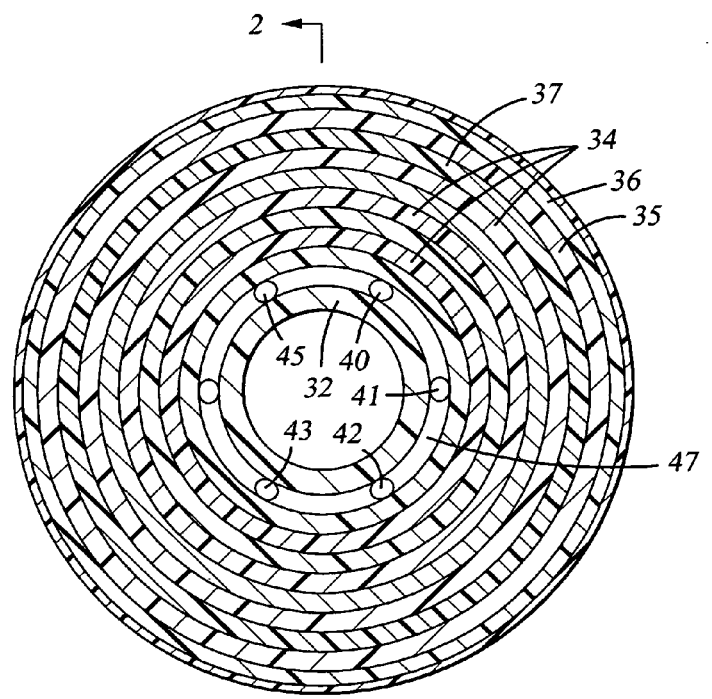
FIG. 3 is a cross-sectional view taken of plane 3—3 in FIG. 2 of the composite coiled tubing having electrical conductors and data transmission conductors.

Referring now to FIGS. 2 and 3, the tube for coiled tubing 20 is preferably of a composite material having the characteristics described above. Composite coiled tubing 20 preferably has an impermeable fluid liner 32, a plurality of load carrying layers 34, and a wear layer 36. As best shown in FIG. 3, a plurality of conductors 40 are embedded in the load carrying layers 34. These conductors 40 may be conductors, such as electrical conductors 41 for transmitting electrical power, and/or conductors for transmitting data, such as data transmission conductors 42. One or more of the conductors 40 may include a plurality of sensors. It should be appreciated that the conductors may be passages extending the length of coiled tubing 20 for the transmission of pressure fluids.

Smart wells include sensors and conductors for transmitting to the surface the data and information measured and collected by downhole sensors. The data transmission conductors 42 may be electrical wires, fiber optics, hydraulic, or other type data conductors. It should be appreciated that the conductors 42 include electrical, fiber optics, coaxial cable, and any other means by which information or instrument commands can be delivered. Fiber optics are able to quickly transmit real time a large amount of data and information to the surface. For example, fiber optics may be used to measure downhole temperature and pressure and transmit those measurements to the surface real time for well control. Smartwells are also able to control various reservoir fluids and zones. Additionally, smartwell installation can be integrated with the composite coiled tubing 20 for long-term real-time reservoir dynamic process monitoring and management.

Conductors 42 embedded in the wall of the composite coiled tubing 20 transmit real time data and information to the surface for analysis and processing. Fiber optics may be preferred since fiber optics can transmit more data than electrical conductors and may be more easily fine tuned and used. A mini production satellite unit having a communications system may then be used to send the data and other production information to a central location. Commands and data transmitted from completion or drilling systems may be transmitted by acoustic, vibrations, hydraulic, radio frequency, short or broad band, or any other energy mechanism. For example, based on the data and information of the sensors, completions devices may be opened, closed, adjusted or otherwise manipulated by means of commands or signals transmitted to the devices through the conductors. See U.S. Pat. No. 6,257,332, hereby incorporated herein by reference.

Types of composite tubing are shown and described in U.S. Pat. Nos. 5,018,583; 5,097,870; 5,176,180; 5,285,008; 5,285,204; 5,330,807; 5,348,096; and 5,469,916, each of these patents is incorporated herein by reference. See also "Development of Composite Coiled Tubing for Oilfield Services," by A. Sas-Jaworsky and J. G. Williams, SPE Paper 26536, 1993, incorporated herein by reference. U.S. Pat. Nos. 5,172,765; 5,234,058; 5,437,899; and 5,540,870, each of these patents being incorporated herein by reference, disclose composite rods, electrical or optical conductors housed in a composite cable.

The impermeable fluid liner 32 is an inner tube preferably made of a polymer, such as polyvinyl chloride or polyethylene or PDVF. Liner 32 can also be made of a nylon, other special polymer, or elastomer. In selecting an appropriate material for fluid liner 32, consideration is given to the chemicals in the drilling fluids to be used in drilling the sidetracked well 13 and the temperatures to be encountered downhole. The primary purpose for inner liner 32 is as an impermeable fluid barrier since carbon fibers are not impervious to fluid migration particularly after they have been bent. The inner liner 32 is impermeable to fluids and thereby isolates the load carrying layers 34 from the drilling fluids passing through the flow bore 46 of liner 32. Inner liner 32 also serves as a mandrel for the application of the load carrying layers 34 during the manufacturing process for the composite coiled tubing 20.

The load carrying layers 34 are preferably a resin fiber having a sufficient number of layers to sustain the required load of the work string 20 suspended in fluid, including the weight of the composite coiled tubing 20 and bottom hole assembly 30.

The fibers of load carrying layers 34 are preferably wound into a thermal setting or curable resin. Carbon fibers are preferred because of their strength, and although glass fibers are not as strong, glass fibers are much less expensive than carbon fibers. Also, a hybrid of carbon and glass fibers may be used. Thus, the particular fibers for the load carrying layers 34 will depend upon the well, particularly the depth of the well, such that an appropriate compromise of strength and cost may be achieved in the fiber selected. Typically an all carbon fiber is preferred because of its strength and its ability to withstand pressure.

Load carrying fibers 34 provide the mechanical properties of the composite coiled tubing 20. The load carrying layers 34 are wrapped and braided so as to provide the composite coiled tubing 20 with various mechanical properties including tensile and compressive strength, burst strength, flexibility, resistance to caustic fluids, gas invasion, external hydrostatic pressure, internal fluid pressure, ability to be stripped into the borehole, density i.e. flotation, fatigue resistance and other mechanical properties. Fibers 34 are uniquely wrapped and braided to maximize the mechanical properties of composite coiled tubing 20 including adding substantially to its strength.

A wear layer 36 is preferably braided around the outermost load carrying layer 34. The wear layer 36 is a sacrificial layer since it will engage the inner wall of the borehole 12 and will wear as the composite coiled tubing 20 is tripped into the well 12. Wear layer 36 protects the underlying load carrying layers 34. One preferred wear layer is that of Kevlar™ which is a very strong material which is resistant to abrasion. Although only one wear layer 36 is shown, there may be additional wear layers as required. For example a wear indicator layer 35 may be included among the load carrying layers. One advantage of wear layer 35 is that one can be of a different fiber and color making it easy to determine the wear locations on composite coiled tubing 20. The wear layer 35 is for convenience and is not essential to the tubing. Wear layers 35, 36 are made of glass fibers, such as fiberglass. It should be appreciated that inner liner 32 and wear layer 36 are not critical to the use of composite coiled tubing 20 and may not be required in certain applications. A pressure layer 38 may also be applied although not required.

Another impermeable fluid layer 37 is preferably provided to serve as an outer impermeable layer to liquids and gases. Preferably layer 37 is a layer of PVDF providing an outer impermeability layer for negative differential pressure, and high pressure gases. Negative differential pressure occurs when there is a higher pressure in the annulus then in the flowbore i.e. the differential pressure is greater towards the flowbore. Thus there is an inner and outer layer of PVDF to prevent gas permeability. In selecting an appropriate material for fluid liner 32, consideration is given to the chemicals in the drilling fluids to be used in drilling the sidetracked well 13 and the temperatures to be encountered downhole. The primary purpose for inner liner 32 is as an impermeable fluid barrier since carbon fibers are not impervious to fluid migration particularly after they have been bent. Outer layer 37 is preferably made of a polymer, such as polyvinyl chloride or polyethylene or PDVF. Liner 32 can also be made of a nylon, other special polymer, or elastomer.

The composite tubing is engineered in accordance with the preferred characteristics previously described and for the particular application of the tubing. The tubing has a ratio of carbon fiber to the matrix holding the fiber together. There is also the angle to each layer of fiber. The angle of the fiber varies between layers. The layers of carbon fiber are wrapped around the pipe in a prescribed angle. Carbon layers 34 can be added or subtracted, and by adding more or less fiberglass, the weight of the composite coiled tubing can be controlled. For example fiberglass may be substituted for carbon fiber which is lighter than the fiberglass. The fiberglass includes layers of glass fibers which typically make the composite coiled tubing heavier. Thus the composite coiled tubing may be made to be substantially neutrally buoyant allowing the composite coiled tubing to float in the drilling fluids.

During the braiding process, conductors, such as electrical and/or data transmission conductors, sensors and other data links may be embedded between the load carrying layers 34 in the wall of composite coiled tubing 20. These are wound into the wall of composite coiled tubing 20 with the carbon, hybrid, or glass fibers of load carrying layers 34. It should be appreciated that any number of electrical conductors, data transmission conduits, and sensors may be embedded as desired in the wall of composite coiled tubing 20. As shown, the conductors 40 are disposed around the liner 32 in a layer of fiberglass 47. The principal function of fiberglass is to contain the conductors 40. The conductors 40 are embedded in the fiberglass layer 47 to provide a continuous circumferential outer surface. The fiberglass 47 serves as a filler between the conductors 40. The conductors 40 are first wrapped around the liner 32 and then the fiberglass 47 is applied. Around the layer of fiberglass 47 and conductors 40 are multiple layers of carbon fiber 34. The carbon fiber matrix provides the strength for the tubing.

The electrical conductors 41 may include one or more copper wires such as a single wire, multi-conductor copper wires, braided wires, or coaxial woven conductors. These are connected to a power supply at the surface. A braided copper wire 43 or optical cable 45 is wound with the fibers integral to the load carrying layers 34. Although individual copper wires may be used, a braided copper wire 43 provides a greater transmission capacity with reduced resistance along composite coiled tubing 20. Electrical conductors 41 allow the transmission of a large amount of electrical power from the surface to the bottom hole assembly 30 through essentially a single conductor. With multiplexing, there may be two-way communication through a single conductor 41 between the surface and bottom hole assembly 30. The conductors 40 provide real time data transmission to the surface.

The principal copper conductor 41 used for power transmission from the power supply at the surface to the bottom hole assembly 30 is preferably braided copper wire 43. The braided cooper wire 43 may be used to provide the power for power section 90 which rotates the bit 140. Braided copper wire 43 may conduct a large voltage, such as 400 volts of electricity, from the surface which will generate heat which must be dissipated. Braided copper wire 43 is preferably disposed between the two outermost load carrying layers 34. By locating braided copper wire 43 adjacent the outer diameter of composite coiled tubing 20, the braided copper wire 43 is disposed over a greater surface area of layers 34 to maximize the dissipation of heat.

The four power conductors are ganged with one carrying the power down and the other being a ground. They are positive and negative power and are 2 and 2. The signal wires are disclosed in U.S. application Ser. No. 09/599,343, filed Jun. 22, 2000 and entitled Burst QAM Downhole Telemetry System, now U.S. Pat. No. 6,348,876; and U.S. application Ser. No. 10/017,176, filed Dec. 7, 2001 and entitled Burst QAM Downhole Telemetry System, both hereby incorporated herein by reference. The conductors 41 are each preferably a group of braided copper wires, 22 gauge. They are braided for structural reasons, i.e., structural integrity, and are in electrical contact with each other. The two data conductors are two independent leads. The down link communications are on the power leads. The two data conductors are high speed up links carrying communications from down hole to the surface. The data is transmitted to the surface real time.

Sensors may also be embedded in the load carrying layers 34 and connected to one or more of the data transmission conductors such as a fiber optic cable. As an alternative to embedded sensors, the fiber optic cable may be etched at various intervals along its length to serve as a sensor at predetermined locations along the length of composite coiled tubing 20. This allows the pressures, temperatures and other parameters to be monitored along the composite coiled tubing 20 and transmitted to the controls at the surface.

The composite coiled tubing 20 with conductors 40 coupled to an integrated measurement while drilling (MWD) tool and/or a logging while drilling (LWD) tool can provide major benefits during the well construction process. Conductors 40 enable continuous data transmission during all operational procedures, including procedures during which previous conventional data transmission becomes disabled. Furthermore, the transmission rate is greatly increased, resulting in high-resolution real-time data from sensors for formation evaluation, directional readings, pressure measurement, tension/weight on bit (WOB), and other downhole data and information. The high-resolution and continuous data transmission help to solve the potential challenges introduced when drilling a well. These challenges may include higher equivalent circulating density (ECDs), longer openhole intervals, and reduced clearances in the annulus. The high-quality data also has the potential to enable more effective use of other technologies that address the geomechanical environment of the well. The composite coiled tubing 20 can identify permeable zones, drilling-induced fractures, and borehole ballooning.

The continuous access to the data, including during trips, helps to provide early indications of potential problems such as fracture initiation or borehole instability. The knowledge of the location of loss zones can improve the effectiveness of chemical treatments to increase the fracture resistance of the open hole. This knowledge is particularly useful when drill ahead materials or chemical casing materials might have to be used to fill a washed out area before the casing or liners are set in a sequential well-construction process. Also, it can be quite useful to drill long intervals before any casing is set.

In certain situations, management of ECDs can be critical to the success of a well-construction project. The composite coiled tubing 20 with MWD/LWD bottomhole assembly drilling system can enhance the ability to manage ECDs. The use of coiled tubing as a drill string enables continuous circulation while tripping in the hole and allows continuous optimization of mud properties throughout the hole and active mud system. Continuous access to annular pressure measurements transmitted through the composite coiled tubing 20 provides useful information about ECDs. With this information, drilling parameters and fluid properties can be continuously adjusted to remain within the limits of pore pressure and fracture gradient pressure. Reductions in pressure resulting from swabbing can be eliminated in a smooth, continuous manner by pumping through the coiled tubing drill string while tripping out of the hole.

Real-time data and information at the surface allows monitoring and controlling the pressure in the wellbore. The drilling system provides real-time bottom hole pressure measurements to a control system at the surface which is adapted to automatically control parameters such as drilling fluid weight, pumping rate, and choke actuation. The control system receives input from the bottom hole pressure sensor including other pressure sensors, mud volume sensors, and flowmeters located at the surface. The control system then adjusts one or more of the drilling fluid density, pumping rate, or choke actuation to detect, shut-in, and circulate out wellbore influxes.

One preferred embodiment includes a method for detecting and controlling an influx of formation fluids into the wellbore when the drill bit is at the bottom of the hole. Once a kick is detected, either by downhole pressure sensing or by mass flow rate balancing, the well can be shut and the formation pressure measured by the downhole pressure sensor. The downhole pressure measurements may be made once circulation has stopped or while circulation continues. Once formation pressure has been established, the control system adjusts one or more of drilling fluid density, pumping rate, or choke actuation to circulate out wellbore influxes. See U.S. patent application Ser. No. 10/264,577 filed Oct. 4, 2002 and entitled Well Control Using Pressure While Drilling Measurements, hereby incorporated herein by reference.

In addition to the enhanced ability to control the pressure in the wellbore, the drilling system improves the capability to measure pore pressure and fracture pressure. If gas influx is observed when the pumps are stopped or slowed down, the wellbore pressure during the event can be precisely measured. Likewise, a formation integrity test (FIT) or a leak off test (LOT) can be performed with real-time downhole measurements of the transient pressure behavior during the test. During a LOT, which involves fracturing of the formation, this high-resolution data can improve and speed up the interpretation of the test. During a FIT, in which fracturing is not desired, the high quality of the real-time data can prevent inadvertent fracturing of the formation. Constant pressure while drilling (PWD) measurements obtained through the conductors 40 in the composite coiled tubing 20 give a high degree of control.

These characteristics of the system create the potential to more safely operate within a narrower window of pore pressure and fracture gradient than would be possible with previous technology. While the reservoir hole is drilled, the improved control of pressure in the wellbore, along with the potential for enhanced understanding of fracture resistance, can reduce the chance of losing drilling mud to the reservoir. This reduction can help prevent production problems associated with such losses.

The drilling system of the present invention may be used in drilling wells in deep water depths for dual-gradient drilling. Dual-gradient drilling techniques seek to adjust the density of the column of fluid contained in the wellbore. This is accomplished using the present invention by providing the operator with real-time downhole pressure measurements. Typical single-gradient drilling technology seeks to control wellbore pressure using a column of substantially constant-density drilling fluid from the bottom of the well back to the rig. In contrast, dual-gradient drilling uses a lower density fluid, about the same density as seawater, from the rig to the seafloor and then uses a heavier density drilling fluid within the actual formation, i.e. between the seafloor and the bottom of the well. Dual-gradient drilling techniques, in effect, simulate the drilling rig being located on the seafloor and therefore avoid some of the problems associated with deep-water drilling. Thus, a greater well depth can be drilled with the same number of casing strings or a greater depth can be reached with the same number of casing strings. See U.S. patent application Ser. No. 10/264,540 filed Oct. 4, 2002 and entitled Dual-Gradient Drilling Using Nitrogen Injection; hereby incorporated herein by reference.

The composite coiled tubing 20 allows the bottomhole assembly to be engineered differently from conventional MWD/LWD systems. Conventional systems must be self-powered with either batteries or turbines. Batteries are expensive, hazardous, and must be periodically changed. Turbines are complex mechanical devices that are susceptible to erosion and plugging. The mud pulser also suffers from these mechanical failures. The pulser is a slow telemetry method as it stands today. It can send only a fraction of the sensor measurements to surface in real time. It can only operate during circulation, and therefore, it precludes telemetry during tripping with jointed pipe. This attribute requires that these systems store the majority of their acquired data in the downhole tool memory. The data can be obtained only by tripping the bottomhole assembly out of the hole and downloading through a cable at surface. These tools are preconfigured to attempt to optimize the storage and telemetry of the data. Large processors are used in the downhole tools to process the sensor signals and raw data to minimize the size of the stored data. These large electrical components are subject to high vibration and shock loads, which due to their size can cause them to shake loose or break connectors. Often, the data needed to make decisions is not transmitted in real time and is left in the tool's memory until the next trip out of the hole.

The drilling system 10 with composite coiled tubing 20 and bottomhole assembly 30 is able to escape from this paradigm due to the embedded conductors in the coiled tubing 20. Power is provided from the surface, eliminating the need for batteries or turbines. All the raw sensor data is transmitted immediately to the surface in real-time, negating the need for a pulser. These three components typically have the highest rate of failure in conventional MWD/LWD systems. Because the raw sensor data is processed at surface, large processors or downhole memory are unnecessary. This benefit reduces complexity and eliminates large components on printed circuit boards in the bottomhole assembly that are susceptible to vibration and shock. Quality assurance is easily monitored for the bottomhole assembly 30. Most importantly, the availability of all the data, all the time, allows accurate, real-time decisions to be made while drilling.

A number of factors are important to the performance and reliability of a horizontal completion. Reservoir characteristics, effective well length, and near-wellbore conditions determine the inflow performance of the completion. Formation characteristics such as sand uniformity and shaliness, along with the inflow performance, are important to the reliability of completions in unconsolidated formations. More effective placement of the horizontal well in the desired pay leads to improvements in performance and reliability.

The formation evaluation sensors in the drilling system 10 may include an azimuthally focused gamma ray sensor for bed dip determination and a resistivity sensor with multiple depths of investigation for optimum wellbore placement. These sensors are particularly suited for high-inclination wells and geo-steering the wellpath in the reservoir.

Perforations, expandable screens, mechanical completion shutoffs, and chemical solutions/techniques can be more efficiently placed using the composite coiled tubing 20 and bottomhole assembly 30. One of the most important goals is to have the most efficient well-construction process possible with the maximum production possible. The composite coiled tubing drilling-completion system 10 supports this overall philosophy.

Composite coiled tubing 20 is coilable so that it may be spooled onto a drum. In the manufacturing of composite coiled tubing 20, inner liner 32 is spooled off a drum and passed linearly through a braiding machine. The carbon, hybrid, or glass fibers are then braided onto the inner liner 32 as liner 32 passes through multiple braiding machines, each braiding a layer of fiber onto inner liner 32. The finished composite coiled tubing 20 is then spooled onto a drum. See U.S. application Ser. No. 09/502,317, filed Feb. 11, 2000 and entitled Coiled Tubing Handling System and Method, now U.S. Pat. No. 6,352,216; U.S. patent application Ser. No. 09/512,536 filed Feb. 24, 2000 and entitled Coil Tubing Winding Tool; and U.S. application Ser. No. 09/501,913, filed Feb. 10, 2000 and entitled Multi-String Composite Coiled Tubing Spooling Device; all hereby incorporated herein by reference.

During the braiding process, the conductors 40, such as electrical conductors 41 and/or data transmission conductors 42, and sensors 44 are applied to the composite coiled tubing 20 between the braiding of load carrying layers 34. Conductors 41, 42 may be laid linearly, wound spirally or braided around coiled tubing 20 during the manufacturing process while braiding the fibers. Further, conductors 41, 42 may be wound at a particular angle so as to compensate for the expansion of inner liner 32 upon pressurization of composite coiled tubing 20.

Composite coiled tubing 20 may be made of various diameters. Although a 1½ inch diameter is typically used for metal coiled tubing, composite coiled tubing 20 preferably has a diameter greater than 1½ inches. The size of coiled tubing, of course, will be determined by the particular application and well for which it is to be used.

Although it is possible that the composite coiled tubing 20 may have any continuous length, such as up to 25,000 feet, it is preferred that the composite coiled tubing 20 be manufactured in shorter lengths as, for example, in 1,000, 5,000, and 10,000 foot lengths. A typical drum will hold approximately 12,000 feet of composite coiled tubing. However, it is typical to have additional back up drums available with additional composite coiled tubing 20. These drums, of course, may be used to add or shorten the length of the composite coiled tubing 20. With respect to the diameters and weight of the composite coiled tubing 20, there is no practical limitation as to its length.

Composite coiled tubing 20 has all of the properties requisite to enable the drilling and completion of extended reach wells. In particular, composite coiled tubing 20 has great strength for its weight when suspended in fluid as compared to ferrous materials and has good longevity. Composite coiled tubing 20 also is compatible with the drilling fluids used to drill the borehole and may be engineered to approach buoyancy (dependent upon mud weight and density) upon passing drilling fluids down its flowbore 46 and back up the annulus 82 formed by the borehole 12. Buoyancy reduces to acceptable limits drag and other friction factors previously encountered by metal pipe. Composite coiled tubing 20 may be used in elevated temperatures particularly when a heat exchanger is placed on drilling platform 16 to cool the drilling fluids circulating through the borehole 12. Since the composite coiled tubing 20 is not rotated to rotate bit 140, no torque is placed on composite coiled tubing 20.

Figure 4:
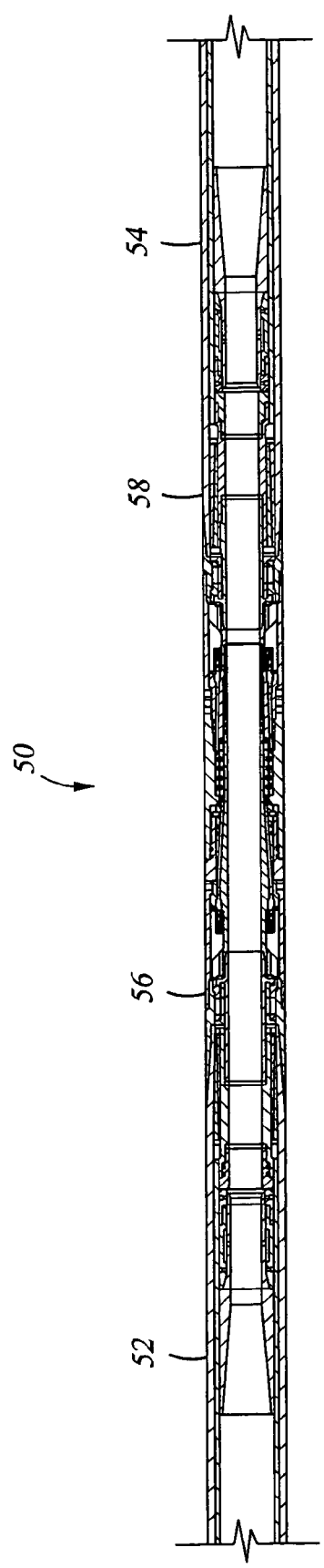
FIG. 4 is a cross-sectional view of a connector connecting two lengths of composite tubing.

Referring now to FIG. 4, there is shown a connector 50 for connecting adjacent lengths 52, 54 of composite coiled tubing 20. A jet sub 60 may be disposed in connector 50 as hereinafter described. Other types of connectors are shown in U.S. Pat. Nos. 4,844,516 and 5,332,049, both hereby incorporated herein by reference.

A detailed description of the connector 50 is set forth in U.S. patent application Ser. No. 09/534,685, filed Mar. 24, 2000, hereby incorporated herein by reference. For electrical conductors in tubing, see U.S. Pat. No. 5,146,982, incorporated herein by reference.

Figure 4A:
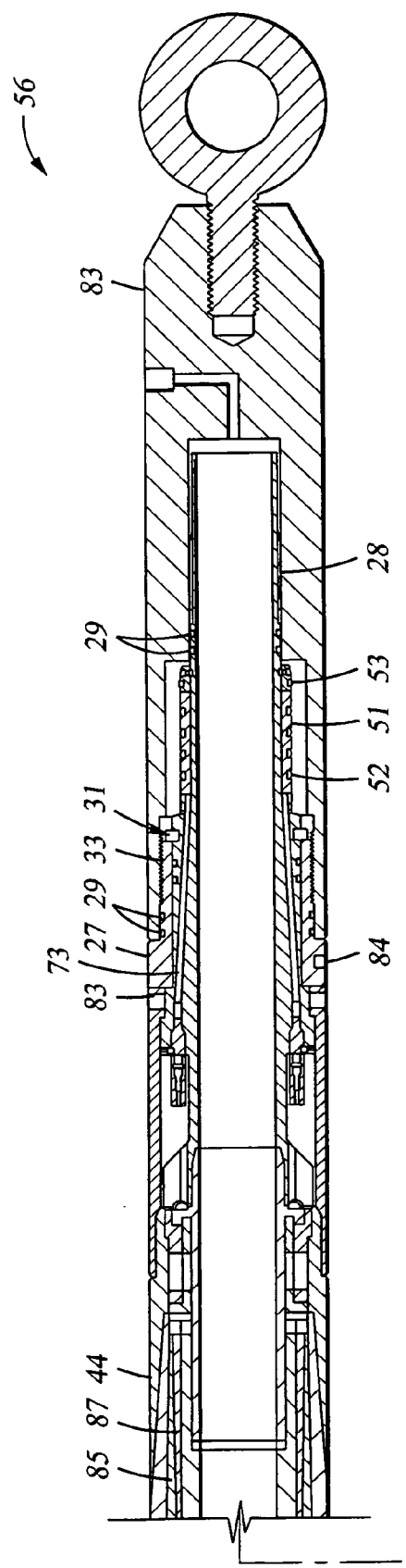
FIG. 4A is a cross sectional view of the male housing of the connector.
Figure 4A:
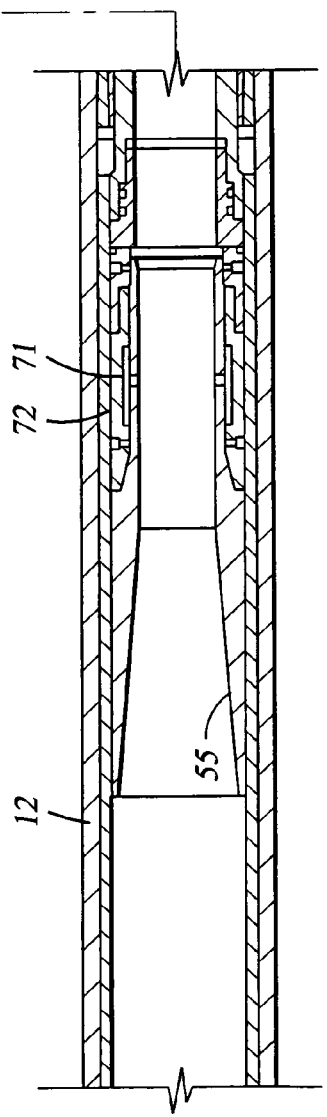

Referring now to FIG. 4A, the male end connector 56 is generally in the form of a hollow cylinder. Moving generally from right to left in FIG. 4A, several features of the male end connector are shown. Splines 28 are machined on or affixed onto an exterior edge of said male end connector. An inner electrical contact 51 is also positioned on male end connector 56. Inner electrical contact 51 is generally cylindrical in shape and includes both electrical contacts or rings 52 and wiper seals 53. Inner electrical contact 51 generally rests on the outer radius of end connector 56. Contact rings 52 are composed of any electrical conductor, and wiper seals 53 are composed of an electrical insulator.

Still referring to FIG. 4A, rotating ring 27 is positioned on male end connector 56. Rotating ring 27 rotates freely around the barrel of male end connector 56; however rotating ring 27 does not slide axially along the length of male end connector 56. Rotating ring 27 is prevented from sliding along the length of male end connector 56 by a lock ring 30 and may be prevented by conventional mechanical devices such as splines or stops. Rotating ring 27 also includes threads 33 on its exterior surface.

Another feature of male end connector 56 and rotating ring 27 is the presence of seals 29. In the preferred embodiment of this invention, seals 29 are positioned on the surfaces of the male end connector 56 and the rotating ring 27, respectively. However, the seals could also be positioned on female end connector 58. The seals themselves are composed of an elastomeric material that will allow a compression seal to form against the hydraulic pressures encountered in the well. As shown, seals 29 may be positioned into grooves, recesses or rings positioned on the male end connector 56 and rotating ring 27.

Figure 4B:
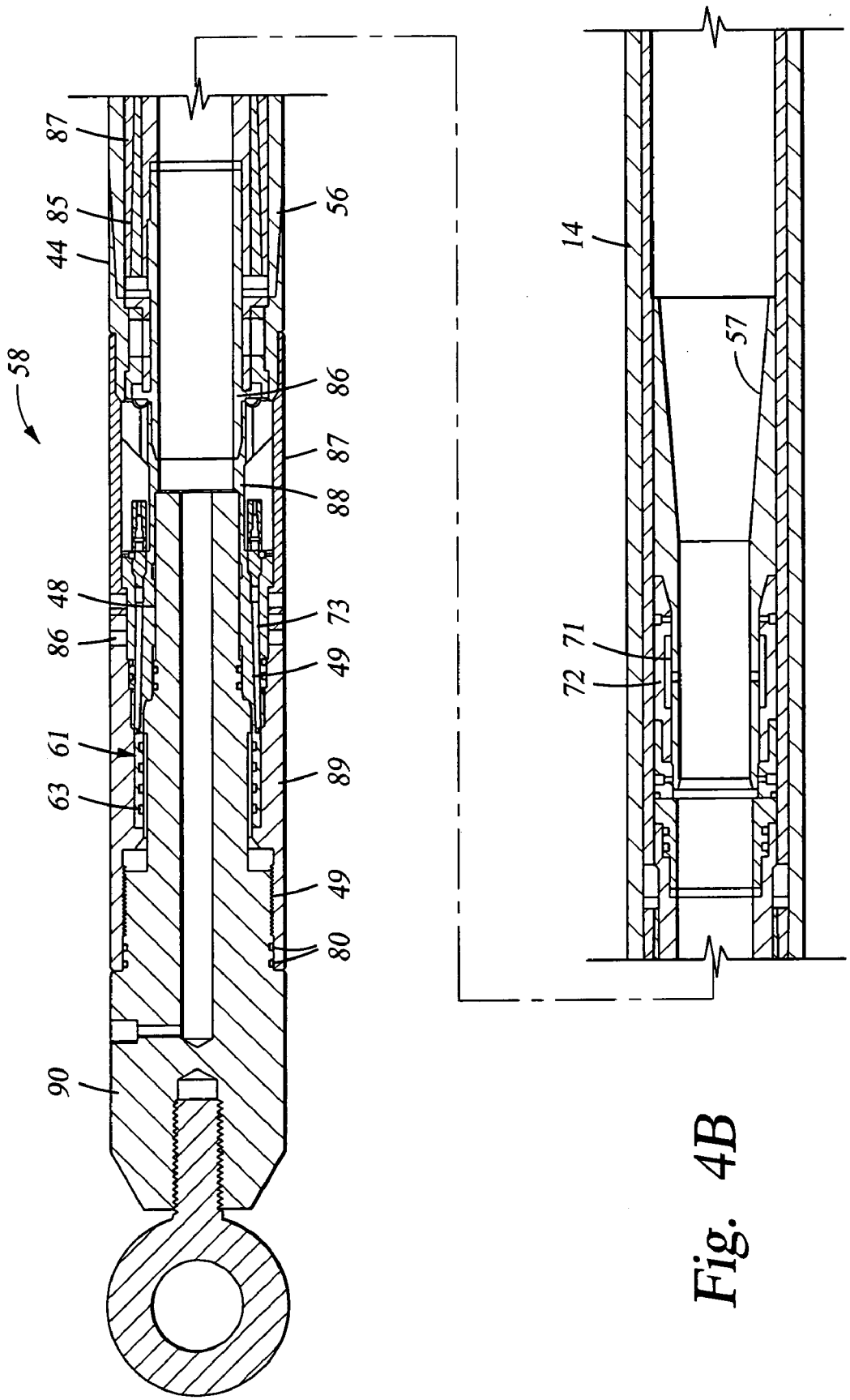
FIG. 4B is a cross-sectional view of the female housing of the connector.

Referring now to FIG. 4B, female end connector 58 is shown. Like male end connector 56, the female end connector 58 is also generally cylindrical in form. Female end connector 58 includes slots or grooves 48 and receiving threads 49. Female end connector 58 also has sealing surfaces 80 and outer electrical contact 61, both positioned on the internal diameter of female end connector 58.

Outer electrical contact 61 is generally cylindrical in shape and includes outer electrical plates or rings 63. The outer electrical contact 61 contains an outer electrical ring 63 for each conductor on the inner electrical contact 51. Contact rings 63 may be composed of any conducting material. Outer electrical rings 63 are not separated by wiper seals but by a plastic insulator, not shown. Outer electrical contact 61 is positioned on the inner radius of female end connector 58. Electrical rings 63 are connected to conductors embedded in composite tubing 20 that is joined to female end connector 58.

Both male end connector 56 and female end connector 58 share many common features. For ease of discussion, these common features are identified below together.

Referring again to FIGS. 4A and B there is shown a passage 71 and conforming seal 72. The conforming seals 72 are composed of an elastomeric material that will allow a compression seal to form under hydraulic pressure.

Both male and female housings include axial passageways 73. These passageways are hollows or grooves, approximately of the diameter or clearance of an electrical wire. The passageways may take any of several shapes depending on the ultimate shape of the connector 50 and the chosen method of manufacture.

The male end connector 56, female end connector 58, and rotating ring 27 have a plurality of apertures 82, 84, and 86 drilled into each member.

Both male end connector 56 and female end connector 58 include an outer conical housing 44 and-inner skirt 87. Encircling inner skirt 87 on both male and female housings is split ring wedge 85. The outer diameter of split ring wedge 85 is straight and the inner diameter is tapered. The conical housing 44 has a straight outer diameter and a tapered inner diameter. The inner skirt 87 has a straight inner diameter and a tapered outer diameter. The split ring wedge 85 itself is manufactured from a material that shows strength at high stress and yet is relatively flexible. Beryllium copper has been used as a suitable material. The other components of both the female and male end connectors 56, 58 are constructed of any high strength material, such as steel, and preferably of a material that will resist corrosion.

Referring still to FIGS. 4A and B there is shown a transition 55, 57 in the internal diameter of male and female connectors 56, 58.

The inner electrical contact 51 and outer electrical contact 61 each have four contact plates or rings 51, 61. This number is selected as it corresponds to the number of conductors disposed in the typical coiled tubing 20 in use. A different number of contact rings may be used. Both inner electrical contact 51 and outer electrical contact 61 may contain wiper seals such as seals 53. Wiper seals, formed of an elastomeric insulating material, create ridge-like separations between electrical contacts 51, 61. Wiper seals are only present on inner electrical contact 51 and not on outer electrical contact 61.

Also shown on FIGS. 4A and 4B are caps 83, 90 positioned on the male and female end connectors. These caps are not part of the assembled connector; however, they are attached to each connector during manufacturing to allow for handling and to prevent foreign matter from entering and possibly damaging the housings. The structure of both the male and the female end connectors 56, 58 may consist of separate parts that assemble into the final housing.

As best shown in FIG. 4, the assembled connector 50 has a flush outer surface with the outer surface of the composite coiled tubing 20. This facilitates passing the coiled tubing 20 over guide 528 and through injector 518 and stripper 532. It further allows the connector to be coiled onto a tubing spool 516.

It should be appreciated that an apparatus may be used on the platform floor 16 for connecting connector 50. One such apparatus may include a vise for that end of the length of the composite coiled tubing 20 extending into the well 12 and a tong for the end of the new length of composite coiled tubing 20 whereby the tong inserts and rotates the new length to form the connection 50.

It should be appreciated that end connectors 56, 58 may be mounted on the ends of composite coiled tubing 20 during the manufacturing process and therefore are already mounted on the ends of coiled tubing 20 upon transport to the drilling site. It should also be appreciated that the end connectors 56, 58 need not be made of metal but may be made of a composite. A composite end connector could be heat bonded to the end of composite coiled tubing 20. Also, it should be appreciated that other types of quick connections could be used such as the type of quick connection used for high pressure hose connections.

One alternative to individual connectors for conductors 40 through connector 50 are communication links which electro-magnetically transmit signals around the connections rather than go through connector 50. See U.S. Pat. No. 5,160,925, hereby incorporated herein by reference. It is preferred, however, for the conductors 40 to be directly connected together at connection 50.

Connectors, comparable to connector 50, are used to connect the downstream end of composite coiled tubing 20 to the bottom hole assembly 30 and to the electrical systems at the surface for providing electrical power and for processing the data. The connectors 50 will also be used to repair a damaged end of composite coiled tubing 20 such that the damaged end may be cut off and the remainder reconnected to the work string 20. It is preferred that custom lengths of composite coiled tubing 20 not be made for each well.

Figure 5:
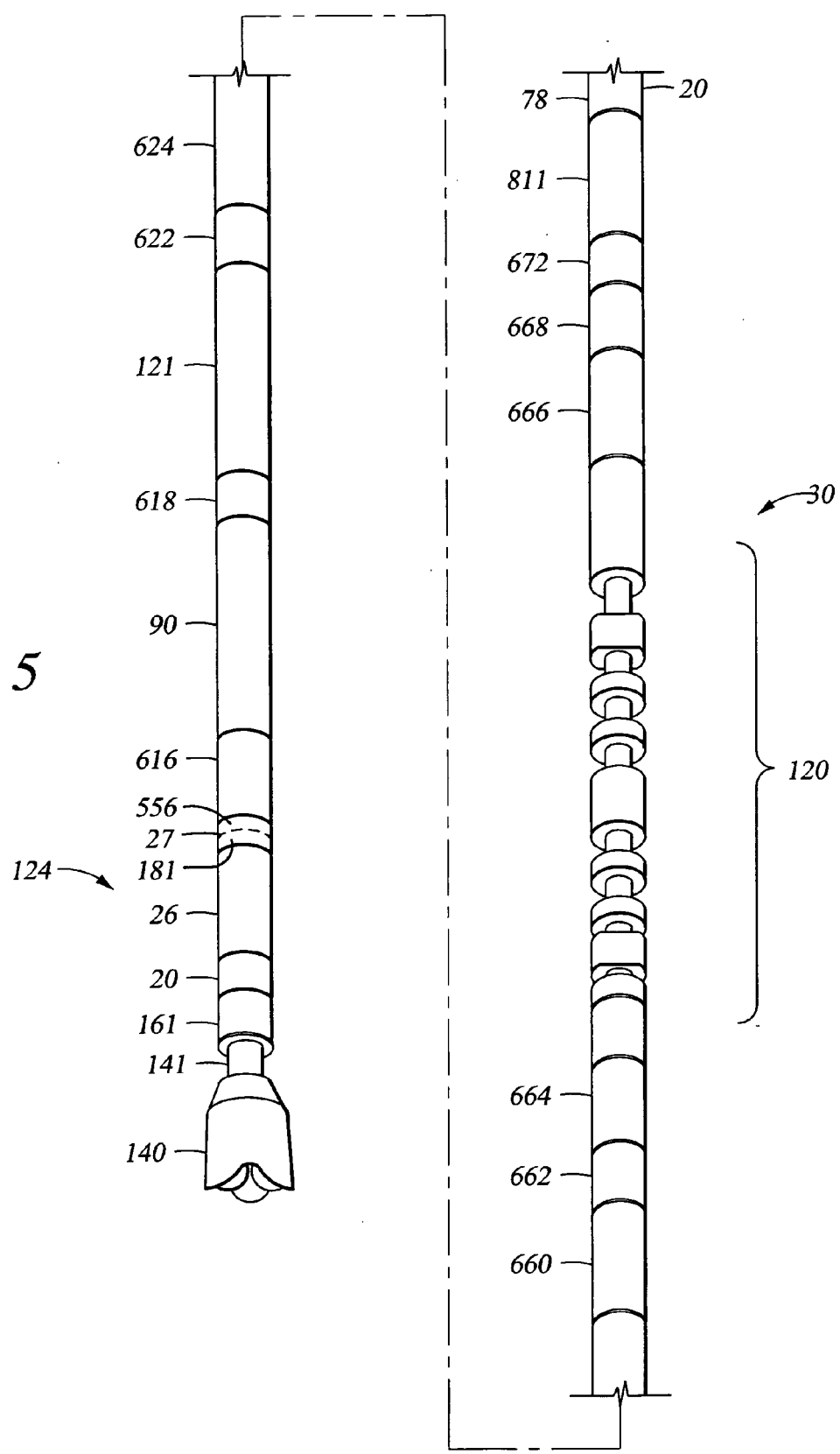
FIG. 5 is an enlarged view of the bottom hole assembly shown in FIG. 1A connected to the downstream end of the composite coiled tubing.
Figure 5A:
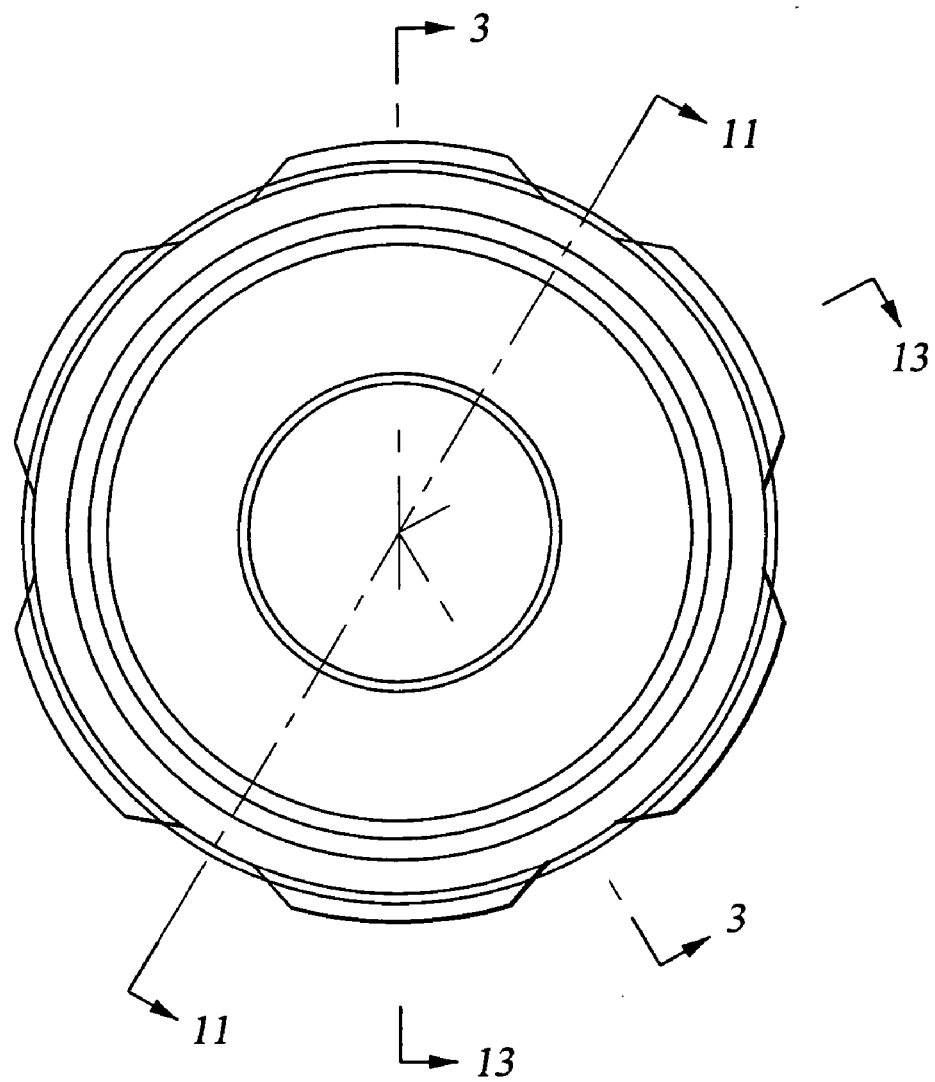
FIG. 5A is a top end view of the steerable assembly of FIG. 5.

Referring now to FIG. 5, the bottom hole assembly 30 having a bit 140 mounted on a drive shaft 141, a bearing assembly 161, a steerable assembly 124 including an electronics section 181 and preferably a near bit orientation sensor 556 having an inclinometer and magnetometer package 130, an upper constant velocity (CV) sub 616, a power section 90 with wire subs, a check valve 618, a resistivity tool 121, and an electric disconnect 622. For details on an electrical disconnect, refer to U.S. patent application Ser. No. 09/998,125, filed Nov. 30, 2001, hereby incorporated herein by reference. For details regarding an actuator assembly for actuating a steerable assembly, refer to U.S. patent application Ser. No. 09/678,817 filed Oct. 4, 2000, hereby incorporated herein by reference. The bottom hole assembly 30 may also include a sensor sub 624 including an orientation package 554. The bottom hole assembly 30 also may or may not include a propulsion system 120 having a lower tractor back pressure control module 660 and a lower tension/compression sub 662 and an upper tractor back pressure control module 666. The bottom hole assembly 30 includes a pressure measurement sub 664, an upper tension/compression sub 668, a supervisory sub 672, and a release tool 80. For more details on release tools, refer to U.S. patent application Ser. No. 09/504,569 filed Feb. 15, 2000, now U.S. Pat. No. 6,318,470, hereby incorporated herein by reference.

The bottom hole assembly 30 is connected to a work string 20 extending to the surface of the well. There is no rotation of the bottom hole assembly 30. It should be appreciated that other tools may be included in the bottom hole assembly 30. The tools making up the bottom hole assembly 30 will vary depending on the drilling system being used and the borehole being drilled. It should be appreciated that the present invention is not limited to a particular bottom hole assembly and other alternative assemblies may also be used. For example, the steering assembly 124 may be separated from the power section 90 or located above the power section 90. Further details on the steering assembly 124 and its operation may be found in U.S. application Ser. No. 09/467,588, filed Dec. 20, 1999, hereby incorporated herein by reference.

Bottom hole assembly 30 may be connected to the down stream end 78 of composite work string 20 by a release tool 80. Release tool 80 may be connected to one of the conductors 40 for electrical actuation from the surface. Another release tool is shown in U.S. patent application Ser. No. 09/998,125, filed Nov. 30, 2001 and entitled Downhole Assembly Releasable Connection, hereby incorporated herein by reference.

Various types of release tools may be used as release tool 80, such as an explosive charge, a chemical cutter, or a mechanical release. One type of mechanical release for releasing metal coiled tubing is disclosed in U.S. Pat. No. 5,146,984, incorporated herein by reference. One release tool 80 includes a charge detonated electrically to sever the connection between bottom hole assembly 30 and work string 20. Such a release tool is simple and reliable. Release tool 80 is required should bottom hole assembly 30 get stuck in the well 12.

The power section 90 provides the power for rotation of bit 140. The propulsion system 120 provides the motive force to walk the bottom hole assembly 30 in or out of the borehole 12. It should be appreciated that the composite coiled tubing 20 cannot be pushed into the borehole. The propulsion system 120 can pull the composite coiled tubing 20 into the borehole or it can be used to back the composite coiled tubing out of the borehole. Resistivity tool 121 determines the formation resistivity around the bottom hole assembly 30 an includes an electronics package housed in electronics section 181. Steerable assembly 124 changes the trajectory of the borehole 12 and is preferably housed in propulsion system 120.

It should also be appreciated that the bottom hole assembly 30 may include a concentric adjustable stabilizer such as that disclosed in U.S. Pat. No. 5,332,048, hereby incorporated herein by reference. The stabilizer may be disposed anywhere on bottom hole assembly 30 depending upon the application.

It should be appreciated that the make up of bottom hole assembly 30 will vary with the application and well. Examples of other tools that may be added to bottom hole assembly 30 include an NMR magnetic resonance imaging tool for transmitting data to the surface indicating various characteristics of the fluids in the surrounding formation including their transportability, identification, and composition. It should also be appreciated that different types of sensors may be included in the electronic section 181 or located elsewhere on bottom hole assembly 30 for providing other information concerning drilling and the formation such as tri-axial accelerometers and inclinometers for directional control and surveying. For example, all of the parameters and characteristics that are determined with logging while drilling may be included in bottom hole assembly 30. Other parameters and characteristics from sensors include operating pressures, operating temperatures, annular pressure, formation pressure, pressure sampling, fluid identification, gyroscopic surveying, porosity, and density. For an example of a bottom hole assembly including a radiation detector, see U.S. patent application Ser. No. 09/276,431, filed Mar. 25, 1999, hereby incorporated herein by reference.

The power section 90 may be one or a combination of power sources including a hydraulic drive, an electric drive, a turbine, a vane type motor, or any other downhole motor for powering bit 140. The power section 90 may change its torque or RPM characteristics and can be controlled from the surface.

One typical power section 90 includes a downhole hydraulic motor using conventional positive displacement for rotating the output shaft. The motor has a rotor and stator with the rotor rotating as hydraulic fluids pass down through composite coiled tubing 20 and between the rotor and stator in the power section 90. The rotor may be connected to an output shaft which feeds into a surface controlled transmission. A downhole drilling motor is disclosed in U.S. Pat. No. 5,620,056, hereby incorporated herein by reference.

It should be appreciated that the electrical conductors 41 of composite coiled tubing 20 extending to the surface allow the power section 90 to include one or more electric motors. Current may be conducted from the surface to operate a multi-stage electric motor as power section 90. Such a multi-stage motor has the ability to supply the required performance characteristics at the drill bit 140. Multi-stage motors are also rugged, reliable and can be sealed from drilling fluids.

It should be appreciated that even though non hydraulic motors may be used as power section 90, drilling fluids are still passed down the flowbore 46 of composite coiled tubing 20 and up the outer annulus 82 formed by borehole 12 and composite coiled tubing 20 to remove the cuttings of the drill bit 140 and to cool and lubricate the bit 140 and other components of bottom hole assembly 30.

The electronics section 181 provides the electronics package and instrumentation for measurements, logging, and pay zone steering while drilling. The electronics section 181 includes the electronics package for the resistivity tool 121. Tools measuring resistivity are shown in U.S. Pat. Nos. 5,233,522; 5,235,285; 5,260,662; 5,339,036; and 5,442,294, all incorporated herein by reference. The electronics section 181 serves as a formation measuring tool.

Figure 6:
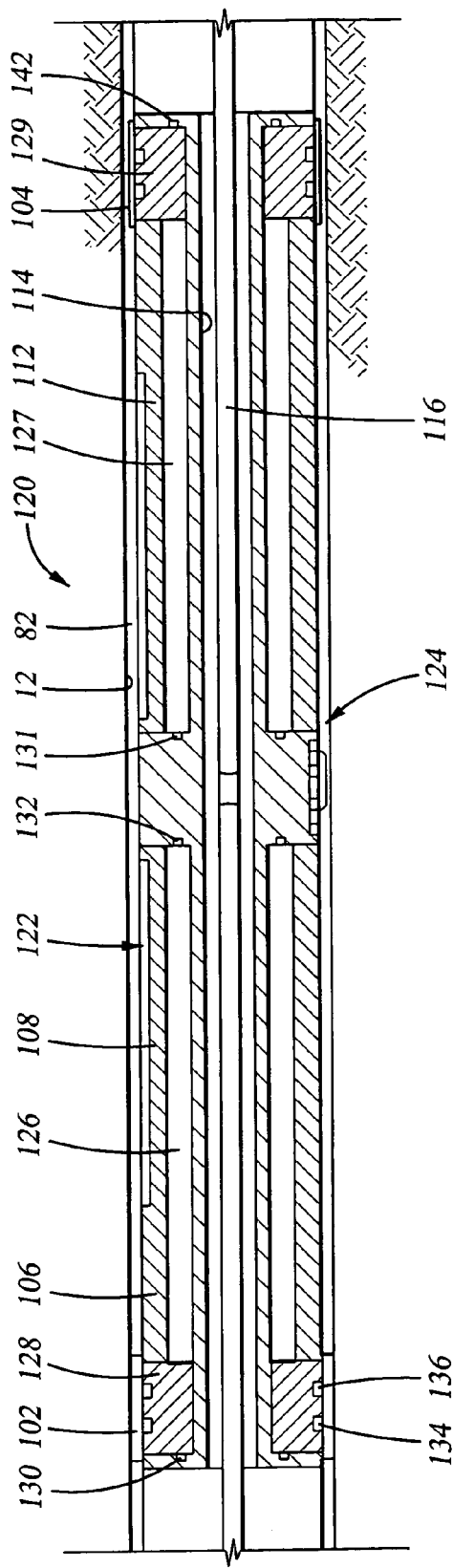
FIG. 6 is a cross-sectional view of the propulsion system with resistivity antennas and a steerable assembly.
Figure 7:
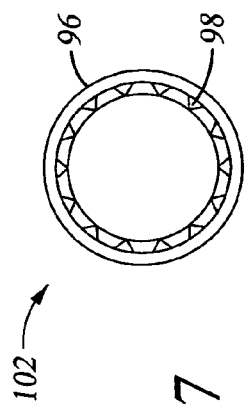
FIG. 7 is a cross-sectional view taken at plane 7—7 in FIG. 6 showing one of the traction modules.
Figure 8A:
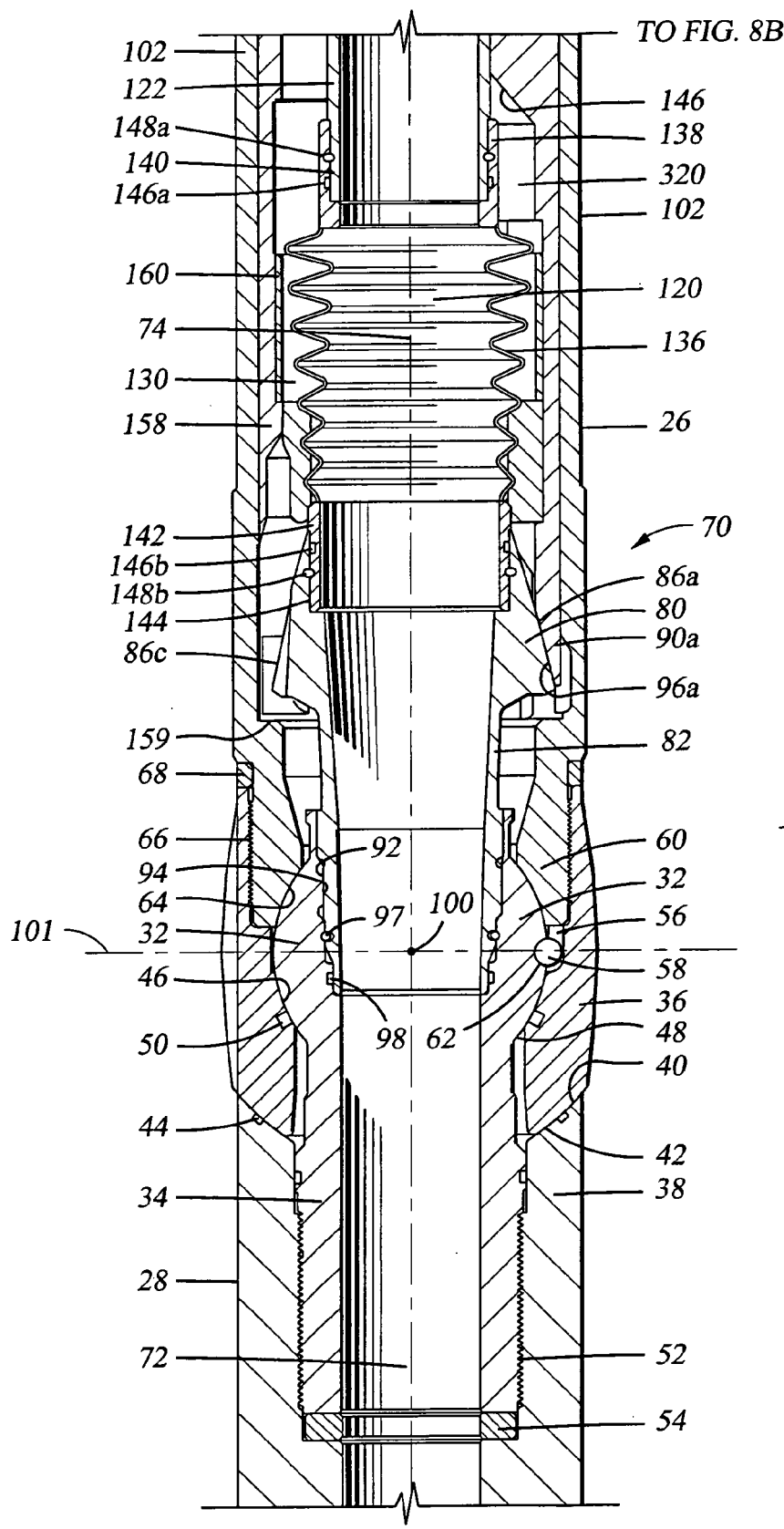
FIGS. 8A, B, C, D, and E are a cross-sectional view of the steerable assembly from the universal joint to the electric motor.
Figure 8B:
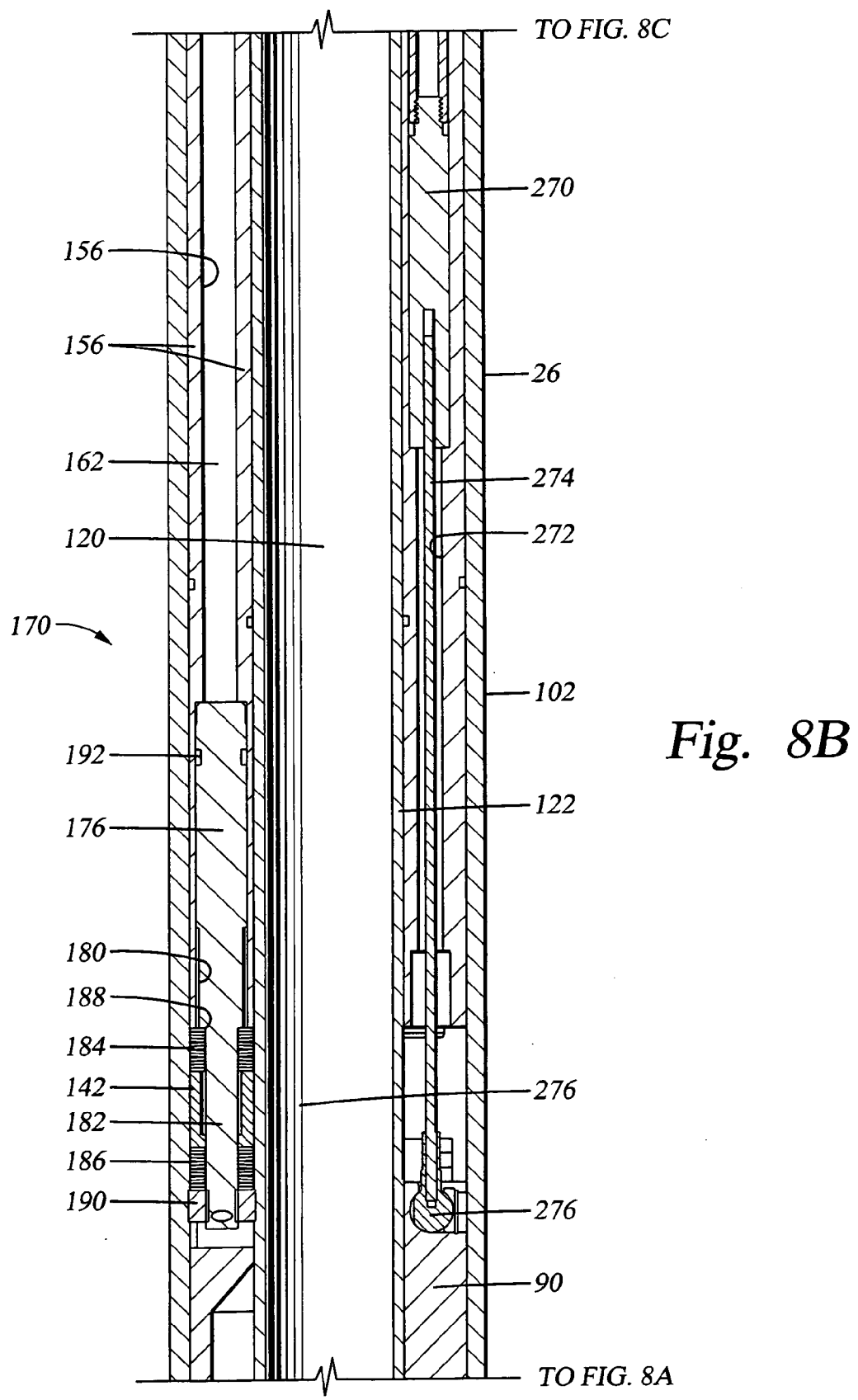
Figure 8C:
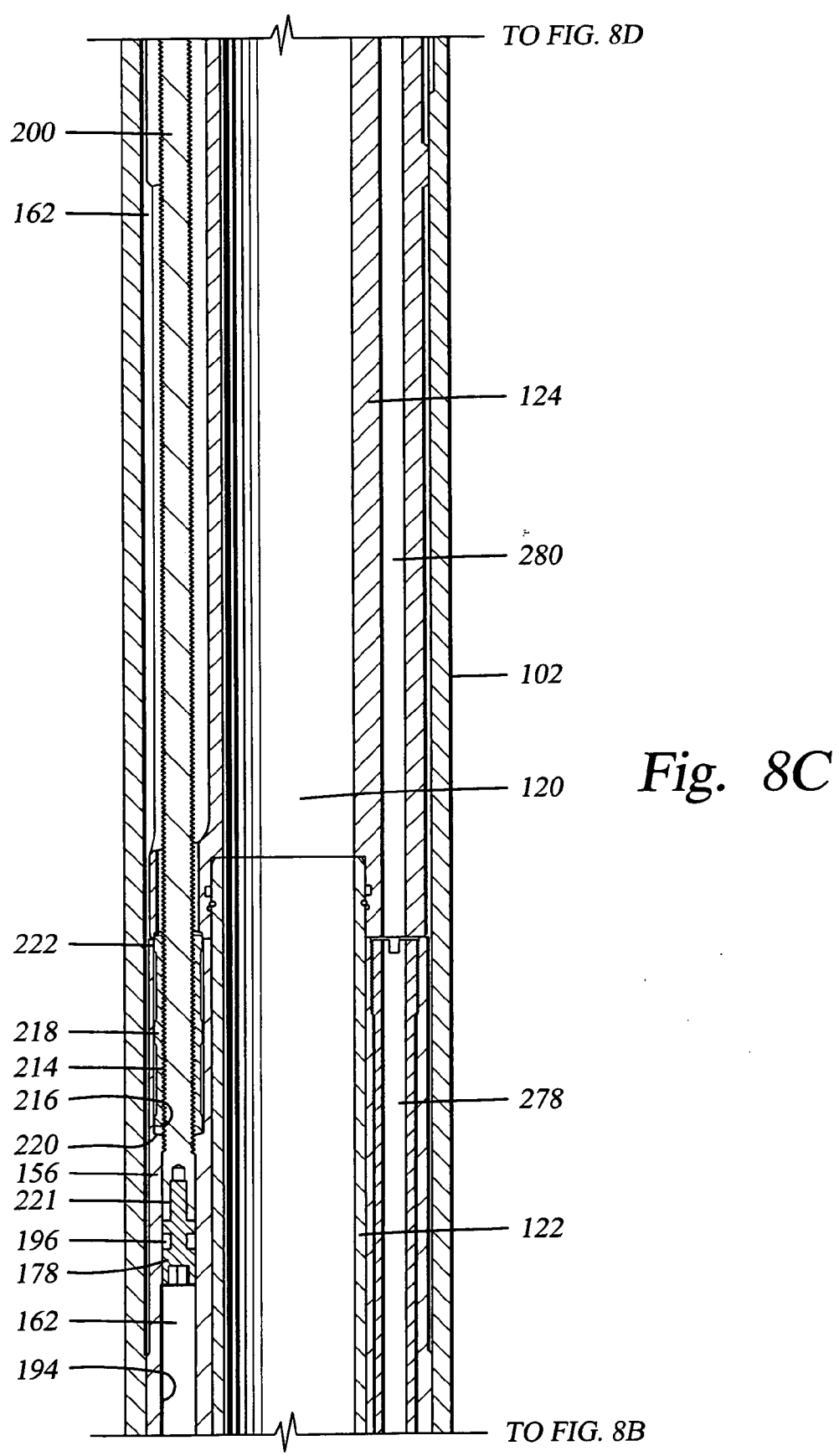
Figure 8D:
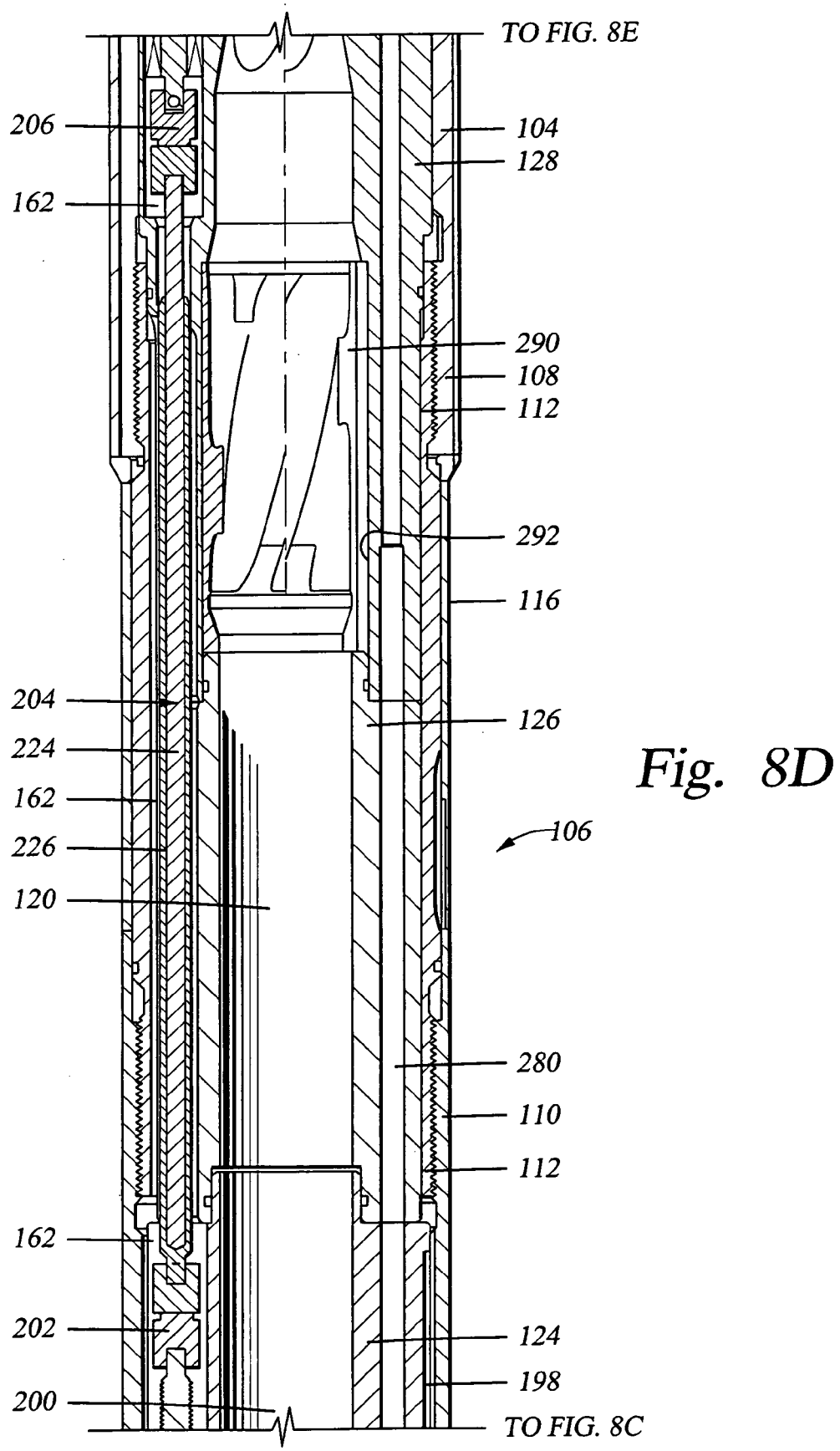
Figure 8E:
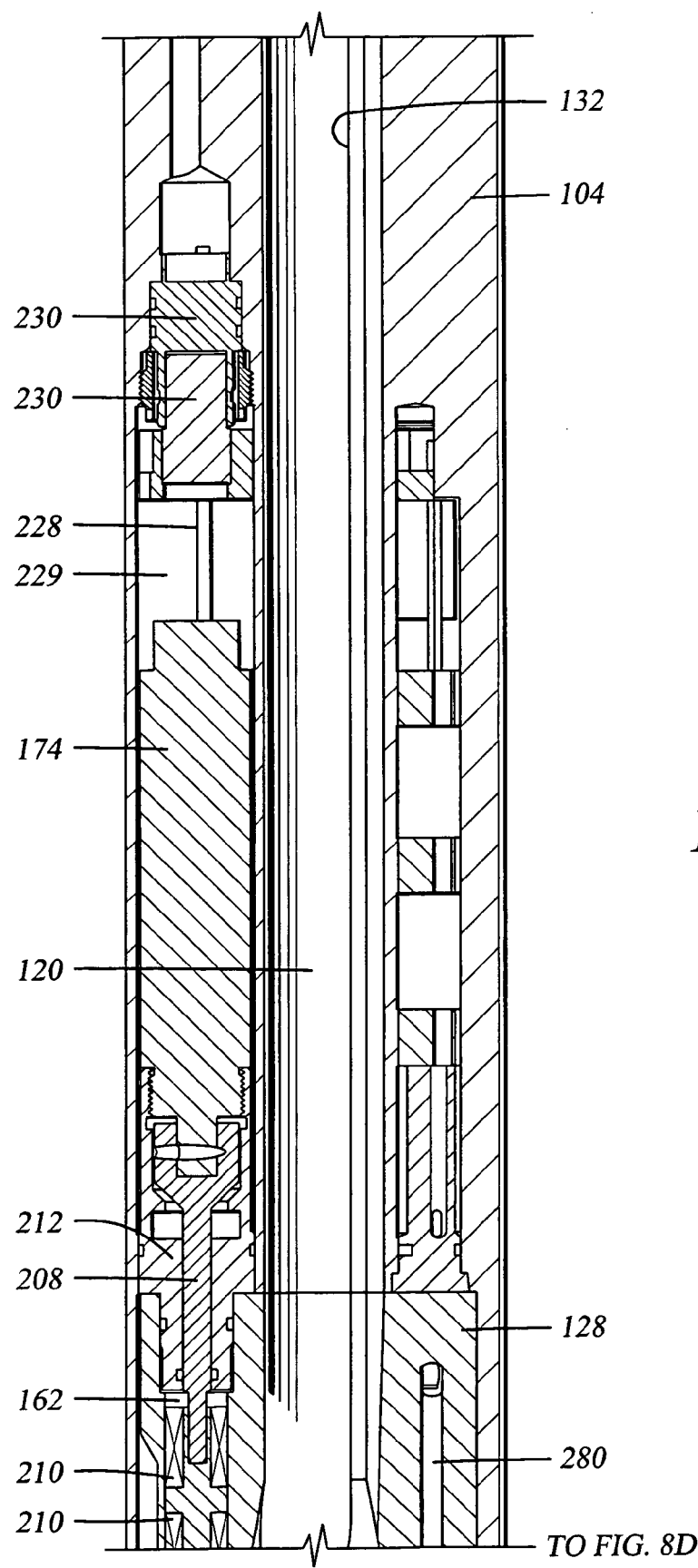

Referring now to FIGS. 6 and 7, the downhole coiled tubing propulsion system 120 serves multiple purposes including the thrusting or propulsion of the bottom hole assembly 30 in either direction, the resistivity measurements of the surrounding formation, and the steerable assembly 124 for pay zone steering the borehole trajectory. Propulsion system 120 includes a housing 106 which has a flow bore 114 therethrough for the drilling fluids flowing down through flowbore 46 of composite coiled tubing 20. It should be appreciated that there must be sufficient flow area to obtain adequate down hole flow and yet maintain sufficient wall thickness in housing 106.

For self-propulsion, propulsion system 120 becomes the prime mover and includes a downstream packer-like traction module 102 and an upstream packer-like traction module 104. It should be appreciated that the propulsion system 120 may include more than two traction modules. Housing 106 of propulsion system 120 includes a downstream section 108 and an upstream section 112 and is approximately 20 feet long with each of the housing sections 108, 112 being approximately 10 feet long. A power output shaft 116 extends through central flowbore 114.

As best shown in FIG. 7, there is shown a cross-section of traction module 102. Since traction modules 102, 104 are similar in construction, a description of one traction module approximates the description of the other. Traction module 102 includes steel feet 96 around its outer circumference which may be expanded and contracted into engagement with the wall of borehole 12. A plurality of flutes or longitudinal fluid flow passages 98 are provided around the inner circumference of the steel bands forming feet 96 to allow drilling fluid to flow upstream through annulus 82 when traction module 102 is expanded into engagement with the wall of borehole 12. Traction modules 102, 104 may have independently inflatable, individual chambers, as hereinafter described in detail, for expanding modules 102, 104 eccentrically with respect to the housing 106. Another embodiment of the traction modules is disclosed in U.S.

patent application Ser. No. 09/845,473 filed Apr. 30, 2001, hereby incorporated herein by reference.

Downstream housing section 108 includes a tubular cylinder 126 in which is disposed a hydraulic ram 128 on which is mounted downstream traction module 102. Hydraulic ports 130, 132 are disposed at the opposite ends of tubular cylinder 126 for applying hydraulic pressure to ram 128. Hydraulic ports 134, 136 are disposed adjacent downstream traction module 102 for expanding and contracting the traction module in and out of engagement with the wall of borehole 12. It should be appreciated that upstream housing section 112 is similar in construction and operation. It should also be appreciated that propulsion system 120 includes a series of valves using fluid pressure for the actuation of traction modules 102, 104 and rams 128, 129 mounted on traction modules 102, 104, respectively.

The cycle of propulsion system 120 includes expanding downstream traction module 102 into engagement with the interior of borehole 12 with the upstream traction module 104 in the contracted and non-engaged position. Hydraulic pressure is applied through hydraulic ports 130 applying pressure to ram 128. As pressure is applied against ram 128 which is stationary due to its attachment to engaged traction module 102, housing 106 moves down hole driving bit 140 forwardly upstream. Hydraulic fluid is simultaneously applied through hydraulic port 142 causing contracted upstream traction module 104 to move forward on upstream housing section 112. Upstream traction module 104 moves forward simultaneously with housing 106 moving downhole and actuating the bit 140. Once the downstream traction module 102 reaches the upstream end of tubular cylinder 126, it has completed its forward stroke and is contracted. Simultaneously, upstream traction module 104 has now completed its travel to the downstream end of tubular cylinder 127 and it is in its reset position to start its downward stroke of bit 140. Traction module 104 is then expanded into engagement with borehole 12. As hydraulic pressure is applied through hydraulic port 131 and against upstream ram 129, propulsion system 120 strokes downwardly against bit 140. Simultaneously, downstream traction module 102 is contracted and reset by applying hydraulic pressure through upstream port 132. The cycle is then repeated allowing the propulsion system 120 to move continuously downstream in one fluid motion and provide a downward pressure on drill bit 140. Each stroke approximates the length of housing sections 108, 112.

It should be appreciated that the hydraulic actuation may be reversed whereby propulsion system 120 may be moved upstream in borehole 12. In other words, propulsion system 120 can walk either forward, downstream, or backward, upstream in borehole 12. It also should be appreciated that although propulsion system 120 is shown as being hydraulically actuated, it may also be operated electrically with power being provided by power transmission conductor 43.

It should be appreciated that although the propulsion system 120 has been described with two traction modules, the propulsion system 120 may be configured with additional traction modules, such as three traction modules, depending upon the application.

Western Well Tool, Inc. manufactures a tractor having expandable and contractible upstream and downstream packerfeet mounted on a hydraulic ram and cylinder for self-propelling drilling bits. The Western Well Tool tractor is described in a European patent application PCT/US96/13573 filed Aug. 22, 1996 and published Mar. 6, 1997, publication No. WO 97/08418, hereby incorporated herein by reference.

Other propulsion systems may be adapted for use with the bottom hole assembly 30 of the present invention. Other types of tractors include an inchworm by Camco International, Inc., U.S. Pat. No. 5,394,951, hereby incorporated herein by reference and by Honda, U.S. Pat. No. 5,662,020, hereby incorporated herein by reference. Also robotic tractors are produced by Martin Marietta Energy Systems, Inc. and are disclosed in U.S. Pat. Nos. 5,497,707 and 5,601,025, each incorporated herein by reference. Another company manufactures a tractor which it calls a "Helix". See also "Inchworm Mobility—Stable, Reliable and Inexpensive," by Alexander Ferworn and Deborah Stacey; "Oil Well Tractor" by CSIRO-UTS of Australia; "Well Tractor for Use in Deviated and Horizontal Wells" by Fredrik Schussler; "Extending the Reach of Coiled Tubing Drilling (Thrusters, Equalizers, and Tractors)" by L. J. Leising, E. C. Onyia, S. C. Townsend, P. R. Paslay and D. A. Stein, SPE Paper 37656, 1997, all incorporated herein by reference. See also "Well Tractors for Highly Deviated and Horizontal Wells", SPE Paper 28871 presented at the 1994 SPE European Petroleum Conference, London Oct. 25–27, 1994, all hereby incorporated herein by reference. Another is a tractor that does not grab the wall of the borehole to provide motive power down hole.

Other preferred embodiments of the drilling system may not utilize any downhole propulsion system at all and rely upon gravity. Such systems may be used for drilling shallow and deep wells and include engineered composite coiled tubing and a bottom hole assembly, such as discussed below. Various means may be used to place weight on the bit including, for example, the weight of the bottom hole assembly, the weight of the composite coiled tubing, and the force of the surface injector (injector head unit 518) for the coiled tubing, or any combination of these means.

Figure 12:
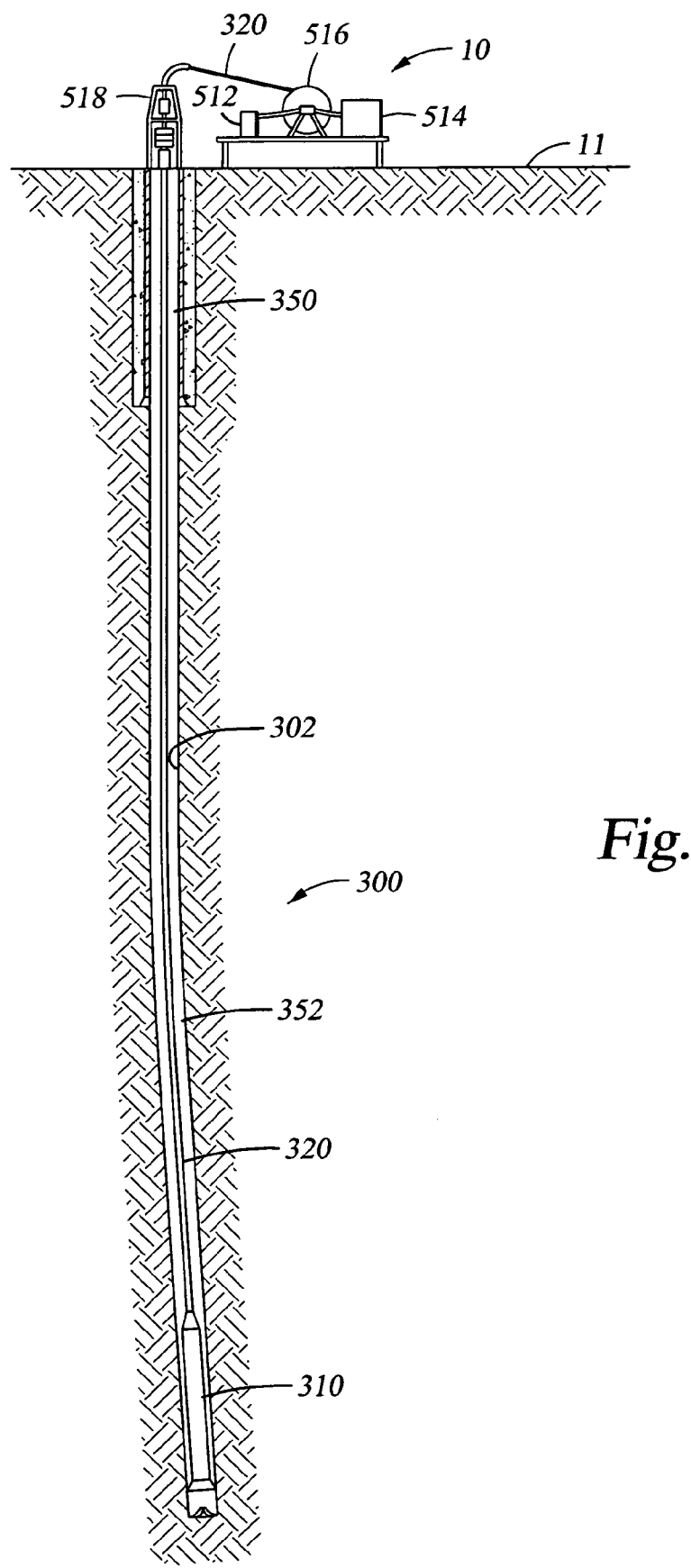
FIG. 12 is a schematic view of an example well for a gravity based drilling assembly.

Referring now to FIG. 12, there is shown one preferred embodiment of a gravity based drilling system 300 for drilling a borehole 302. The well shown in FIG. 12 is a land based well where borehole 302 is drilled with gravity based drilling system 300 from surface 11. Although borehole 302 is shown not to be a substantially deviated borehole like that shown in FIG. 1A, it should be appreciated that the borehole to be drilled using gravity based drilling system 300 may be a substantially deviated borehole. The more vertical the borehole 302, however, the greater the benefit of gravity on the gravity based drilling system 300. Obviously gravity will be its greatest in a substantially vertical borehole as compared to a highly deviated borehole. The greater the pull of gravity, the deeper the gravity based drilling system 300 may drill without assistance of other motive means, such as from injector head unit 518 or from the use of a propulsion system. It should be appreciated that this embodiment is not limited to the particular borehole disclosed and may be used for drilling various boreholes, shallow or deep, which may or may not be highly deviated.

Gravity based drilling system 300 includes a bottom hole assembly 310 attached to the lower end of a composite coiled tubing string 320 and extending into borehole 302. The coiled tubing system 10 for handling composite coiled tubing string 320 has been described with respect to FIGS. 1A and 1B. As distinguished from other described drilling systems, the gravity based drilling system 300 does not include a propulsion system, such as a tractor.

Composite coiled tubing 320 is substantially the same as composite coiled tubing 20 previously described with the exception that composite coiled tubing 320 is not substantially neutrally buoyant and does not include conductors embedded in the wall of the composite coiled tubing. In deep near vertical wells, such as deepwater wells, the composite coiled tubing 320 is preferably not substantially neutrally buoyant thereby allowing all of the weight of the composite coiled tubing 320 to be applied to the weight on bit. In nearly vertical wells, hole cleaning issues are minimized. In certain circumstances, such as high-angle wells which also do not require a great reach, the composite coiled tubing 320 may be engineered to have some limited buoyancy. In high-angle wells, buoyancy reduces drag on the tubing and the resultant helical buckling in the high angle portion of the well. In another example, the weight to be placed on the bit may be balanced with the ability to pull on the composite coiled tubing. Thus the composite coiled tubing may be engineered to have any pre-determined buoyancy.

Composite coiled tubing 320 thus may be called "non-conductor" composite coiled tubing since no energy or data conductors are embedded in the wall of the tubing. Although it is preferred that tubing 320 be continuous coiled tubing, it should be appreciated that the composite tubing may be jointed pipe. One type of composite pipe includes steel tool joints.

By way of example, gravity based drilling systems may have different dimensions. One system may include a 3.06 inch composite coiled tubing 320 for a 3⅛ inch bottom hole assembly 310. Another system may include a 4¼ inch composite coiled tubing 320 and a 4¾ inch BHA 310. A still another system may include a 5½ inch composite coiled tubing 320 and a 6¾ inch BHA 310.

Figure 13:
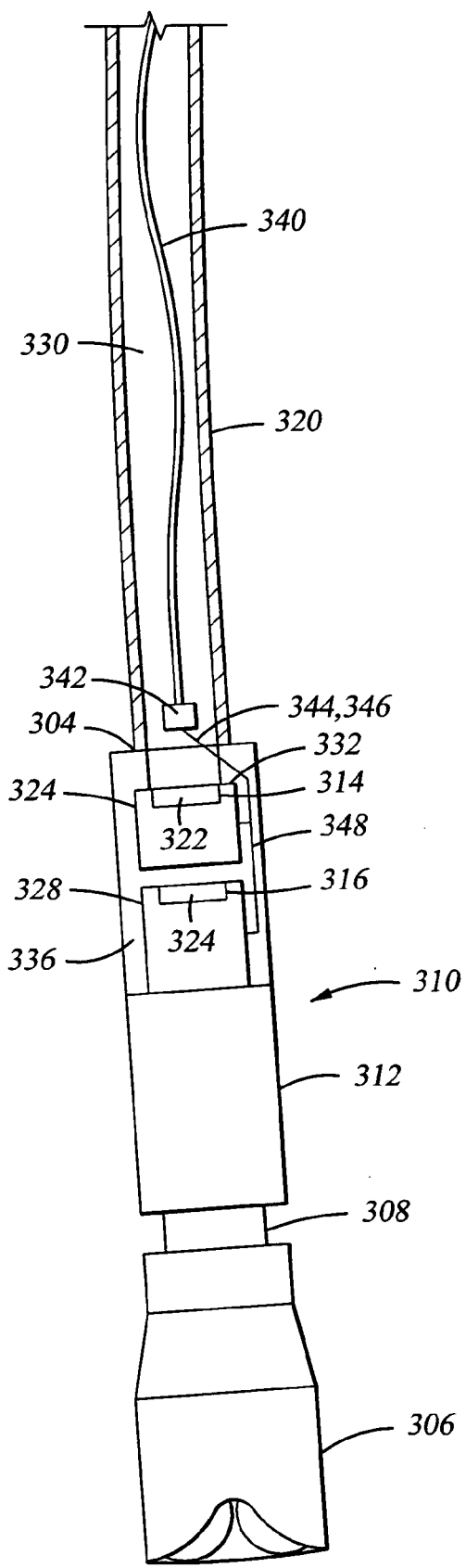
FIG. 13 is an enlarged view of the bottom hole assembly shown in FIG. 12 connected to the downstream end of a non-conductor composite coiled tubing.

Referring now to FIG. 13, there is shown bottom hole assembly 310 connected at 304 to the lower end of composite coiled tubing string 320. Non-conductor tubing 320 may be connected to bottom hole assembly 310 using the connector described in U.S. patent application Ser. No. 09/534,685 filed Mar. 24, 2000, hereby incorporated herein by reference. The connector 304 may include a release mechanism such as release 80 previously described. Bottom hole assembly 310 includes a drill bit 306 mounted on the output shaft 308 of a downhole motor 312.

Above motor 312 and below connector 304 is disposed one or more one-way valves 314, 316. Check valves 314, 316 prevent formation fluids and pressure from entering composite non-conductor tubing 320 and flowing to the surface 11. The embodiments of valves 314, 316 shown in FIG. 13 include flappers 322, 324 hinged at 326, 328, respectively. It can be seen that flappers 322, 324 may be biased downwardly by the downward flow of fluids through the flowbore 330 of non-conductor tubing 320. It also can be seen that flappers 322, 324 prevent backflow by the engagement of flappers 322, 324 against stops 332, 324, respectively, on a housing 336 serving as a part of bottom hole assembly 310. It should also be appreciated that valves 314, 316 could be dart or poppet valves.

Downhole motor 312 may be powered by the drilling fluids flowing through non-conductor tubing 320 and bottom hole assembly 310 and may be a standard positive displacement motor or turbine. It should also be appreciated that downhole motor 312 may be powered by one or a combination of power sources including a hydraulic drive, an electric drive, a turbine, a vane type motor, or any other downhole motor for powering bit 306. The bottom hole assembly 310 may also merely include a non-instrumented motor 312 for a vertical well, the non-instrumented motor having no communication with the surface. A non-instrumented motor does not include any instruments and its sole function is to merely rotate the bit.

One preferred gravity based drilling system 300 includes non-conductor tubing 320 (no conductor embedded in the tubing wall), a non-instrumented downhole motor 312, a check valve such as either valve 314 or 316, and a bit 306. The non-conductor tubing 320 includes a composite tube which is non-isotropic and whose modulus elasticity is not the same in all axes nor is it linear. Non-conductor tubing 320 is preferably engineered by the construction of fibers helically wound in a preferred manner and angle around the liner with the fiber in a bond or epoxy. Alternatively the basic drilling system 300 may also include an energy conductor 340 extending down the flowbore of the non-conductor composite coiled tubing 320.

It should be appreciated that gravity based drilling system 300 may or may not include telemetry for communication between the surface 11 and bottom hole assembly 310. In a basic embodiment, no telemetry is provided for gravity based drilling system 302. Should a telemetry means be desirable, the telemetry means may include mud pulse telemetry, acoustic telemetry, electromagnetic (EM) telemetry, fluid column telemetry, or electric conductor (E-line) telemetry.

For purposes of illustration, FIG. 13 includes an electric wireline 340 extending from the surface 11 down through the flowbore 330 of non-conductor tubing 320. The lower end of electric wireline 340 is connected by a connector 342 to one or more wires 344, 346 extending from one or more conduits 348 in the wall of housing 336. Wires 344, 346 extend through conduits 348 to downhole motor 312 having an electric motor (not shown) for rotating bit 306. See SPE 54469: "The All Electric BHA: Recent Developments toward an Intelligent Coiled-Tubing Drilling System", by Turner, Head, Yuratich and Cameron prepared for presentation at the 1999 SPE/CoTA Coiled Tubing Roundtable May 25–26, 1999; SPE 68441: "Electric Coiled Tubing Drilling (E-CTD) Project Update" by Head, Yuratich, and Hanson prepared for presentation at the SPE/ICoTA Coiled Tubing Roundtable Mar. 7–8, 2001; and SPE 68489: "New DC Motor for Downhole Drilling and Pumping Applications" by Turner, Head, and Yuratich prepared for presentation at the SPE/CoTA Coiled Tubing Roundtable Mar. 7–8, 2001, all hereby incorporated herein by reference. U.S. Pat. Nos. 4,039,237; 4,220,381; 4,557,538; and 4,496,203 disclose extending an electrical conductor through drill pipe, all hereby incorporated herein by reference.

Electric line 344, 346 and wireline 340 provide bi-directional communication between the surface 11 and BHA 310 while also providing power to downhole motor 312. Although not described with respect to gravity based drilling system 300, it should be appreciated that wires 344, 346 may also be connected to one or more downhole sensors, such as hereinafter described, which are disposed in or a part of bottom hole assembly 310. Although preferred but not required, bottom hole assembly 310 may include a downhole pressure sensor, such as an annular pressure sensor, for measuring downhole pressures at the bottom of borehole 302. BHA 310 may include all the sensors and actuators in the bottom hole assemblies previously described.

Other components are optional. Typically certain basic downhole information is to be transmitted to the surface. For example, it is preferred to know the annulus pressure downhole for well control purposes. A steerable assembly may not be required. Preferably the bottom hole assembly includes tension/compression subs although it may be possible to drill without such subs.

Since there is no propulsion system, as distinguished from bottom hole assembly 30 previously described, various means may be used to place weight on bit 306. One means includes using injector 518 to apply a downward force on tubing 320 and thus bottom hole assembly 310. It should be appreciated that injector 518 may place a force on the tubing without regard to whether the tubing is a non-conductor tubing (no conductor embedded in the tubing wall) or a conductor tubing (one or more conductors embedded in the tubing wall). Another means includes adding drill collars to the bottom hole assembly 310. Still another means includes using the weight of the composite coiled tubing 320 to apply weight on bit 306. Other motive means may also be used to assist bit 306 in drilling borehole. One such means includes a vibrating tool which vibrates the bottom hole assembly 310. A still another motive means includes a hydraulic thruster as part of the bottom hole assembly 310. A still another motive means includes the cycling of the pumps at the surface causing a pulsation of the drilling fluid passing through bottom hole assembly 310. By varying the surface pump speed, it is possible to achieve a small increase on weight on bit. For example, the pump rate may be varied from 50 to 90 gallons per minute over a minute or two. Nominal drilling flow rate is typically 90 gpm. This change in pump rate causes a pressure variation in the inside diameter of the tubing. At higher pressures, the tubing outside diameter slightly increases and the length of the tubing decreases. As the length decreases, the injector advances additional tubing into the borehole. When the pump rate decreases, the outside diameter of the tubing slightly decreases, and the tubing length increases. This increase in tubing length adds a small incremental weight on bit. A still another motive means includes using an orifice or vortex valve to cause a pulsation. One such pulsation system is sold by Rogaland.

In operation, the gravity based drilling system 300 is lowered into the well such as through a structural or conductor casing 350 previously installed and cemented into the borehole. Bottom hole assembly 310 is lowered by gravity through casing 350 to drill borehole 302. Drilling fluid is pumped down the flowbore 330 of non-conductor tubing 320 and through bottom hole assembly 310. The flow of drilling fluids opens valves 314, 316 and, in the case of a hydraulic downhole motor, drives downhole motor 312 which in turn rotates bit 306 on drive shaft 308. The drilling fluids pass through nozzles (not shown) in bit 306 and then flows back up the annulus 352 carrying the cuttings from bit 306 to the surface 11. Gravity based drilling system 300 continues drilling the borehole 302 either to the target depth or to a depth requiring the setting of casing.

Referring now to FIG. 14, there is shown another preferred embodiment of a gravity based drilling system 350 particularly adapted for drilling subsea wells, and is more particularly adapted to drill in deep water. The drilling system 350 extends from the floor of 352 of a platform 354. Although the platform may be a fixed platform extending from the seabed 356, in deep water wells, platform 354 is a floating platform and may be a platform on a floating drilling vessel. Various controls 358 are disposed on platform 354 for receiving and sending signals downhole. Such controls are well known in the art. It should be appreciated that blowout preventers and other requisite safety control equipment 360 may also either be disposed on platform 354 or at the seabed 356 for drilling and completing the well. The gravity based drilling system 350 includes a bottom hole assembly 370 connected to the lower end of composite coiled tubing 380 and extending into borehole 362 being drilled by gravity based drilling system 350. It should be appreciated that this embodiment is not limited to the particular subsea borehole disclosed, it being appreciated that the present invention may be used with any borehole where a gravity based drilling system may be used. Although not shown in FIG. 14, it should be appreciated that a coiled tubing operation system such as system 10 shown in FIGS. 1A and 1B may be used with drilling system 350. For example, the composite coiled tubing 380 may be deployed from an automated reel system with a capacity of over 20,000 feet of composite coiled tubing.

It should be appreciated that drilling system 300 disclosed and described with respect to FIGS. 12 and 13 may be used to drill a subsea well such as that illustrated in FIG. 14 and may be described as a basic gravity based drilling system. It should be appreciated, however, that in drilling a subsea well in deep water, a more sophisticated drilling system, such as that to be shown and described in FIG. 14 is preferred. It further should be appreciated that the drilling system is designed and include components which are specifically directed to the well plan for a particular deep well and/or subsea well.

Composite coiled tubing 380 may be non-conductor tubing, such as tubing 320 described with respect to FIGS. 12 and 13, or may include non-conductor tubing 320 with one or more of the telemetry means described with respect to FIGS. 12 and 13. The telemetry means for gravity based drilling system 350 preferably includes a direct connection between controls 358 at the surface and bottom hole assembly 370. Various means may be used for extending one or more conductors from the surface to bottom hole assembly 370. One means includes extending a wireline from the surface to bottom hole assembly 370. The wireline may merely extend through the flowbore of composite coiled tubing 380 without attachment to tubing 380. The wireline in the flowbore hinders the passage of tools through the flowbore of tubing 380. Another possibility is to run the wireline on the OD of the tubing and use a downhole side entry sub. Such methods are not optimal since drilling fluid must flow through tubing 380 or through the annulus and thus will continually wash over the conductors. Also, conductors run on the OD of the tubing can be pinched and/or damaged against the borehole wall.

Another means may include attaching a conductor to either the interior wall or exterior wall of composite coiled tubing 380. For example, the conductor may be affixed to the inside wall of composite coiled tubing 380, such as by glue or a sheath. Another method may include attaching the conductor to the outside surface of composite coiled tubing 380, such as by placing a sheath around the outer surface of tubing 380 and the conductors on the outside of tubing 380. These methods are not optimal since it is possible that the conductors will separate from either the inner or outer surfaces of tubing 380. A further concern with attaching conductors to tubing 380 is any disparity in the elasticity between the tubing 380 and conductors attached thereto. If the modulus is different, then one may tend to expand or contract to a greater extent than the other, thus causing the conductor to disassociate from the tubing.

It should be appreciated that tubing 380 may, in certain circumstances, be metal coiled tubing rather than composite coiled tubing. The elasticity of metal coiled tubing and metal wire for the conductors are more similar while the elasticity between composite pipe and metal conductors is very different, particularly when the tubing is placed under pressure. When the coiled tubing is pressured up, composite coiled tubing tends to shorten while the metal conductor tends to lengthen. This will cause the cable head at the upper end of the conductor to bird nest.

For the above reasons, it is preferred that composite coiled tubing 380 be substantially the same as composite coiled tubing 20 previously described. Thus, for purposes of the description of the gravity based drilling system 350 in FIG. 14, it shall be assumed that composite coiled tubing 380 includes a plurality of conductors, such as those described in FIG. 3 with respect to composite coiled tubing 20. The conductors 40 are embedded within the load carrying layers of the composite coiled tubing. Conductors 40 may include one or more copper wires for the transmission of electrical power from the surface to the bottom hole assembly 370 and for providing telemetry, i.e. two-way communication between the control center at the surface and the data acquisition systems in the bottom hole assembly 370. For example, there may be six conductors extending through composite coiled tubing 380, 4 conductors being power conductors and 2 conductors being data conductors providing high speed up links carrying communications between the surface and bottom hole assembly 370 whereby data may be transmitted to the surface real-time.

Referring now to FIG. 15, there is shown an enlarged view of bottom hole assembly 370. Bottom hole assembly 370 forms a digitally controlled automated coiled-tubing drilling system to form an advanced well construction system. It should be appreciated that the components to be described with respect to bottom hole assembly 370 are one preferred set of components and that the components will vary and include different combinations depending upon the well plan. Starting from the lower end, bottom hole assembly 370 includes a bit 372, a three dimensional sliding tool or steerable assembly 374, a downhole motor 376, such as a positive displacement motor, a resistivity tool 378 such as a formation resistivity measurement tool, an electric disconnect 382, a focused gamma ray sensor 384, a directional sensor 386, a tension/compression sub 390, a pressure/temperature sub 392, an circulation sub 394, a casing collar locator 398, a ball drop disconnect 400, a voltage-converter sub 402, and a weight on bit or motive means 404. The circulation sub 394 is electronically operated and employs ports to the annulus so that high circulation rates can transport cuttings and lost-circulation material can be pumped without risk of plugging the bottom hole assembly 370. The more vertical the borehole, however, the less the need for the circulation sub 394. The tension/compression sensor 390 is also integral to the bottom hole assembly 310. The tension sensor 390 measures the force applied by the motive means 404 to the bit 372. In deep water drilling, logging sensors may also be included in the bottom hole assembly 370. It should be appreciated, however, that logging may be conducted after the borehole has been drilled.

High value wells require a downhole pressure sensor. In deep water, downhole pressure measurement is preferred. It is highly preferable to include a downhole pressure sensor in the bottom hole assembly 370, although such a sensor is not essential. Pressure/temperature sub 392 includes an annulus pressure sensor and a differential pressure sensor to provide real-time hydraulics analysis. The annulus pressure sensor provides bottom hole pressure measurements during operating modes including drilling, tripping, circulating, and static modes. These real-time measurements can be used for equivalent circulating density (ECD) monitoring, preventing excessive swab-surge pressures during tripping, and optimizing hole cleaning. In addition, the pressure measurement can be used for performing leak off tests, detecting flow in/or kick during drilling, and optimizing drilling practices. Downhole pressure while drilling real-time is extremely valuable to the operator.

It should be appreciated that although real-time telemetry is preferred, it is not essential and other telemetry means, previously described, such as mud pulse telemetry may be used to communicate downhole pressure to the surface. Good telemetry is important, particularly for well control. Mud pulse telemetry has limitations in that it may not be used when fluid circulation downhole has been stopped or has too slow a flow rate for mud pulse telemetry to work. In electro-magnetic telemetry, a signal is sent through the earth. However, although the radio signals pass well through the earth, they do not pass through water. Thus, the electromagnetic telemetry is limited by depth and formation type and is particularly dependent upon the resistivity of the formation. Although repeaters may be used that are spaced along the pipe to continue the sending of the signals, these repeaters are in the pipe.

The present drilling system 370 allows the transmission of real-time bottom hole data through the embedded conductors in composite coiled tubing 380. Real-time bottom hole data allows the operator to perform intricate remote geo steering. The driller may observe real-time data variables such as pump pressures and can monitor the drilling fluid system, valves, and fluid-flow rates. Flow measurement is particularly important for well control. In addition, the resistivity tool 378, focus gamma ray sensor 386, the upper and lower tension/compression subs 388, 390, directional sensor and casing collar locator 398 provide real-time drilling information for the operator. The lower tension/compression sub 390 measures the weight on bit to control the force on the bit with precision. The injector 518 at the surface may be controlled directly by the data from the upper tension/compression sub 396. The injector 518 is preferably a 100 kip block gripping mechanism.

The gravity based drilling system 350 shown in FIG. 14 is particularly applicable to slim hole drilling. Slim hole drilling typically includes the drilling of boreholes which have a 6½ inch diameter or less. The drilling of slim hole boreholes requires precision drilling.

The gravity based drilling system 350 is particularly advantageous when drilling from a floating drilling platform 354 such as a floating drilling vessel. Drilling system 350 is much smaller than conventional drilling systems. Further, the use of metal coiled tubing from a floating platform or vessel is not practical because the metal pipe fatigues as the floating vessel or platform heaves. Composite coiled tubing is advantageous because it is very fatigue resistant.

The gravity based drilling system 350 may pass through a high pressure riser extending from the subsea floor 356 and platform 352. It should be appreciated that conventional low pressure risers may also be used but are less economical. Where open water drilling is permitted, a riser is not required between the mud line and surface.

The economic savings using the gravity based drilling system 350 are greater the deeper the water and/or the deeper the well. With respect to well depth, if a mono-diameter wellbore is achieved, the depth that a well may be drilled using the gravity based drilling system 350 is only limited by the hydraulics of the well.

Figure 16:
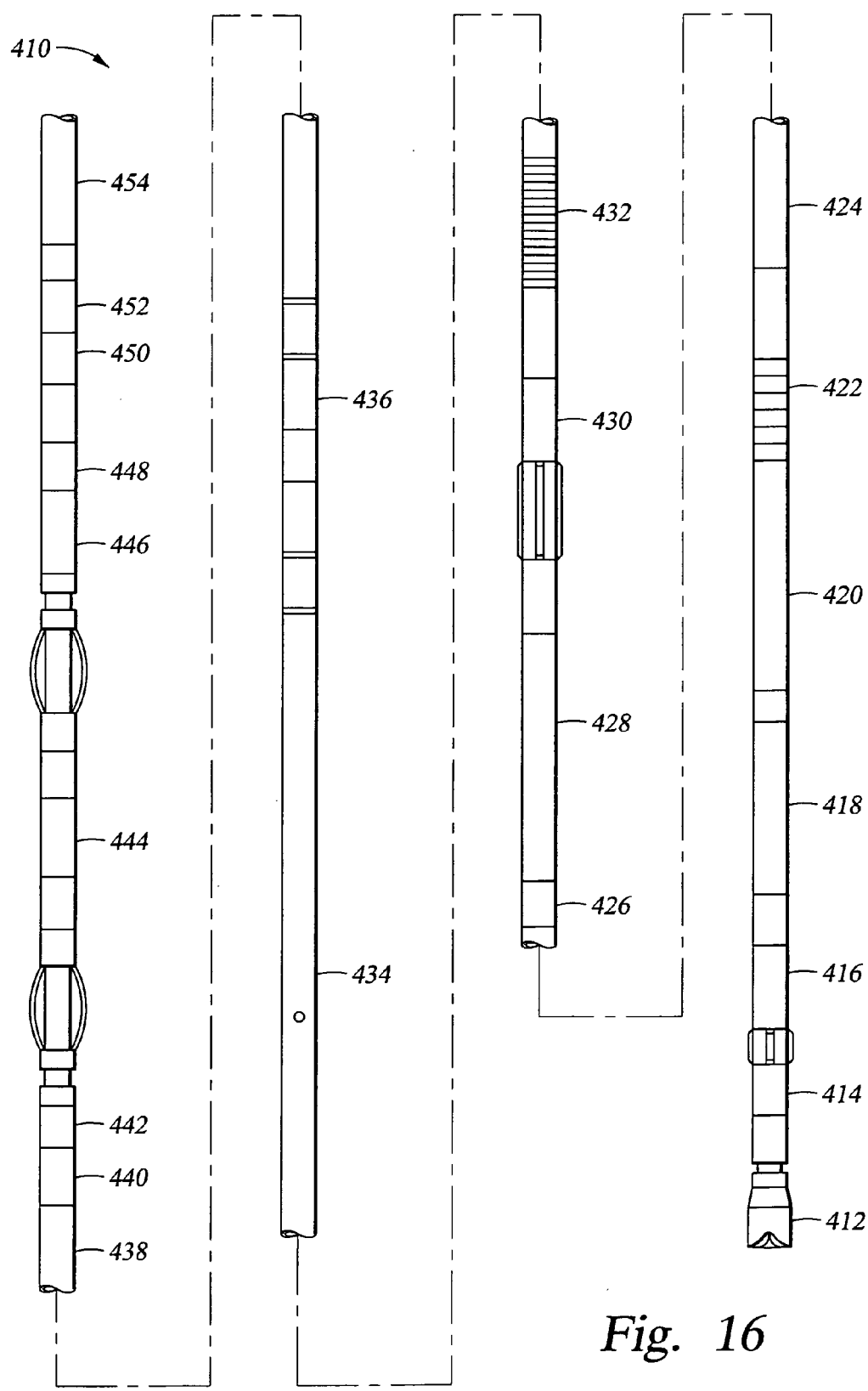
FIG. 16 is an enlarged view of another bottom hole assembly for use in the well shown in FIG. 14 and connected to the downstream end of conductor composite coiled tubing.

Referring now to FIG. 16, it should also be appreciated that the drilling system may include a propulsion system or tractor where the initial part of the borehole is drilled using gravity and the lower portion of the borehole is drilled using the propulsion system. Bottom hole assembly 410 forms a digitally controlled automated coiled-tubing drilling system to form an advanced well construction system and is particularly suited for deepwater development drilling. Starting from the lower end, bottom hole assembly 410 includes a directional drilling section having a bit 412, a three dimensional steering tool or steerable assembly 414, a near bit attitude 416, and a downhole motor 418, such as a positive displacement motor. The assembly 410 also includes a geo-steering section having a quad focused gamma ray sensor 420, a formation resistivity measurement tool 422, and a directional sensor 424. The assembly 410 then includes a formation evaluation section having an acoustic caliper tool 426, a compensated thermal neutron tool 428, an azimuthal density tool 430, and a bi-modal acoustic (BAT) sonic tool 432. The assembly includes a fluid evaluation section having a formation tester 434, and an magnetic resonance imaging (MRI) logging while drilling (LWD) tool 436. The assembly then includes a drilling dynamics section having a lower electric circulation sub 438, a weight on bit (WOB) sub 440, and a pressure while drilling sub 442. The assembly then has a propulsion section with a tractor 444. The assembly includes an intervention section having an upper electric circulation sub 446, a tension/compression sub 448, a supervisory sub 450, and a ball drop disconnect 452. The upper end of the assembly 410 is connected to the lower end of conductor composite coiled tubing 454. It should be appreciated that the components described with respect to bottom hole assembly 410 are one preferred set of components and that the components will vary and include different combinations depending upon the well plan. Bottom hole assembly may also include an electric disconnect, a pressure/temperature sub, a casing collar locator, and a voltage-converter sub.

The components of the bottomhole assembly 410 serve various functions. The near bit attitude sensor 416 measures inclination and azimuth. The quad focused gamma ray sensor 420 preferentially measures natural gamma radiation from different sectors of the borehole. The formation resistivity measurement tool 422 performs an array of formation resistivity measurements. The directional sensor 424 includes three accelerometers and three magnetometers that are used for determining tool face, inclination, and azimuth. The sensor 426 provides near bit inclination and azimuth and sensor 424 provides a definitive survey measurement. The acoustic caliper tool 426 measures the diameter of the borehole and has three, or more, acoustic transducers that pulses out an acoustic wave and has a receiver or detector that measures interval transit time to deduce standoff at each detector/transmitter. The compensated thermal neutron tool 428 is a neutron porosity tool for determining the porosity of the formation. The azimuthal density tool 430 measures bulk density of the formation, i.e., grams per cc. The bi-modal acoustic (BAT) sonic tool 432 is an acoustic tool that measures the acoustic transit time in the formation and also measures porosity. Acoustic tool measurements can be used to calibrate seismic data, which is time based, so that the transit time can be integrated with the depth to achieve a time depth conversion. It is also used for rock strength calculations. The magnetic resonance imaging (MRI) logging while drilling (LWD) tool 436 looks at fluids and measures permeability. It determines the fluids and the percentage of the fluids in the formation. It determines how much moveable hydrocarbons, gas, oil and water, i.e., residual oil, gas and water, in the well. The pressure while drilling sub 442 includes a pressure sensor and a temperature sensor for measuring the pressure while drilling and particularly the pressure in the borehole around the bottomhole assembly and the pressure inside the bottomhole assembly. The sub 442 sends real time pressure measurements to the surface. The supervisory sub 450 is a down hole master controller and serves as a downhole CPU which acquires all of the data from the sensors in the bottomhole assembly and then it sends that data to the surface. The weight on bit (WOB) sub 440 and tension/compression sub 448 take similar measurements. Sub 448 measures the tension on the work string and the WOB sub 440 measures the weight being place on the bit. Weight on bit is measured as a negative force while tension is measured as a positive force.

Referring now to FIGS. 8A–E, illustrating a preferred embodiment of the steerable assembly 124. One embodiment of the steerable assembly 124 includes a body having a nose connected to the body by a jointed connection with the nose operatively connected to the bit. An actuator is movably mounted on the body and engages the nose to move the nose with respect to the body at the jointed connection to alter the nose axis with respect to the body axis at the jointed connection. The actuator has a first position altering the nose axis with respect to the body axis forming a first direction of drilling of the bit and a second position altering the nose axis with respect to the body axis forming a second direction of drilling. The actuator alters the nose axis from the first position to the second position while the bit is in the borehole and may alter the positions while the assembly is drilling. This embodiment is described in detail in U.S. patent application Ser. No. 09/467,588 filed Dec. 20, 1999, hereby incorporated herein reference.

It is possible that the traction modules may rotate slightly in the opposite direction of the bit rotation due to reactive torque. The downhole coiled tubing propulsion system 120 may include an integral counter rotation device to automatically counter rotate the propulsion system 120 to maintain correct orientation of the bend angle such that the correct direction of the borehole trajectory is maintained.

The downhole coiled tubing propulsion system 120 contains an integral WOB/TOB (weight on bit and torque at bit) sensor. This sensor provides information to the surface computer which process the data and then issues instructions to the propulsion system 120 such that the bit RPM and applied weight on the bit can be modified to optimize ROP (rate of penetration) and reduce bit bounce and bit balling. Flow rates and flow pressure can also be modified to improve ROP.

In operation, the propulsion system 120 is maintained in one orientation such that upon actuation of steerable assembly 124, there is a known inclination at the bit 140.

This formation data is then transmitted via conductors 40 from electronics section 181 to the surface where it is processed by the controls 21 to identify the formation properties immediately surrounding the bottom hole assembly 30. The combination of resistivity measurements, gamma, inclination at bit all facilitate pay zone steering from the surface.

Several companies manufacture a resistivity tool including Halliburton, Schlumberger, Dresser Sperry, Inc. and Baker Hughes. Resistivity tools are also described in U.S. Pat. No. 5,318,138, incorporated herein by reference.

The resistivity measurements from the resistivity tool 121 and the tri-axial accelerometers are the primary measurements for geo-steering or pay zone steering of the well path. These measurements are processed at the surface to ensure the proper direction of the drilling of bit 140 or if necessary, to correct the direction of the well path by means of the steerable assembly 124.

Although resistivity tool 121 has been shown as being included with bottom hole assembly 30, it should be appreciated that a resistivity tool is not required to operate the drilling system 10 of the present invention. Further, because the drilling system 10 of the present invention will often be used in existing wells, the existing wells will have previously been mapped and the coordinates of the bypassed hydrocarbon zones will have previously been determined such that a well plan can be designed with a geometric well path to the bypassed hydrocarbons without the need of their location through the use of resistivity or other pay zone steering sensors.

In operation, the bottom hole assembly 30 is assembled including bit 140, downhole coiled tubing propulsion system 120, steerable assembly 124, resistivity tool 121, electronics section 181, transmission 100, and power section 90. The bottom hole assembly 30 is then connected to the lower end of composite coiled tubing 20 to the top of the release tool 80. The bottom hole assembly 30 is lowered into the borehole 12 on composite coiled tubing 20. One preferred method of deploying the composite coiled tubing 20 in the well is to first deploy a 10,000 length of composite coiled tubing 20 and then deploy individual 1,000 foot lengths connected together by connector 50. Drilling fluids flow down the flowbore 46 of composite coiled tubing 20, through power section 90, the flow bore 114 through propulsion system 120, through the bit 140 and back up the annulus 82 to the surface. Where the power section 90 is a downhole positive displacement motor, turbine, or other hydraulic motor, the drilling fluids rotate the rotor within the stator causing the output shaft 116 extending through the propulsion system 120 to operatively rotate bit 140. The electrical conduit 41 in the composite coiled tubing 20 provides electrical power to the electronic section and all downhole sensors and is used to power the power section 90 when the power section 90 is an electric motor.

For additional information on directional drilling, see U.S. Pat. No. 5,332,048; Introduction to Petroleum Production, Chapters 2 and 3, Volume I, by D. R. Skinner; "State of the Art in MWD" by the International MWD Society, Jan. 19, 1993; "Measurements at the Bit: A New Generation of MWD Tools", April/July 1993 issue of Oilfield Review; "Anadrill Directional Drilling People, Tools and Technology Put More Within Your Reach" by Anadrill Schlumberger, 1991; "Predicting Bottom hole Assembly Performance" by J. S. Williamson and A. Lubinski, IADC/SPE 14764, 1986; "Technical Data Sheet for Navigator" by Baker Hughes Inteq, 1994; "An Underground Revolution, Integrated Drilling Evaluation and Logging" By Anadrill Schlumberger, 1995; "Ideal Wellsite Information System" by Anadrill Schlumberger; "The Navigator Sales Orientation Manual" By Frank Heam, John Hickey, Paul Seaton and Les Shale; and "Navigator Reservoir Navigation Service" by Baker Hughes 1996, all hereby incorporated herein by reference.

The propulsion system 120 propels the bit 140 into the formation for drilling the new borehole 12. The rate of penetration or feed is controlled from the surface. The only rotating portion of the bottom hole assembly 30 is the output shaft 116 and bit 140. The composite coiled tubing 20 and the remainder of the bottom hole assembly 30 do not rotate within the borehole 12. Thus, the drilling system 10 of the present invention only operates in the sliding mode in that the composite coiled tubing 20 never rotates for purposes of drilling. The tri-axial accelerometers and the resistivity tool 121 provide the operator at the surface with the orientation, direction and location of the bit 140 and the proximity of the borehole 12 relative to the pay zone in the formation. The propulsion system 120 may then be articulated by steerable assembly 124 to properly direct the bit 140 in response to the data from the directional and pay zone sensors. It should be appreciated that the bottom hole assembly 30 may be controlled by a control circuit, such as a microcontroller circuit in the controls 21 at the surface, which receives downhole signals and data through the conductors 42 in the wall of the composite coiled tubing 20, analyzes these signals and data, and then sends instructions downhole through the conductors 42 to direct the downhole operation. See for example U.S. Pat. Nos. 5,713,422 and 5,842,149, both hereby incorporated herein by reference. Also, see for example U.S. patent application Ser. Nos. 09/599,343 and 09/467,588; and U.S. application Ser. No. 10/017,176, filed Dec. 7, 2001 and entitled Burst QAM Downhole Telemetry System; both hereby incorporated herein by reference.

Referring again to FIG. 4, a jet sub may be disposed between the end connectors 56, 58 of connector 50. Circulation subs are shown and described in U.S. patent application Ser. No. 09/377,982 filed Aug. 20, 1999, now U.S. Pat. No. 6,349,763, hereby incorporated herein by reference. Apparatus and methods may be used to assist in the removal of cuttings. See U.S. patent application Ser. No. 10/229,964 filed Aug. 28, 2002 and entitled Method and Apparatus for Removing Cuttings; and U.S. patent application Ser. No. 60/416,020 filed Oct. 4, 2002 and entitled Method and Apparatus for Removing Cuttings from a Deviated Wellbore, both hereby incorporated herein by reference.

The drilling system of the present invention may be used to drill the initial borehole in a subsea well. See U.S. patent application Ser. No. 10/265,028 filed Oct. 4, 2002 and entitled Methods and Apparatus for Open Hole Drilling; and U.S. patent application Ser. No. 10/264,549 filed Oct. 4, 2002 and entitled Methods and Apparatus for Riserless Drilling; both hereby incorporated herein by reference.

It should be appreciated that although the bottom hole assembly 30 has been described with only one downhole coiled tubing propulsion system 120, the bottom hole assembly may include more than one downhole coiled tubing propulsion system 120 and may consist of two or more downhole coiled tubing propulsion systems such as in tandem to provide additional power for propelling the bit 140. Such downhole coiled tubing propulsion systems may contain two or more traction modules depending upon the application.

It should further be appreciated that the bottom hole assembly 30 need not be directed solely for use in drilling but may in fact be other well tools to perform other operations in a well. Such well tools include a well intervention tool, a well stimulation tool, a logging tool, a density engineering tool, a perforating tool, or a mill.

For example, the bottom hole assembly may include a casing collar locator in the drilling system to verify depth correction algorithms. The casing collar locator will be able to count the casing. A log of the casing that is in the well is then used to provide a very precise length measurement. Thus, the casing collar locator is used initially to verify depth algorithms that correct for stretch of the coiled tubing. The casing collar locators can also be used for perforating once the liner is set. Once the liner is set, the casing collar locator is used for precise placement of perforations in the liner. This same assembly would be used with perforating guns in front of it. The other pieces of the bottom hole assembly will be used such as the pressure measurement sub and the tension sub along with perforating guns suspended out in front of the bottom hole assembly. The casing collar locator allows the very precise location of the perforating guns inside the liner. An electrical signal then would be used to fire the perforating guns. An example of a casing collar locator and method of use is included in U.S. patent application Ser. No. 09/286,362 filed Apr. 5, 1999; and U.S. patent application Ser. No. 10/121,399 filed Apr. 12, 2002 and entitled Magnetically Activated Well Tool; both hereby incorporated herein by reference.

The composite coiled tubing 20 is not required to withstand a great amount of tension or compression. As the drilling fluids pass down the flowbore 46 and up the annulus 82, the drilling fluids provide a buoyancy to composite coiled tubing 20 thereby reducing the tension and compression placed on composite coiled tubing 20. Further, since composite coiled tubing 20 does not rotate within the borehole, composite coiled tubing 20 is isolated from any reactive torque from bottom hole assembly 30.

The composite coiled tubing 20 also has sufficient tensile and compression strength to withstand most extraordinary conditions during drilling. For example, if the bottom hole assembly 30 becomes stuck in the well, the composite coiled tubing 20 has sufficient tensile strength to withdraw the stuck bottom hole assembly 30 in most situations. Further, if the bottom hole assembly 30 is run into a producing well, the composite coiled tubing 20 may be run in against the pressure of the producing well which applies compressive loads as the result of hydrostatic or formation pressures. This sometimes occurs in a workover well to be restimulated to enhance production. The composite coiled tubing 20 will have internal pressure from the drilling fluids so as to balance the external well pressure as well as adequate collapse strength.

The electronics used in the electronics section 181 are inexpensive as compared to the electronic components of conventional bottom hole assemblies. Thus, even if the electronics were to degrade over time because of high temperatures, the bottom hole assembly 30 may be retrieved from the well and the electronic boards in the electronic section 181 replaced or repaired.

Various types of data may be transmitted to the surface utilizing the conductors 40 in the composite coiled tubing 20. Some of the types of data which may be transmitted to the surface include inclination, azimuth, gyroscopic survey data, resistivity measurements, downhole temperatures, downhole pressures, flow rates, rpms of the power section, gamma ray measurements, fluid identification, formation samples, and pressure, shock, vibration, weight on bit, torque at bit, and other sensor data. The bottom hole assembly, for example, includes a pressure measurement sub 664 for sensing the pressure in the annulus 82 of borehole 12.

A preferred embodiment of the means for transmitting data to the surface is shown in U.S patent application Ser. No. 09/599,343 filed Jun. 22, 2000 and in U.S. patent application Ser. No. 09/467,588 filed Dec. 20, 1999, both hereby incorporated herein by reference. The data transmission conductors 42 allow the transmission of large amounts of data which then can be processed by powerful computers at the surface. By processing the data at the surface, the bottom hole assembly 30 is much less expensive and is much more efficient. The ability to have a high data transmission rate to the surface allows the elimination of most of the electronics of prior art bottom hole assemblies. It also enhances the reliability of transmission of the data to the surface since pulsing the data through the mud column is eliminated.

The tools at the top of the bottom hole assembly 30 are wireline type electrical tools. These are non-drilling wireline tool technology and enable the use of a voltage converter. The tools convey 1,000 volts and 0.3 amps or 3 miliamps to the transformer. The bottom hole assembly actually uses three amps of current and 30 volts. The transformer transforms the 1,000 volts and 3 miliamps to 30 volts and 3 amps. A down hole battery would provide much more power because a battery is a high amp device. However, it only provides this power for a very short period of time. The bottom hole assembly is not a high power operating system. The bottom hole assembly is in the same power range as other down hole turbine driven bottom hole assemblies.

The electrical conductors 41 in composite coiled tubing 20 thus allow more power to be transmitted downhole. Conductors 41 are able to get 3 amps of current down to the bottom hole assembly 30. This way, conductors 41 are able to get 3 amps of current and 1,000 volts of electricity. This power supply is also more constant instead of the typical power surges provided by battery power. This allows the resistivity measurements to reach deeper into the formation. Further, an alternator or a battery section is no longer required in the bottom hole assembly. Greater power from the surface can also be used to transmit electrical current into the formation to enhance resistivity measurements by resistivity tool 121.

It should be appreciated that the composite coiled tubing 20 and propulsion system 120 may be used to convey various well apparatus into the well and be used with bottom hole assemblies having other applications in the drilling, completion and production of wells. The composite coiled tubing 20 and propulsion system 120 may be used during drilling to move in and out of the borehole such well apparatus as an electric motor, turbine, vane, or positive displacement drilling motor, various types of sensors to measure three dimensional position in space, a member for displacing formation such as a bit or jets, a caliper log (sonic or mechanical), a directional kick-off device such as whipstock, a casing mill, a casing exit system (chemical or explosive) or other downhole tool used in drilling. The composite coiled tubing 20 and propulsion system 120 may also be used with various drilling performance sensors such as gamma, resistivity, magnetic resonance (MRI), sonic, neutron density, temperature, pressure, formation pressure, or other downhole parameter. The composite coiled tubing 20 and propulsion system 120 may further be used with drilling performance sensors such as weight on bit, torque on bit, rate of penetration, pipe pressure, annulus pressure, shock and vibration, motor rpms, differential pressure across the motor, or other performance parameters. Various steering apparatus may be used with the composite coiled tubing 20 and propulsion system 120 such as a fixed bend in or above the motor, a fixed bend in or above the motor with an orienter, an adjustable bent sub in or above the motor with an adjustable orienter, a three dimensional or lesser steering system, one or more back flow check valves, a circulating sub, a quick disconnect sub, a casing collar locator, batteries, an electric turbine, electronics, stabilizers or other device used for steering the bottom hole assembly. The composite coiled tubing 20 and propulsion system 120 may also be used with production equipment such as a downhole pump, an open hole packer, a cased hole packer, a sand screen, a pressure control downhole valve, a perforated liner, a perforating gun, or other device used to produce the well. The composite coiled tubing 20 and propulsion system 120 may further be used with workover equipment or for treating the formation such as casing scrapers, jet cleaning tools, acids and other well treatment fluid systems, zonal treatment fluid systems or other devices for workover or treating the well. The composite coiled tubing 20 and propulsion system 120 may also be used to convey a well intervention tool, a well stimulation tool, a density engineering tool or a logging tool as for example. The above lists of well service and maintenance tools are intended to be exemplary and not all inclusive.

It is possible to use composite coiled tubing 20 as the production string in a new borehole. Composite coiled tubing 20 can be tied back to an external casing packer or sealed at the casing exit point and extend to the surface.

The present invention may be used to install casing in the borehole. In this method, the propulsion system may be disposable. See U.S. patent application Ser. No. 10/262,136 filed Oct. 1, 2002 entitled Apparatus and Methods for Installing Casing in a Borehole, hereby incorporated herein by reference.

Utilizing bottom hole assembly 30 allows the drilling system 10 to trip into the borehole 12 and retract from the borehole 12 quickly. One objective of the drilling system 10 of the present invention is to produce the bypassed formations quickly and economically because of their limited producing life.

It should also be appreciated that composite coiled tubing 20 may be used for perforating the well. For example, after bottom hole assembly 30 has been removed from the well 12 and the well has been cased, a perforation joint may be attached to the downhole end of composite coiled tubing 20 and run down into the new borehole 12. The perforation joint can then be detonated to perforate the borehole 12 for production. The composite coiled tubing 20 can then be used as production tubing. Screens can also be run on the downstream end of composite coiled tubing 20.

Another application of the bottom hole assembly of the present invention is testing while drilling. The bottom hole assembly is lowered into the well and located adjacent the formation to be tested. An interval of the borehole is isolated to perform the formation test. The interval may be isolated using upper and lower packers or by a probe. The data is then gathered and processed, typically for testing formation pressures. Often samples are collected for retrieval to the surface.

The downhole coiled tubing propulsion system of the present invention may include other applications. These include the conveyance of conventional logging tools and the pulling of casing or a completion string into the borehole, as for example.

Another use includes using the drilling assembly for clean out work where the well is waxed up or sanded up in production tubing. The drilling system is inserted in the well with the bottom hole assembly included. The motor and a pressure tool are located on the end of the bottom hole assembly and can clean out any wax or sand. The pressure tool would include a pressure while drilling tool, the tension and compression sub, and a motor. In long horizontal jobs, the assembly may also include a tractor. The resistivity, gamma, and directional components would not necessarily be needed in the bottom hole assembly.

The assembly can also be used to set packers and straddle packers. In fact, the system could also be used for anything needed to be positioned in the wellbore and particularly any tool that needs to be extended out horizontally into a well. The item to be placed is placed in front of the bottom hole assembly.

The system can also be used to run cement bond logs. Also, any kind of cased hole logs can be run in front of the bottom hole assembly. Any wireline logging tools can also be used because there are conductors extending all the way down the composite coiled tubing wall.

Figure 9:
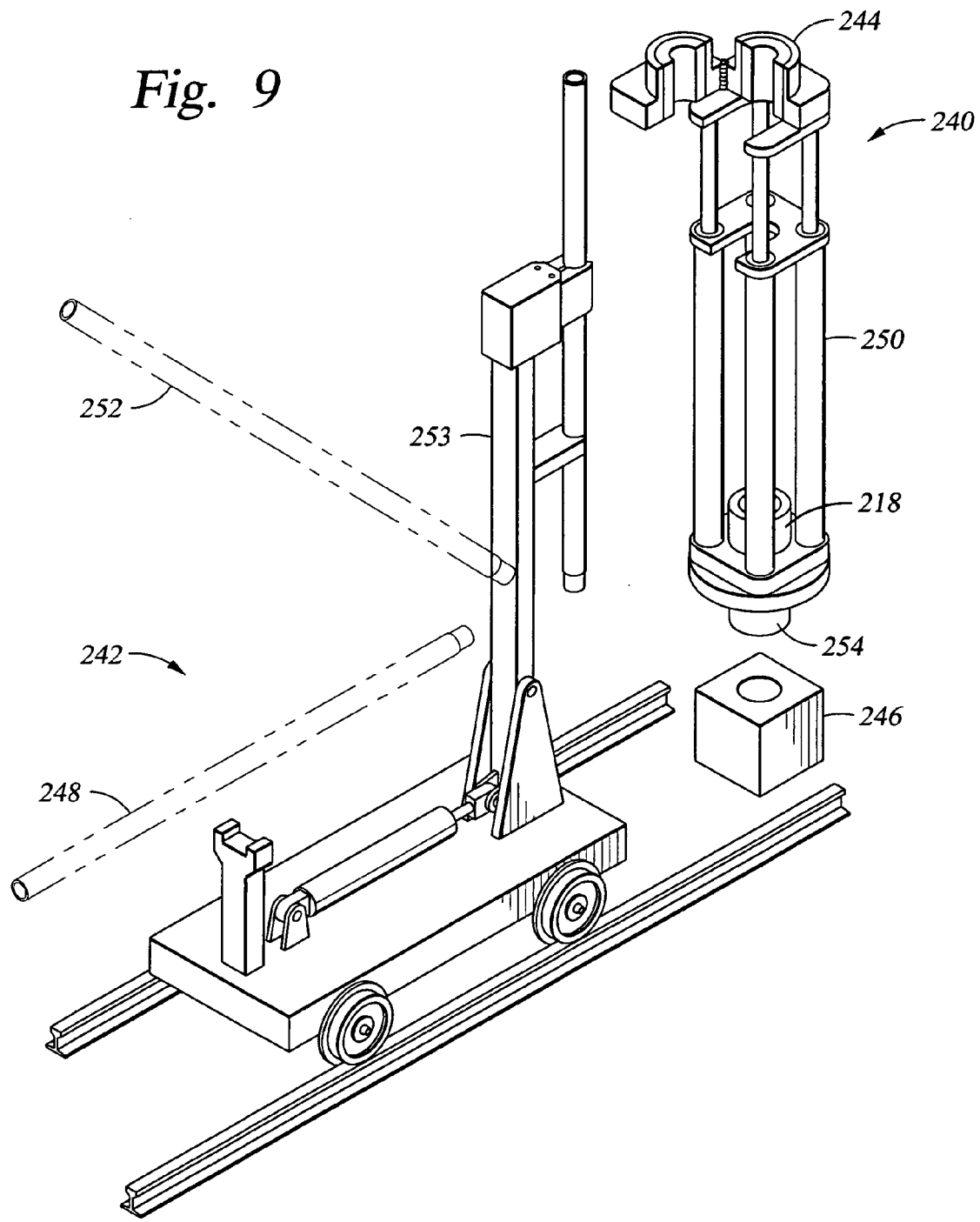
FIG. 9 is a schematic of a system for installing and removing steel pipe in a new borehole.
Figure 10:
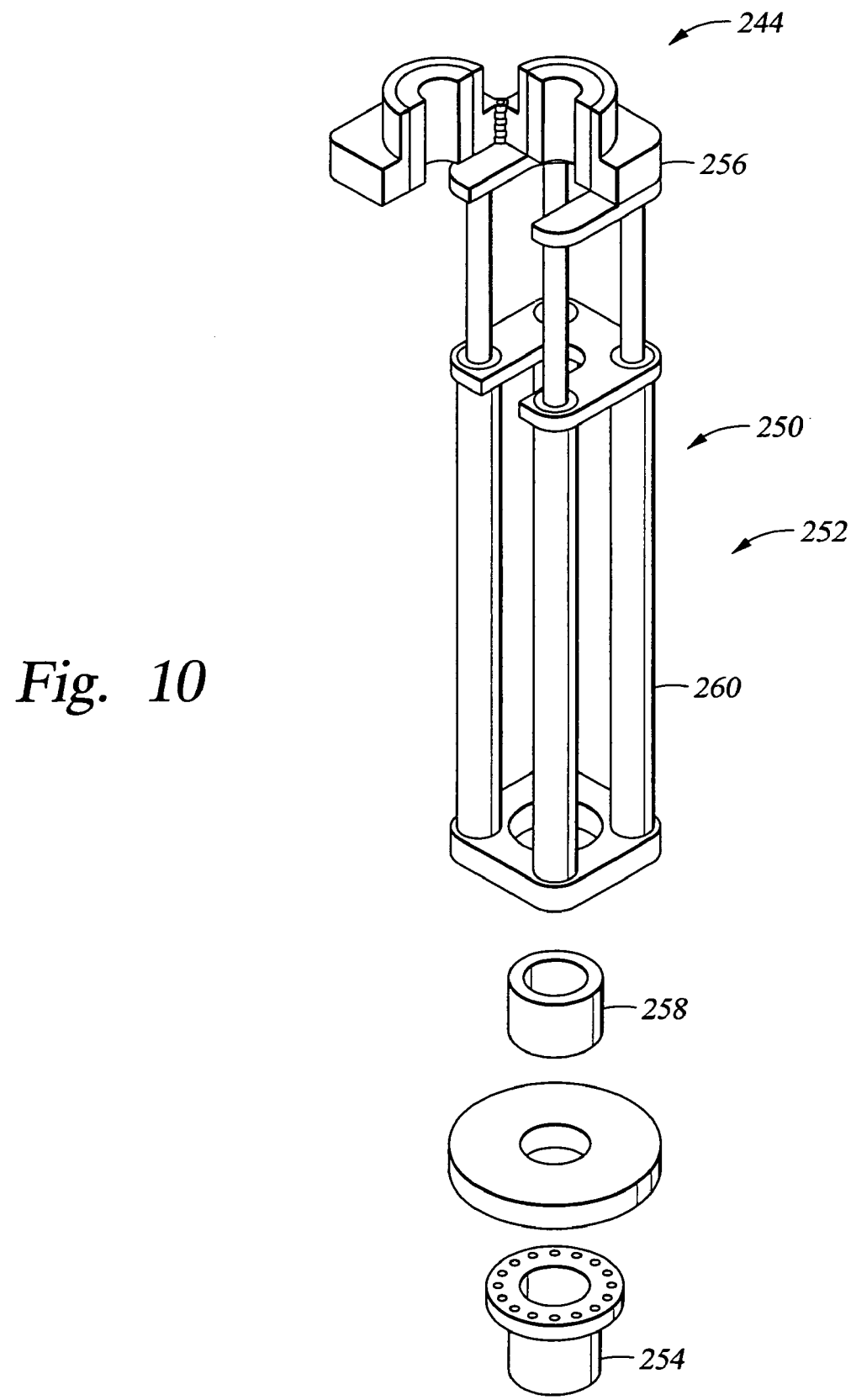
FIG. 10 is an exploded view of a casing ram for deploying and retrieving a joint of casing into the new borehole.

Referring now to FIGS. 9 and 10, it is still preferred to use steel for casing the new borehole. Steel has a greater absolute tensile and compressive strength and is more elastic than present day composite tubing. Also, steel is able to withstand the temperature gradients within the producing well as well as other environmental conditions that exist in the producing well. Steel casing is also able to withstand the many sheer forces of a producing well. Therefore, the drilling system 10 preferably uses the bottom hole assemblies on composite coiled tubing 20 for drilling the borehole and then steel casing is lowered into the new borehole for completing the well.

Since it is the objective of the drilling assembly 10 of the present invention to eliminate the requirement of a rig, a completion assembly 240 is shown in FIGS. 9 and 10 which requires no rig. Completion assembly 240 includes a pipe handling system 242, a casing elevator 244, casing tongs 246, and casing rams 250. The pipe handling system 242 picks up individual casing joints in the horizontal position shown at 248 and then moves individual casing joints into an intermediate position at 251 and then to an upright position 253. The new joint is then positioned horizontally over the wellhead 254. In the vertical position over wellhead 254, the hydraulically controlled casing elevator 244 grabs the new joint of pipe for alignment with the upper end of the casing string projecting from wellhead 254. Tongs 246 are mounted on the frame of hydraulic casing rams 240 for threading the new casing joint onto the upper end of the casing string in the borehole.

Referring now to FIG. 10, the casing rams 250 support the casing elevator 244 by means of a top bowl 256 and a bottom bowl 258. Bowls 256, 258 include slips for suspending the casing string. The casing string passes through the slips in bowls 256, 258 which support and grab the casing. The casing rams include four rams 260 for pushing downwardly on the new casing joint and casing string and thus into the new borehole. One type of casing rams are manufactured by R. L. Gilstrap Co. of Oklahoma City. See "The Wellhead CasingJac for Extra Pipe Pulling Power" by R.L. Gilstrap Co., incorporated herein by reference. After the new joint of pipe is threadingly connected to the casing string, it is jacked into the borehole using the hydraulic casing jacks 252. The completion system 240 also includes conventional cementing of the new casing in the well. An example of a coiled tubing injection system can be found in U.S. patent application Ser. No. 60/280,088 filed Mar. 20, 2001, hereby incorporated herein by reference.

The completion system 240 has several advantages over the prior art. As can be seen, no rig is required for installing the casing string in the new borehole. Further, the completion system 240 may be operated by as few as two men. Also, the casing rams 250 have the ability to pull the casing out of the well and have sufficient power to overcome the friction and drag of the casing against the cased borehole. Further, the casing rams 250 have the ability to push the casing string into the well. Conventional rigs do not have such an ability and rely upon the weight of the casing using gravity and or rotation or reciprocating to install the casing string in the well.

It should be appreciated that the present invention may be used with a conventional rig or may include the reduced use of a conventional drilling rig. For example, an operator use a conventional rig to drill boreholes for the conductor casing and then release the rig for use on other wells.

While a preferred embodiment of the invention has been shown and described, modifications thereof can be made by one skilled in the art without departing from the spirit of the invention.

What is claimed is:

1. An assembly for drilling a wellbore from a surface, the assembly comprising:
   a composite coiled tubing;

a drilling assembly having telemetry and attached to said composite coiled tubing; and said drilling assembly including a bit and a downhole motor, wherein said downhole motor is an electric motor powered from the surface.

2. The assembly of claim 1 further including an electric conductor extending through the wellbore.

3. The assembly of claim 2 wherein said downhole motor is electrically powered by electric power transmitted through said conductor.

4. The assembly of claim 3 wherein said electric conductor extends through a wall of said composite coiled tubing.

5. The assembly of claim 1 wherein said telemetry is mud pulse telemetry communicating with the surface.

6. The assembly of claim 1 wherein said telemetry includes electromagnetic telemetry system communicating with the surface.

7. The assembly of claim 1 wherein said telemetry includes electric wireline telemetry extending to the surface.

8. The assembly of claim 1 wherein:
- a first length of said composite coiled tubing has a first tubular wall with one or mote first conductors embedded in said first tubular wall;
- a second length of said composite coiled tubing has a second tubular wall with one or more second conductors embedded in said second tubular wall;
- a connector for joining first and second lengths of said composite coiled tubing;
- a first mechanical connector affixed to said first length and including a first conductor connector, and a second mechanical connector affixed to said second length and including a second conductor connector;
- said first and second mechanical connectors being configured such that when said first mechanical connector engages said second mechanical connector said first and second lengths are mechanically connected and a communication path is formed between said first and second conductors;
- a drilling assembly attached to one of said lengths of composite coiled tubing; and
- said drilling assembly including a bit and a downhole motor.

9. The assembly of claim 8 for establishing an electrical connection between said first and second conductors in said first and second lengths of composite coiled tubing wherein:
- said connector includes a male housing affixed to said first length and having at least one conduit formed to allow said first conductor to pass through said conduit;
- said connector includes a female housing affixed to said second length and having at least one conduit formed to allow said second conductor to pass through said conduit;
- said male and female housings including said first and second mechanical connectors connecting the first and second lengths;
- said male housing including a first electrical contact having a conduit to allow wire from the first composite coiled tubing to connect to said first electrical contact; and
- said female housing including a second electrical contact having a conduit to allow wire from the second composite coiled tubing to connect to said second electrical contact, and said first and second electrical contacts positioned so that said first electrical contact firmly engages said second electrical contact when said male housing is joined to said female housing.

10. The assembly of claim 1 wherein:

said composite coiled tubing has a tubular wall with one or more conductors embedded in said composite coiled tubing wall;

said drilling assembly further including a steering assembly;

said steering assembly including a body having a nose connected to said body by a jointed connection, said body and nose each having an axis; said nose operatively connected to said bit;

an actuator movably mounted on said body and engaging said nose to move said nose with respect to said body at said jointed connection and alter said nose axis with respect to said body axis at said jointed connection; and said actuator having a first position altering said nose axis with respect to said body axis forming a first direction of drilling of said bit and a second position altering said nose axis with respect to said body axis forming a second direction of drilling, said actuator altering said nose axis from said first position to said second position while said bit is in the borehole.

11. An apparatus for drilling a wellbore from a surface and controlling the direction of the bit while drilling a borehole forming a wall, comprising:

means for lowering the drilling assembly with the downhole motor and steering assembly into the borehole on composite coiled tubing;

means for drilling the borehole by rotating the bit on the downhole motor and applying a load to the bit;

means for communicating a signal through one of said conductors to change drilling direction; and means for adjusting the nose axis with respect to the body axis at the jointed connection between the body and nose while drilling by changing the angle of the nose axis with the body axis while drilling and by changing the azimuth of the nose axis with the body axis while drilling to change the angle and azimuth of the bit and thus the direction of drilling.

* * * * *